(12) United States Patent
Snyder et al.

(10) Patent No.: US 11,789,277 B2
(45) Date of Patent: Oct. 17, 2023

(54) ADJUSTABLE HEAD-MOUNTED DISPLAY

(71) Applicant: Valve Corporation, Bellevue, WA (US)

(72) Inventors: Keaton Snyder, Donald, OR (US); Isaac Frazier, Portland, OR (US); Jos Jacobs, Sherwood, OR (US); Carl Samuel Conlee, IV, Seattle, WA (US); Ivan A. McCracken, Bellevue, WA (US); Clement Gallois, Seattle, WA (US); John Underwood, Portland, OR (US); William Winters, Portland, OR (US); Darryl Jensen, Hillsboro, OR (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 17/552,051

(22) Filed: Dec. 15, 2021

(65) Prior Publication Data

US 2022/0187609 A1 Jun. 16, 2022

Related U.S. Application Data

(60) Provisional application No. 63/125,503, filed on Dec. 15, 2020.

(51) Int. Cl.
*G02B 27/01* (2006.01)
*H04R 1/02* (2006.01)

(52) U.S. Cl.
CPC ......... *G02B 27/0176* (2013.01); *H04R 1/028* (2013.01); *G02B 2027/0154* (2013.01); *G02B 2027/0161* (2013.01); *H04R 2499/15* (2013.01)

(58) Field of Classification Search
CPC ........ G02B 27/0176; G02B 2027/0154; G02B 2027/0176

USPC .......................................................... 345/184
See application file for complete search history.

(56) References Cited

U.S. PATENT DOCUMENTS

| 4,185,281 | A | * | 1/1980 | Silverstone | G09F 9/00 345/184 |
|---|---|---|---|---|---|
| 5,321,416 | A | * | 6/1994 | Bassett | A42B 3/145 348/121 |
| 7,278,734 | B2 | | 10/2007 | Jannard et al. | |
| 8,545,013 | B2 | * | 10/2013 | Hwang | H04R 1/1066 381/381 |
| 8,832,869 | B2 | | 9/2014 | Ma et al. | |
| 10,588,374 | B2 | | 3/2020 | Maloney | |
| 10,656,670 | B2 | | 5/2020 | Hu et al. | |

(Continued)

OTHER PUBLICATIONS

The International Search Report and Written Opinion for PCT Application No. PCT/US21/63595, dated Mar. 10, 2022. 11 pages.

*Primary Examiner* — William Boddie
*Assistant Examiner* — Bipin Gyawali
(74) *Attorney, Agent, or Firm* — Lee & Hayes, P.C.

(57) ABSTRACT

A head-mounted display includes a front having a display housing and a back having a rear housing. A first member extends between the front and the back and is adjustable via an actuation of a first rotatable actuator and a first cabling mechanism. A second member extends between the front and the back and is adjustable via an actuation of a second rotatable actuator and a second cabling mechanism. A third member extends between the front and the back and is adjustable via the actuation of the second rotatable actuator and a third cabling mechanism.

20 Claims, 34 Drawing Sheets

(56) References Cited

U.S. PATENT DOCUMENTS

| | | | |
|---|---|---|---|
| 10,660,224 B2 | 5/2020 | Wen et al. | |
| 10,724,716 B2 | 7/2020 | Neeley et al. | |
| 10,845,604 B2* | 11/2020 | Morimoto | G02B 27/017 |
| 11,181,748 B1* | 11/2021 | Williamson | G02B 27/0176 |
| 2005/0201585 A1* | 9/2005 | Jannard | H03G 3/348 |
| | | | 381/381 |
| 2010/0282889 A1* | 11/2010 | Hjerpe | B60R 22/46 |
| | | | 242/374 |
| 2016/0249124 A1* | 8/2016 | Drinkwater | H04R 1/105 |
| 2016/0363772 A1* | 12/2016 | Miller | G02B 27/0176 |
| 2019/0222936 A1 | 7/2019 | Degner et al. | |
| 2019/0369659 A1* | 12/2019 | Hu | G02B 27/0176 |
| 2020/0109839 A1* | 4/2020 | Neeley | A61B 90/35 |
| 2020/0233453 A1* | 7/2020 | Hatfield | G06F 3/011 |
| 2021/0041012 A1* | 2/2021 | West | F16H 35/00 |
| 2021/0321565 A1* | 10/2021 | Anderson | A01D 41/06 |

\* cited by examiner

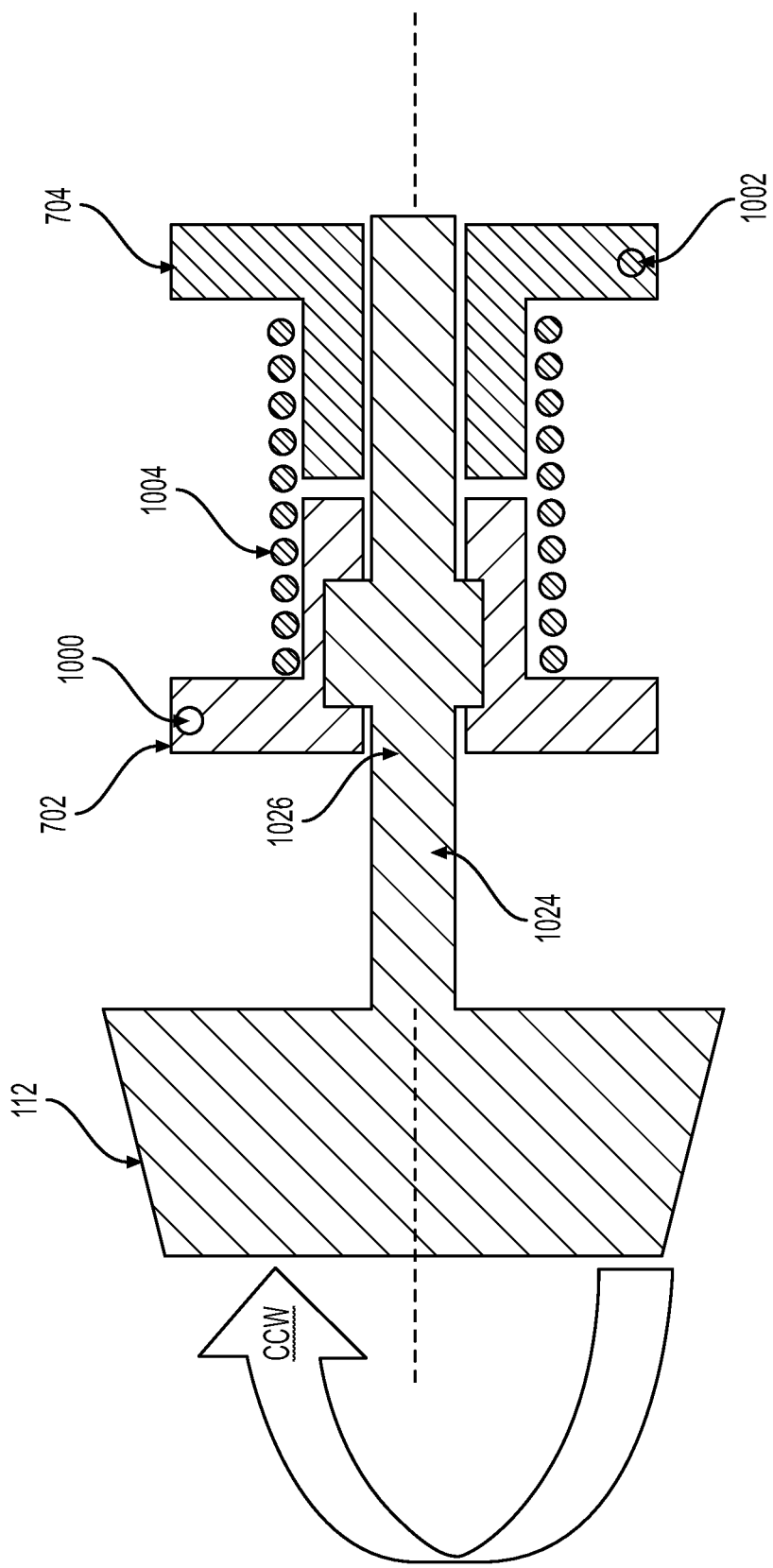

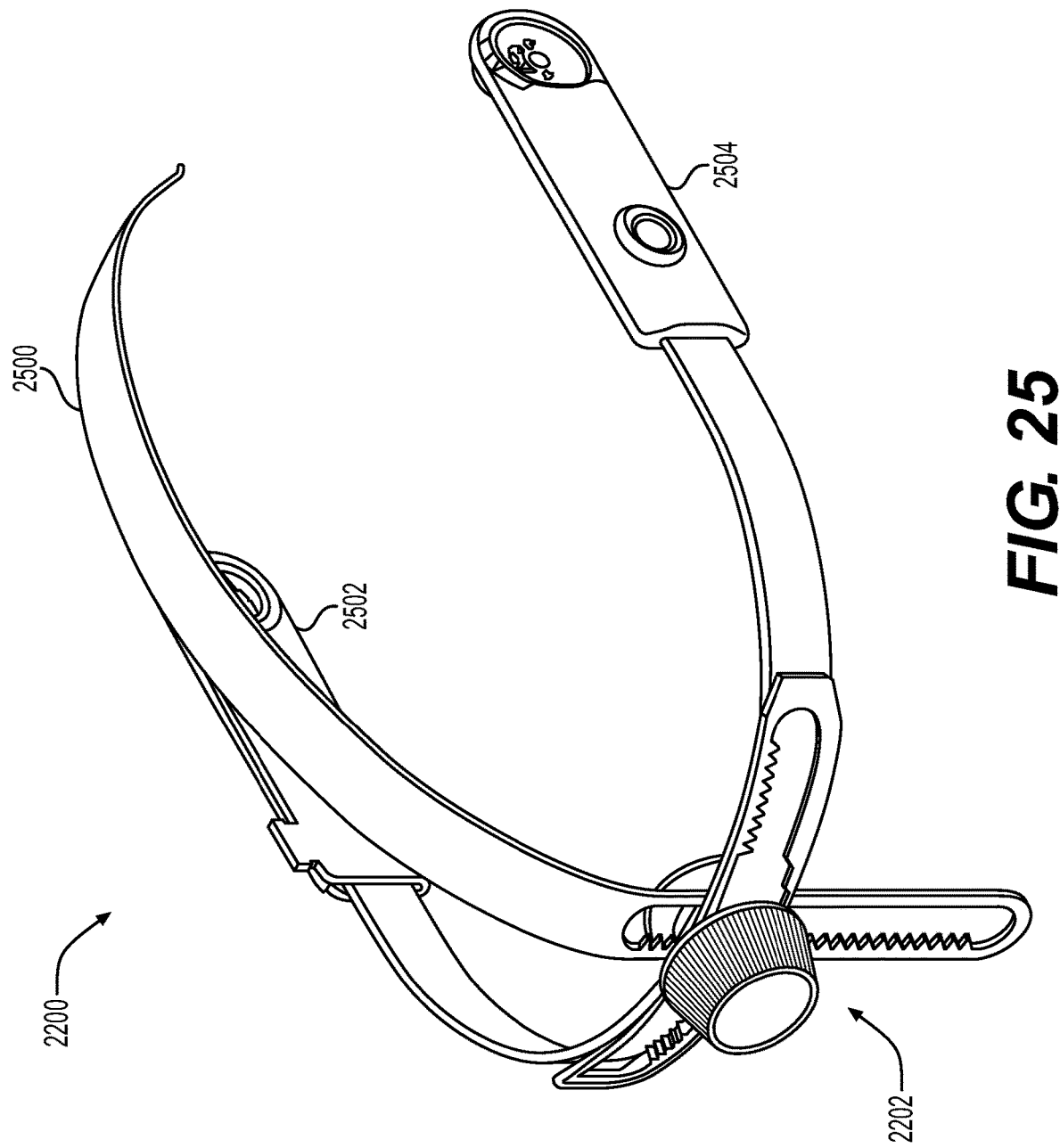

ADJUSTABLE HEAD-MOUNTED DISPLAY

CROSS REFERENCE TO RELATED APPLICATION

This application claims priority to commonly assigned, co-pending U.S. Provisional Patent Application Ser. No. 63/125,503, filed Dec. 15, 2020. Application Ser. No. 63/125,503 is fully incorporated herein by reference.

BACKGROUND

Head-mounted displays are used in various fields, including engineering, medical, military, and video gaming. In some instances, head-mounted displays present information or images to a user as part of a virtual reality or augmented reality environment. As an example, while playing a video game, a user may wear a head-mounted display to immerse themselves within a virtual environment.

Conventional head-mounted displays provide little or no adjustment to accommodate differing head sizes and/or to adjust a tightness of the head-mounted display. As a result, some users may find it difficult to enjoyably wear head-mounted displays. For instance, if too snug, the head-mounted display may be uncomfortable to wear. Alternatively, if too loose, the head-mounted display may not properly secure to the user. Moreover, users have different facial structures and shapes.

BRIEF DESCRIPTION OF THE DRAWINGS

The detailed description is described with reference to the accompanying figures. In the figures, the left-most digit(s) of a reference number identifies the figure in which the reference number first appears. The same, or like, reference numbers in different figures indicate similar or identical items. The systems depicted in the accompanying figures are not to scale and components within the figures may be depicted not to scale with each other.

FIG. 10C illustrates the first actuator of the head-mounted display of FIG. 1 engaging one or more cables for adjusting a vertical position of the head-mounted display on a user, according to an embodiment of the present disclosure.

FIG. 25 illustrates an isometric view of one or more members of the head-mounted display of FIG. 22, according to an embodiment of the present disclosure.

DETAILED DESCRIPTION

Figure 1:
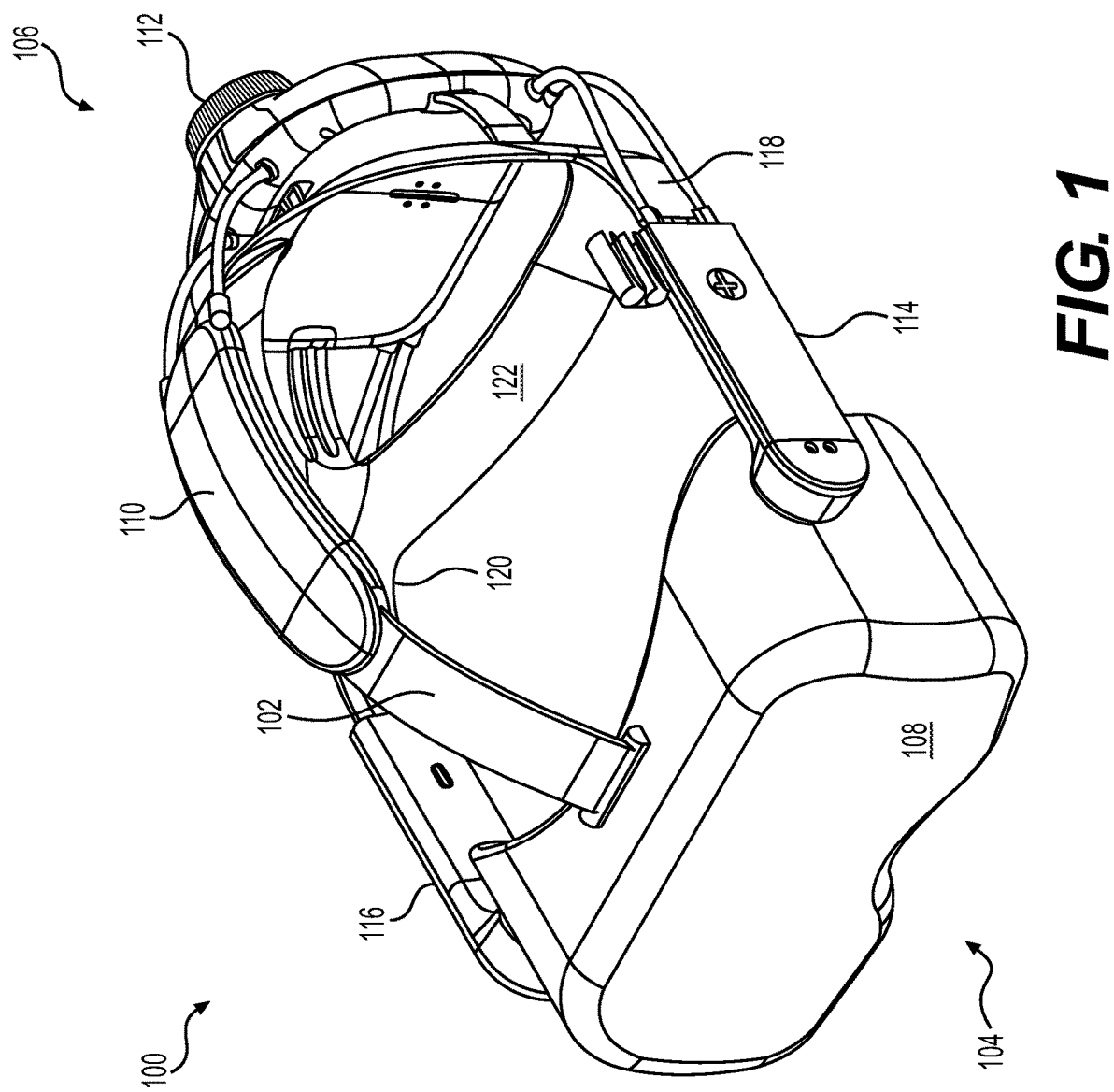
FIG. 1 illustrates a front isometric view of an example head-mounted display, according to an embodiment of the present disclosure.

Introduced above, head-mounted displays (HMDs) have a wide range of applications and in some instances, may need to accommodate for varying head sizes among different users. Conventional HMDs, however, offer little to no adjustment for adapting to different users and/or incrementally tightening. For instance, conventional HMDs may use elastic or hook and loop straps to secure the HMD. Such mechanisms, however, are fairly crude, rudimentary, and some users may find it difficult to adjust HMDs on-the-fly and/or in small increments. As such, the HMD may not securely fit and/or users may spend time readjusting the HMD. Such alterations detract from the utility of HMDs and/or negatively impact user experiences. Additionally, failing to properly secure the HMD may impact a quality of images presented in virtual reality (VR) and/or augmented reality (AR) environments. Accordingly, HMDs may be uncomfortable and/or inconvenient to wear for extended periods of time.

This application describes, in part, a HMD that snuggly, comfortably, and securely fits around or mounts to a head of a user. In some instances, the HMD according to the instant application may take many forms, including helmets, visors, goggles, masks, glasses, and other head or eyewear worn on the head of the user. The HMD includes a front having a display worn on the face, adjacent to the eyes, of the user that outputs images (or other content) for viewing. In some instances, the images may be output by an application or computing device (e.g., video game console) communicatively coupled to the HMD. Additionally, in some instances, the user may operate one or more handheld-controller in conjunction with the HMD to further engage the user in VR or AR environments.

The front of the HMD includes a face gasket that abuts the face of the user. The face gasket includes complimentary shapes and/or contours for engaging the face of the user and sealing the display (or the housing) against the face of the user. The face gasket may include a compliant, soft, elastic, or flexible material (e.g., elastomer, foam, etc.) that conforms to the ergonomics of the face. Additionally, the face gasket may be wrapped or encased with a fabric material. The face gasket may compress (e.g., fold upon itself, roll, etc.) when the HMD is tightened to the user and may expand (e.g., lengthen) when the HMD loosens from the user. Such deformation may account for varying ergonomics of the face and allow the face gasket to conform and seal against the face of the user. In such instances, the face gasket may have a degree of play or travel for abutting the face of the user.

A back of the HMD may include a basket, cradle, support, frame, or harness configured to secure around a back of the head. In some instances, the harness may engage under and/or with the occipital bone of the head, thereby clutching the head and securing the HMD. In some instances, the harness, or portions of the harness, may be spring-loaded or tension-loaded to maintain constant pressure on the head. Such pressure may assist in securing the HMD to the user by ergonomically conforming the harness. The harness may also include one or more articulating joints (e.g., ball joint, pivot, etc.) for clutching against the back of the head. Moreover, the harness may include different material thicknesses and/or voids to provide the harness with varying levels of stiffness. For example, the different voids and/or material thicknesses throughout the harness may offer a spring-like feel to maintain contact against the head and/or conform to differently shaped heads. In some instances, the harness may include a portion that engages with the head above the occipital bone and/or which circumferentially and/or radially extends around at least a portion of the head.

The harness may couple to a rear housing disposed at the back of the HMD. The rear housing may accommodate various computing components of the HMD. Additionally, the rear housing may include one or more actuators for adjusting a fit of the HMD on the user. These actuators may be actuated by the user to tighten or loosen the HMD, for example, and/or to otherwise adjust a fit of the HMD on the user. By way of example, between the front of the HMD and the back of the HMD, one or more members may engage with the head of the user. These members may traverse over a top of the head, along sides of the head, and so forth. By adjusting a length of these members, whether individually or collectively, the user may adjust the fit and feel of the HMD.

In some instances, the members may represent strands, cords, sections, straps, bands, etc. that operably couple the front of the HMD and the back of the HMD. Through actuating the actuators the members may be extended or retracted to varying extents for tightening and loosening the HMD. Additionally, the actuators may adjust a vertical fit of the HMD on the user, or the vertical position of the display relative to the eyes. Users may therefore utilize the actuators to accommodate for varying head sizes, provide incremental amounts of fastening, and/or position the HMD based on his or her preferences.

The HMD may include various mechanisms for adjusting the fit of the HMD on the user. In one instance, cabling mechanisms may include one or more cables that route through and couple to the members for tightening and/or loosening the HMD. For example, the actuators may be operatively coupled to the one or more cables and rotated for pulling the one or more cables. Rotating the actuators in a first direction may pull the front and the back of the HMD further apart, thereby loosening the HMD. Alternatively, rotating the actuators in a second direction may pull the front and the back together, thereby tightening the HMD. In such instances, a first cable may be used for loosening the HMD while a second cable may be used for tightening the HMD. That is, pulling on the first cable may loosen the HMD and pulling on the second cable may tighten the HMD. As the first cable and the second cable are pulled, the first cable and the second cable may be spooled around respective spools, reels, rods, etc.

Moreover, depending on the direction of actuation (e.g., tightening or loosening), the first cable or the second cable may be unspooled from a respective spool. The slack introduced by one of the first cable or the second cable may be taken up to may allow the HMD to be tightened or loosened. In this sense, the first cable and the second cable may operate in unison to provide slack for either tightening or loosening the HMD.

Additionally, one or more cables may be used for adjusting a vertical fit of the HMD on the user. The vertical fit may adjust a vertical position of the display relative to the eyes of the user. Similar to the cables that are used to tighten and loosen the HMD, the cables for adjusting the vertical fit of the HMD may introduce or take up slack for accommodating different vertical fits.

To illustrate, the HMD may include multiple members and/or actuators to secure the HMD to the user. One or more lateral members may extend between the front of the HMD and the back of the HMD at opposing lateral sides of the HMD. When worn by the user, a first lateral member may extend along a first side of the head (e.g., left side) and a second lateral member may extend along a second side of the head (e.g., right side). A first end of the lateral members may hingedly, rotatably, or pivotably couple to the display worn on the face of the user. A second end of the lateral members may receive a lateral arm that extends from the rear housing or the rear harness. For example, the lateral members may include a receptacle into which the lateral arm slides. The engagement between the lateral members and the lateral arms operate to couple the front and the back of the HMD. Here, the lateral members and the lateral arms may slide over or within one another in a telescopic-like fashion to adjust a tightness of the HMD.

The cables of the cabling mechanism may mount to the lateral members and/or the lateral arms for tightening and loosening the HMD. As introduced above, the cabling mechanism may include a first cable utilized for loosening the HMD and a second cable utilized for tightening the HMD. Pulling on the first cable, via actuation of an actuator in a first direction, may cause the lateral arms to extend from the lateral members. In other words, the lateral members and the lateral arms may extend away from one another to loosen the HMD. Pulling on the second cable, via actuation of the actuator in a second direction, may cause the lateral arms to retract within the lateral members. Here, the lateral members and the lateral arms may move towards one another to tighten the HMD. Moreover, in some instances, the lateral members and the lateral arms on the first side and the second side may operate in unison during a tightening and loosening of the HMD. As such, the sides of the HMD may be tightened and loosened synchronously.

The cables of the cabling mechanisms may operatively couple to the actuator, such as dials, levers, wheels, slides, buckles, arms, and/or knobs. The cables may also be wound around respective spools that are in operational relationship with the actuators. For example, the first cable may spool and unspool from a first spool/reel while the second cable may spool and unspool from a second spool/reel. When the actuator actuates in a first direction, the first cable may spool around the first spool while the second cable may unspool from the second spool. That is, during a loosening of the HMD, the actuator may be rotated in the first direction to wind the first cable upon the first spool to cause the lateral arms to extend from the lateral members and loosen the HMD. At the same time, the second cable may be unwound from the second spool to provide slack for the loosening of the HMD. To allow the first cable to be pulled and extend the lateral arms, one end of the first cable may couple to the actuator and/or the first spool, while an opposite second end may couple to the second lateral member.

Alternatively, during tightening of the HMD, the actuator may be rotated in a second direction to unspool the first cable from the first spool, while the second cable may spool around the second spool. In this instance, the second cable may be pulled to retract the lateral arms within the lateral members for tightening the HMD. To allow the second cable to be pulled and retract the lateral arms, one end of the second cable may couple to the actuator and/or the second spool, while an opposite second end may couple to the lateral arm.

The HMD may include pulleys coupled to the lateral members and/or the lateral arms. The pulleys may route the cables through the lateral members and the lateral arms. The pulleys may also reverse a direction of the pulling force. For example, the routing of the first cable and the second cable about the pulleys may operate to loosen and tighten the HMD, respectively, depending on the cable being pulled. In some instances, torsional springs may be used to take up or spool any unwanted slack in the first cable and/or second cable. Reducing the amount of slack may increase a responsiveness of the HMD.

In addition to including the lateral members and lateral arms, the HMD may include a top member disposed over the crown of the head, between the front and the back of the HMD. The top member may include a similar cabling mechanism as the lateral members and arms that effectuate to adjust a vertical position of the HMD on the user. For example, the top member may include a first cable that spools around a first spool and a second cable that spools around a second spool. Pulling on the first cable may lower the vertical position of the display (e.g., the HMD is lowered vertically on the user) and pulling on the second cable may raise the vertical position of the display (e.g., the HMD is raised vertically on the user). In such instances, the first cable may spool around the first spool to lower the HMD while the second cable may unspool from the second spool to provide slack. Conversely, the second cable may spool around the second spool to raise the HMD while the first cable may unspool from the first spool to provide slack. The top member and the arm may include pulleys for routing the one or more cables and/or pulling the first cable and the second cable of the top member in corresponding directions.

The HMD may include multiple actuators for respectively tightening and loosening the HMD, as well as adjusting the vertical position of the HMD. For example, the HMD may include a first actuator for adjusting the vertical position of the HMD via the top member and the arm. Additionally, the HMD may include a second actuator for tightening and loosening the HMD to the user via the lateral members and the arms. As such, the HMD may include one actuator for adjusting the tightness of the HMD (e.g., a distance interposed between the front and the back) and another actuator for adjusting the vertical fit of the HMD. That is, the one or more lateral members may serve to tightened and/or loosen the HMD to the user while one or more top members may serve to vertically position the HMD on the user. However, in some instances, a single actuator may be used for respectively actuating the top member, the lateral members, and the arms.

In some instances, rather than including cabling mechanisms, the HMD may include straps, bands, or other members that engage with actuators. As similarly discussed above, the members may traverse alongside sides of the head and/or over the crown of the head. The members, however, may include teeth, connectors, slits, tabs, notches, and/or other slots that extend along a portion of the length of the member and which engage with the actuators. The actuators may include complimentary mechanisms that are configured to engage with the slots, for instance, at different portions along the length of the member. For instance, the actuators may include dials, levers, wheels, slides, buckles, arms, and/or knobs having gears that engage with the slots. In some instances, this engagement between the members and the actuators may resemble ratchet mechanisms, slide and lock mechanisms, friction mechanisms, etc.

For example, a first lateral member may have slots longitudinal extending along a portion of its length. Similarly, a second lateral member may have slots longitudinal extending along a portion of its length. At the back of the rear housing, for example, an actuator may have one or more gear(s) that engage with the slots of the first lateral member and the second lateral member. Actuating the actuator in a first direction may cause the first lateral member and the second lateral member to extend from the rear housing to loosen the HMD. Alternatively, actuating the actuator in a second direction may cause the first lateral member and the second lateral member to retract into the rear housing to tighten the HMD. Additionally, a top member having slots extending along a portion of its length may engage with the gear(s) to extend or retract in length. This extension or retraction, respectively, may cause the HMD to lower or raise its vertical position on the user.

The HMD may include one or more loudspeakers for outputting sound to the user. In some instances, the loudspeakers may be mounted to or integrated within the lateral members of the HMD. For example, the first lateral member may include a first loudspeaker for outputting sound to a left ear of the user and the second lateral member may include a second loudspeaker for outputting sound to the right ear of the user. The loudspeakers may include components for being repositioned and/or changing an orientation or proximity of the loudspeakers relative to the user. For example, the first loudspeaker may couple to the first lateral member via one or more ball joints (e.g., ball and socket) and the second loudspeaker may couple to the second lateral member via one or more additional ball joints. The ball joints may provide varying degrees of movement about one or more axes. Additionally, the first loudspeaker and/or the second loudspeaker may couple to or be mounted on slides that telescopically extend and retract. Whereas the ball joints provide rotational movement the slides may provide translational or longitudinal movement to extend or retract the loudspeakers.

In some instances, the HMD may include one or more wire routes or assemblies that channel wires, optical fibers, or other cables between the front and the back of the HMD. For instance, the rear housing may house wireless transceivers, a battery, microphones, input/output devices, processors, modules, and/or other components to permit operation of the HMD. In some instances, the front may include the display, antenna(s), microphones, input/output devices, processors, modules, etc. One or more cables may communicatively couple the front and back to provide power, information signals, or images to be output on the display. In some instances, wires, optical fibers, and/or cables may route through the one or more wire routes to alleviate potential issues with wires becoming tangled and/or detracting from an aesthetic appearance of the HMD. In some instances, the wire route may be integrally formed within the one or more top members and/or the one or more lateral members.

Additionally, or alternatively, in some instances, the HMD may include a flexible printed circuit (FPC) that extends from the front to the back of the HMD to communicatively couple components of the HMD. In some instances, the FPC may include a service loop, or slack, which permits the FPC to extend and retract. In some instances, the service loop may be disposed internal to the sleeve.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

FIG. 1 illustrates a front isometric view of an example HMD 100. As shown in FIG. 1, the HMD 100 may include a top member 102 extending from a front 104 of the HMD 100 towards a back 106 of the HMD 100. A first end of the top member 102 is shown coupling (e.g., via a hinge) to a display housing 108 (which may contain one or more displays) of the HMD 100. As a result, the top member 102 may be configured to pivot in relation to the display housing 108 to conform the display housing 108 to the face of the user. In some instances, in addition to including one or more displays, the display housing 108 may include battery(ies), sensor(s), adjustment mechanism(s), button(s), interface(s), controller(s), module(s), and so forth so carrying out an operation of the HMD 100. A second end of the top member 102 may extend into or through a sleeve 110. As discussed herein, within the sleeve 110, the top member 102 may engage with one or more arms and/or cabling mechanisms. These arms and cabling mechanism may effectuate to increase or decrease an exposed length of the top member 102 from the sleeve 110. For example, the cabling mechanism of the top member 102 may engage with a first actuator 112 for adjusting a vertical position of the HMD 100 on the user. Cables of the cabling mechanism may spool or unspool with an actuation of the first actuator 112 to telescopically extend and retract the top member 102 at various lengths from the sleeve 110.

Adjustment of the top member 102 may effectuate to adjust a vertical position of the display housing 108 on the user. For example, retracting the top member 102 (or the arms) into the sleeve 110 may decrease an exposed length of the top member 102 to raise the display housing 108 relative to the face of the user. Extending the top member 102 may increase an exposed length of the top member 102 to lower the display housing 108 relative to the face of the user. In this sense, the first actuator 112 may be used to adjust the vertical position of the display housing 108 on the user.

In some instances, the top member 102 may comprise a flexible material (e.g., rubber, plastic, etc.) that is configured to arc, bend, and/or otherwise conform to the head of the user. A foam pad covered in fabric may couple to the top member 102 and/or the sleeve 110 and may include rubber knobs that allow for easy installation and removal (e.g., for cleaning or replacement) from the top member 102. In such instances, the rubber knobs may be pressed into holes in the sleeve 110.

The HMD 100 also includes one or more lateral members, such as a first lateral member 114 and a second lateral member 116. The first lateral member 114 and the second lateral member 116 may extend along opposing sides of the HMD 100, between the front 104 and the back 106. The first lateral member 114 and the second lateral member 116 are shown coupling to opposing sides of the display housing 108 (e.g., left and right). In some instances, the first lateral member 114 and the second lateral member 116 may pivotably couple to the display housing 108 to allow the display housing 108 to pivot and conform to the user.

One or more arms may extend from the back 106 of the HMD 100 for engaging with the first lateral member 114 and the second lateral member 116, respectively. For example, a first lateral arm 118 may extend to engage with the first lateral member 114 and a second lateral arm 120 may extend to engage with the second lateral member 116. As discussed herein, the first lateral arm 118 and the second lateral arm 120 may be components of a rear harness 122 of the HMD 100.

The first lateral arm 118 may engage with the first lateral member 114 to extend or retract the first lateral member 114 towards or away from the back 106. Similarly, the second lateral arm 120 may engage with the second lateral member 116 to extend or retract the second lateral member 116 towards or away from the back 106. As discussed herein, the HMD 100 may include an actuator that operably engages with cabling mechanisms for extending and retracting the first lateral member 114 and the second lateral member 116. For example, actuating the actuator in a first direction may cause the first lateral member 114 and the second lateral member 116 to extend from the first lateral arm 118 and the second lateral arm 120, respectively. This motion may increase an exposed length of the first lateral arm 118 and the second lateral arm 120 to loosen the HMD 100. Alternatively, actuating the actuator in a second direction may cause the first lateral member 114 and the second lateral member 116 to retract towards the first lateral arm 118 and the second lateral arm 120, respectively. This motion may decrease an exposed length of the first lateral arm 118 and the second lateral arm 120, thereby tightening the HMD 100.

The HMD 100 further includes the rear harness 122 that engages with a back of the head. In some instances, the rear harness 122 may include fissions or features that permit the rear harness 122 to flex or conform to the head (e.g., above and below the occipital bone of the user). The rear harness 122 may additionally or alternatively be spring loaded (e.g., leaf spring) to apply pressure to the back of head.

Figure 2:
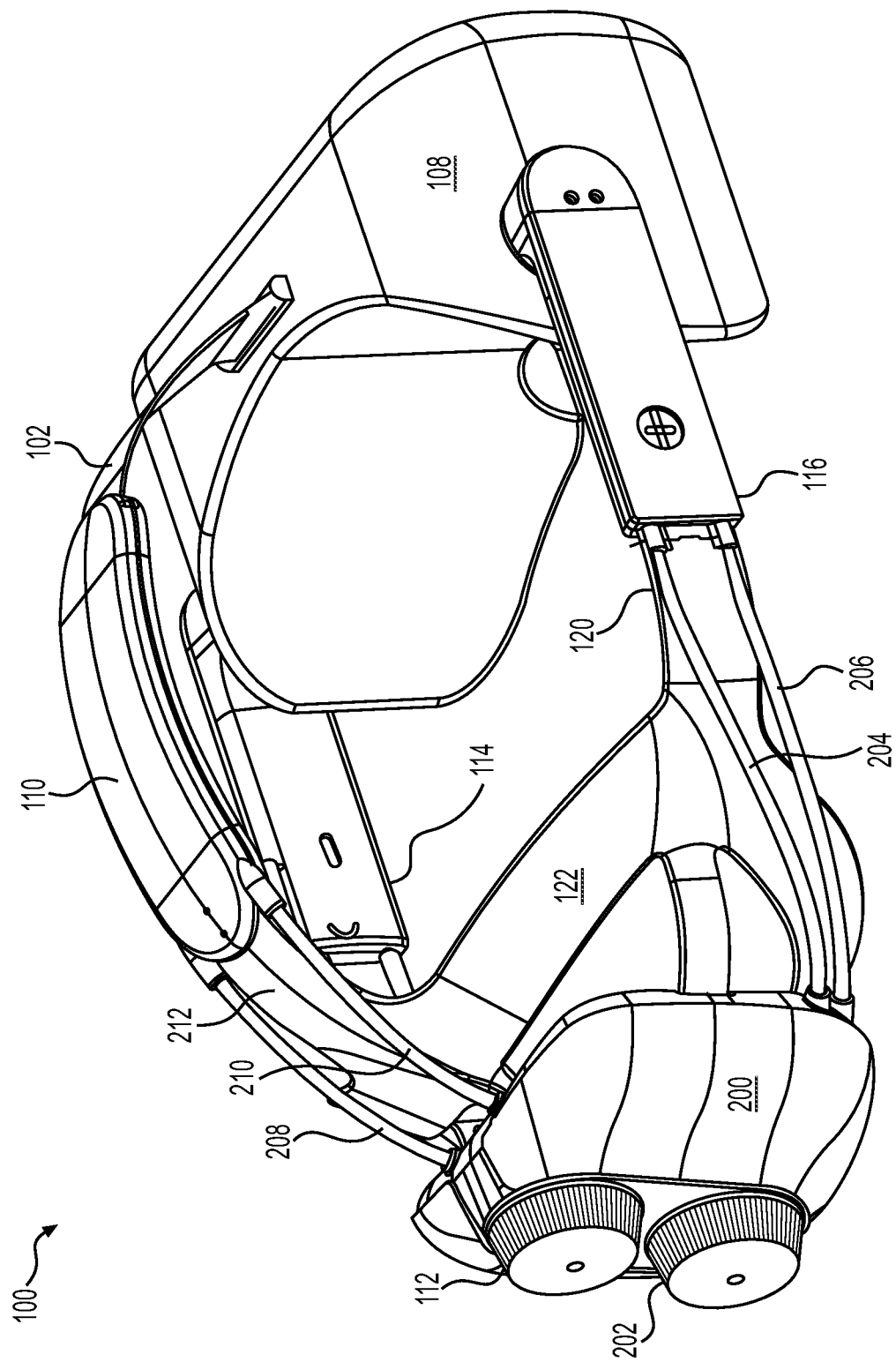
FIG. 2 illustrates a rear isometric view of the head-mounted display of FIG. 1, according to an embodiment of the present disclosure.

FIG. 2 illustrates a rear isometric view of the HMD 100. The back 106 of the HMD 100 is shown including a rear housing 200. The rear housing 200 may house various components of the HMD 100, such as battery(ies), antenna(s), processor(s), printed circuit boards (PCBs), etc. Additionally, the rear housing 200 is shown including the first actuator 112 and a second actuator 202. As shown, and in some instances, the first actuator 112 may be disposed vertically above the second actuator 202.

Within the rear housing 200, the first actuator 112 may engage with a cabling mechanism of the top member 102 and the second actuator 202 may engage with cabling mechanisms of the first lateral member 114 and/or the second lateral member 116, respectfully. Introduced above, the first actuator 112 and the top member 102 may be used to vertically adjust the HMD 100 on the user, or relative to the eyes of the user, while the second actuator 202 may be used to tighten and loosen the HMD 100. Additionally, the rear harness 122 may include the first lateral arm 118 and the second lateral arm 120 that engage with or within the first lateral member 114 and the second lateral member 116, respectively. In some instances, the first lateral member 114 and the second lateral member 116 may slide over the first lateral arm 118 and the second lateral arm 120, respectively.

The HMD 100 may include various tubes for routing or channeling cables of the cabling mechanisms. For example, a first tube 204 and a second tube 206 are shown routing from the rear housing 200 to the second lateral member 116. The first tube 204 and the second tube 206 may channel respective cables that are used to extend and retract the second lateral member 116 from the second lateral arm 120. Although not shown in FIG. 2, tubes may similarly connect to the first lateral member 114 for channeling cables that are used to extend and retract the first lateral member 114 from the first lateral arm 118.

Similarly, a third tube 208 and a fourth tube 210 are shown routing from the rear housing 200 to the sleeve 110. The third tube 208 and the fourth tube 210 may channel respectively cables that are used to extend and retract the top member 102 from the sleeve 110. These cables may engage with the top member 102, the sleeve 110, and/or a top arm 212. In some instances, the top arm 212 may couple to or engage the sleeve 110. Here, similar to the first lateral arm 118 and the second lateral arm 120, the rear harness 122 may include the top arm 212 that extends into the sleeve 110. The top arm 212 may similarly engage with the top member 102 as discussed above with regard to the first lateral member 114 and the first lateral arm 118, for example, to extend and retract at varying lengths.

Figure 3:
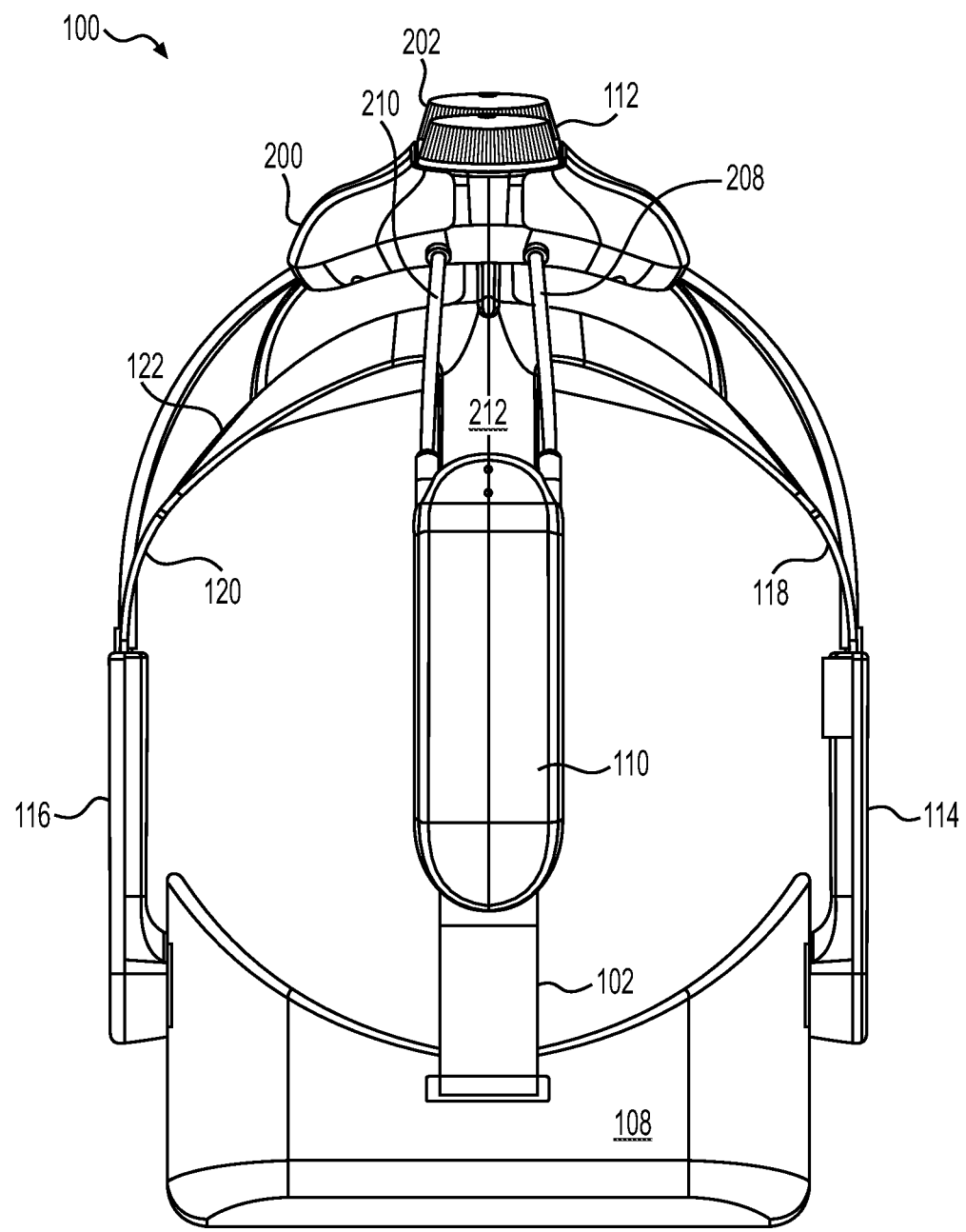
FIG. 3 illustrates a top view of the head-mounted display of FIG. 1, according to an embodiment of the present disclosure.

FIG. 3 illustrates a top view of the HMD 100, showing the top member 102 extending from the front 104 towards the back 106 and into the sleeve 110. Similarly, the first lateral member 114 and the second lateral member 116 may extend around lateral sides of the HMD 100 for engaging with the first lateral arm 118 and the second lateral arm 120, respectively. The rear harness 122 is shown extending from the back 106 to engage the head of the user. In some instances, the rear housing 200 may couple to the rear harness 122. Additionally, the third tube 208 and the fourth tube 210 are shown routing between the rear housing 200 and the sleeve 110 for channeling cables that adjust the vertical position of the display housing 108 on the user.

Figure 4:
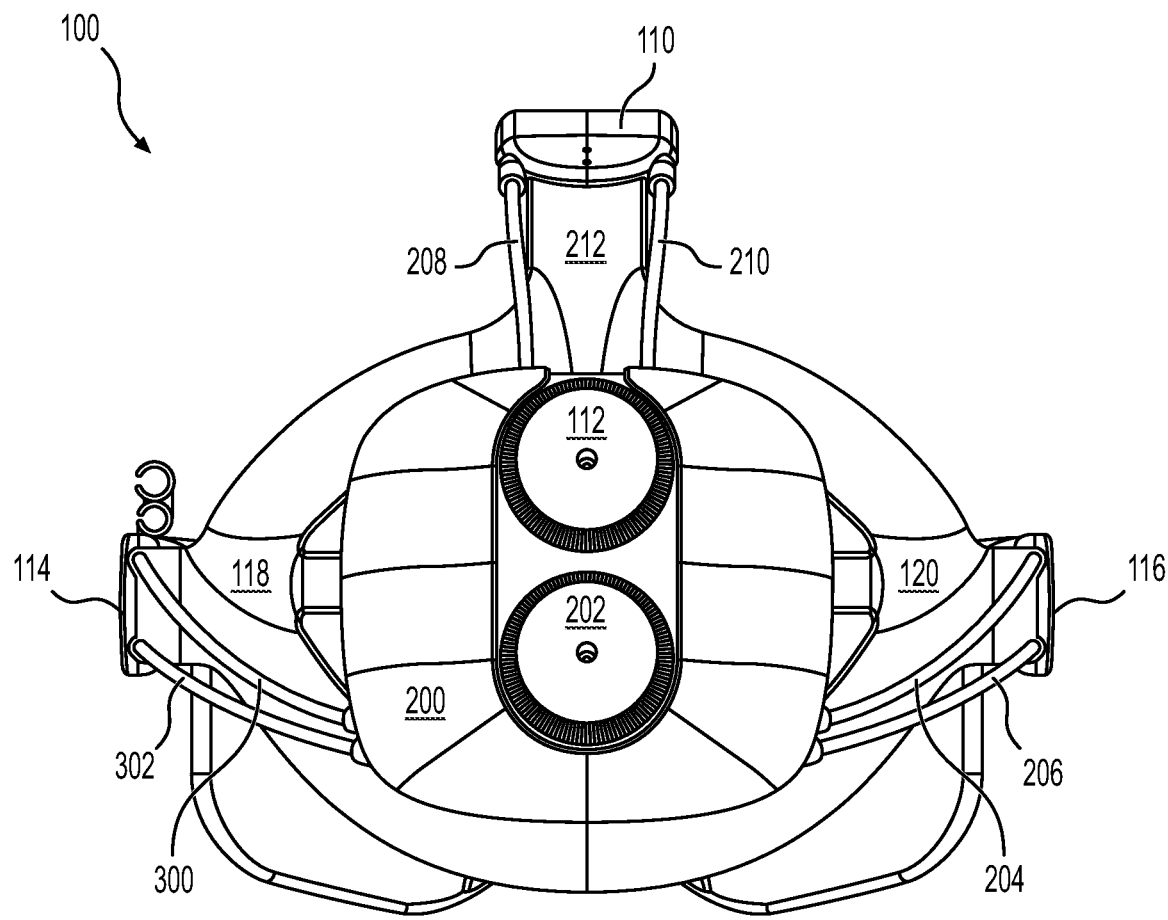
FIG. 4 illustrates a rear view of the head-mounted display of FIG. 1, according to an embodiment of the present disclosure.

FIG. 4 illustrates a rear view of the HMD 100. The first tube 204 and the second tube 206 are shown extending from the second lateral member 116, from a right-hand side of the HMD 100, and towards the back 106 into the rear housing 200. Similarly, a fifth tube 300 and a sixth tube 302 are shown extending from the first lateral member 114, from a left-hand side of the HMD 100, and towards the back 106 into the rear housing. The fifth tube 300 and the sixth tube 302 may house respectively cables for extending and retracting the first lateral member 114. The first lateral arm 118 and the second lateral arm 120 are further shown extending around sides of HMD 100 and into the first lateral member 114 and the second lateral member 116, respectively.

Further, the third tube 208 and the fourth tube 210 are shown extending from the sleeve 110, from a top of the HMD 100, towards the back 106 and into the rear housing 200. The top arm 212 is also shown extending into the sleeve 110 for engaging with the cabling mechanisms to increase or decrease an exposed length of the top member 102 from the sleeve 110.

In some instances, the first lateral member 114 and the second lateral member 116 may extend and retract in unison via an actuation of the second actuator 202. Additionally, the engagement between the first lateral member 114 and the first lateral arm 118, as well as the second lateral member 116 and the second lateral arm 120, may couple the front 104 and the back 106 of the HMD 100.

Figure 5A:
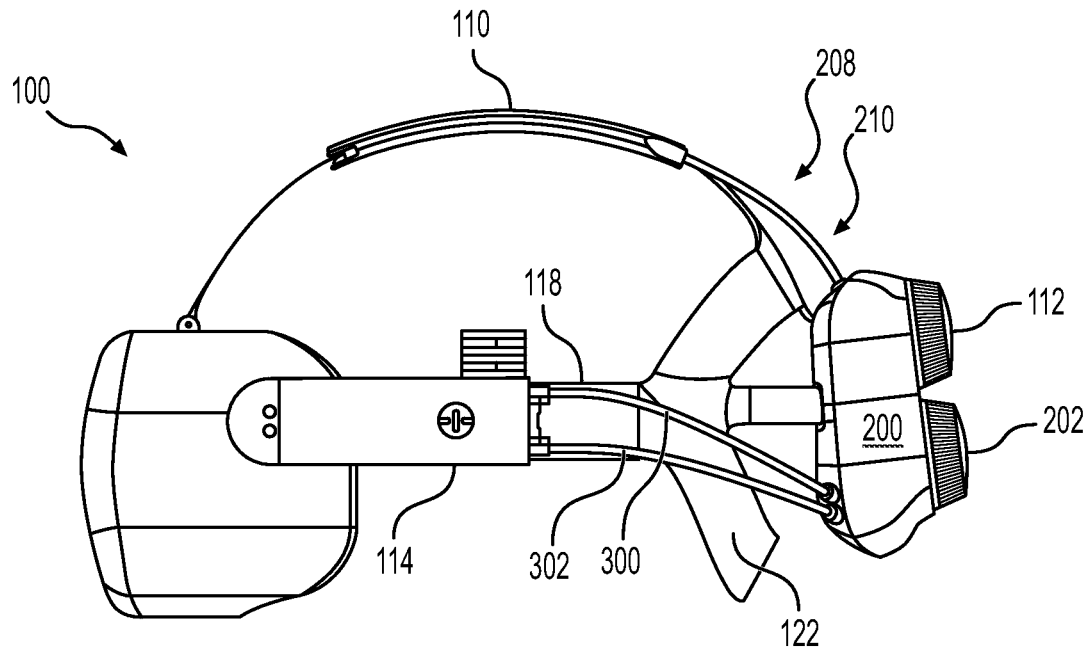
FIG. 5A illustrates a first side view of the head-mounted display of FIG. 1, according to an embodiment of the present disclosure.
Figure 5B:
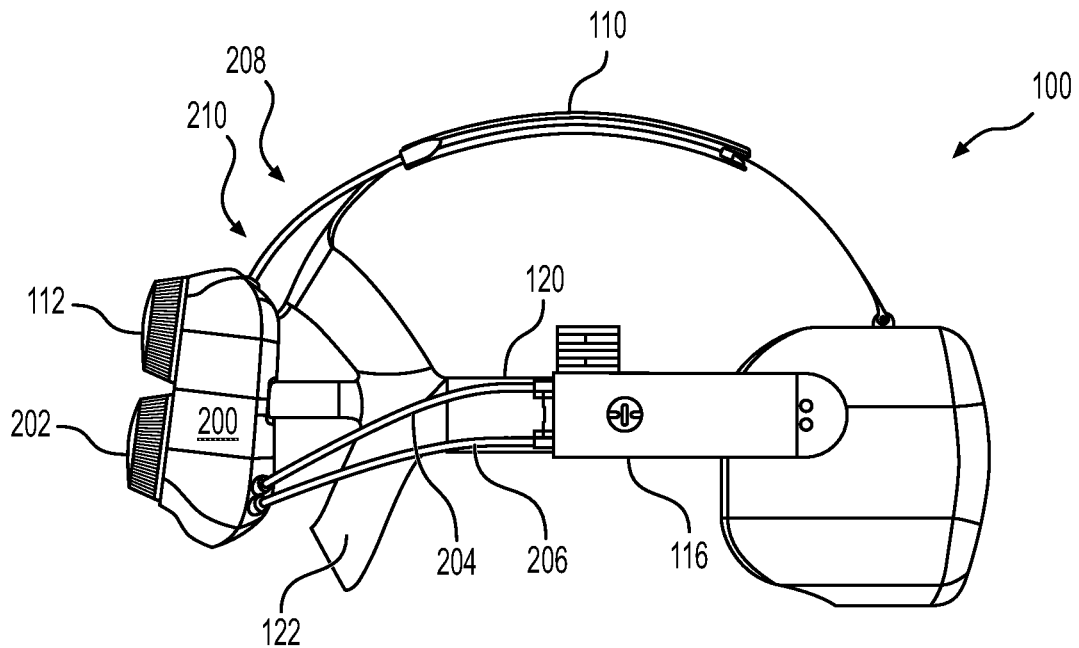
FIG. 5B illustrates a second side view of the head-mounted display of FIG. 1, according to an embodiment of the present disclosure.

FIGS. 5A and 5B illustrate a first side view and a second side view of the HMD 100, respectively. As shown in FIG. 5A, the fifth tube 300 and the sixth tube 302 extend from the first lateral member 114 to the rear housing 200. Cables within the fifth tube 300 and the sixth tube 302 may engage with the second actuator 202. In FIG. 5B, the first tube 204 and the second tube 206 extend from the second lateral member 116 to the rear housing 200. Cables within the first tube 204 and the second tube 206 may engage with the second actuator 202. Depending on the direction of actuation of the second actuator 202, the first lateral member 114 may extend from or retract over the first lateral arm 118 and the second lateral member 116 may extend from or retract over the second lateral arm 120.

Similarly, the third tube 208 and the fourth tube 210 extend from the sleeve 110 to the rear housing 200. Cables within the third tube 208 and the fourth tube 210 may engage with the first actuator 112. Depending on the direction of actuation of the first actuator 112, the top member 102 may extend from or retract from the sleeve 110 at varying lengths.

The rear harness 122 may extend from the rear housing 200 so as to cusp the rear of the head when the HMD 100 is worn. In some instances, the rear harness 122 may include a pad that rests on top of the head of the user. The rear harness 122 may also be spring-loaded or tensioned to conform to different head ergonomics.

Figure 6A:
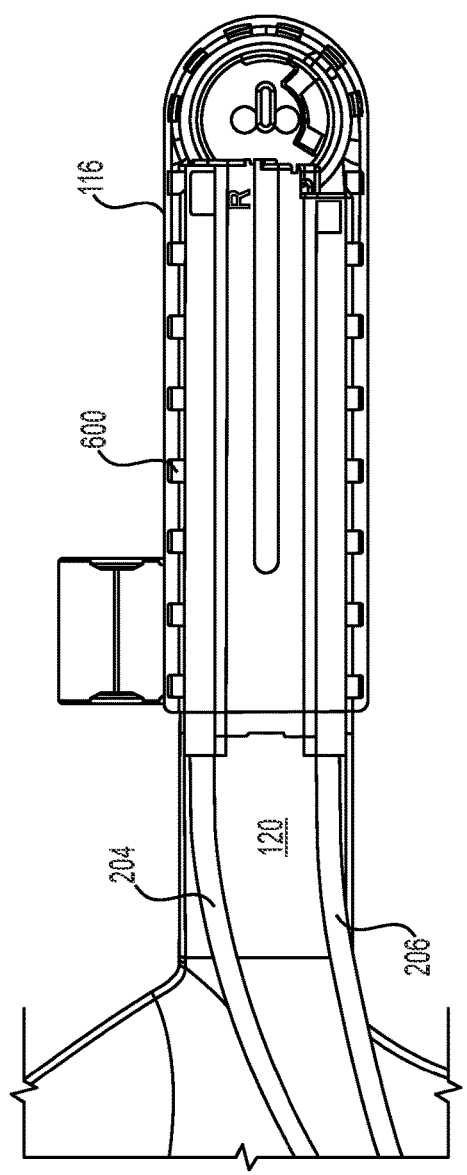
FIG. 6A illustrates an example member of the head-mounted display of FIG. 1 in a retracted state, according to an embodiment of the present disclosure.
Figure 6B:
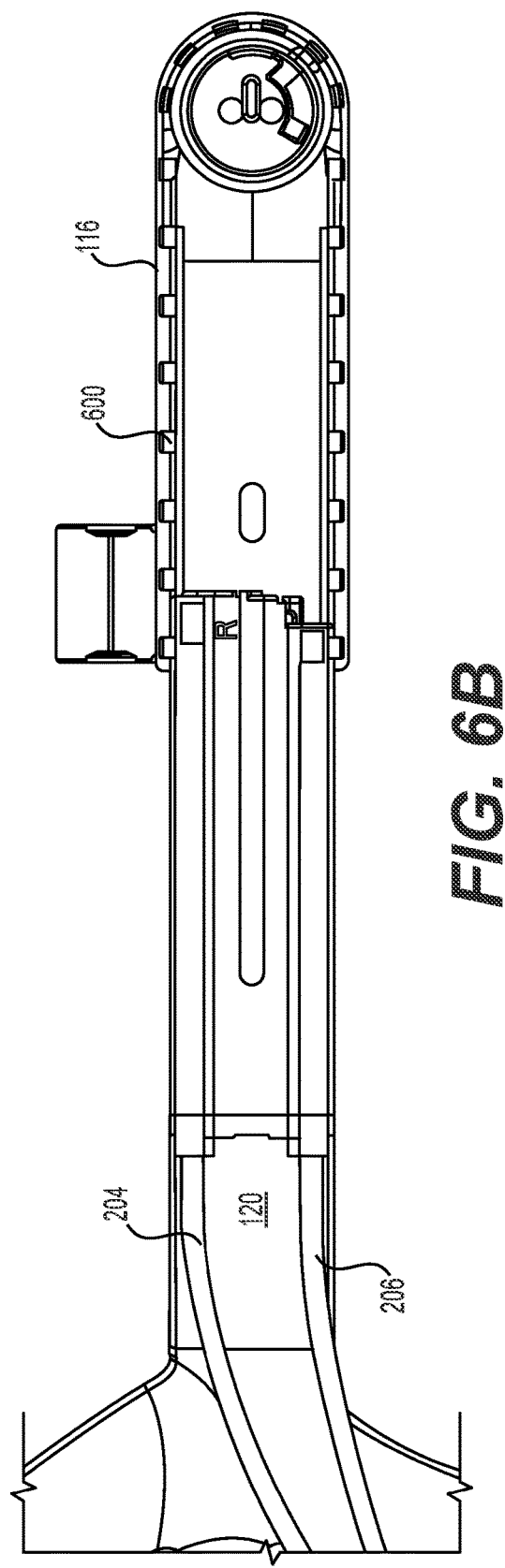
FIG. 6B illustrates the member of FIG. 6A in an extended state, accordingly to an embodiment of the present disclosure.

FIGS. 6A and 6B illustrate side views of the HMD 100, showing the second lateral member 116 in a fully retracted state and a fully extended state, respectively. In FIGS. 6A and 6B, the second lateral member 116 is shown being transparent to illustrate the engagement with the second lateral arm 120. Although the discussion herein relates to the second lateral member 116, it is to be understood that the first lateral member 114 and the first lateral arm 118 may operate in a similar fashion.

Beginning with FIG. 6A, the second lateral member 116 is shown fully retracted over the second lateral arm 120. Tightening the HMD 100 via the second actuator 202 may cause an exposed length of the second lateral arm 120 to decrease. The second lateral member 116 may slide over the second lateral arm 120, or stated alternatively, the second lateral arm 120 may be received within the second lateral member 116. In such instances, the second lateral member 116 and the second lateral arm 120 may be in sliding relationship. However, in some instances, the second lateral member 116 and the second lateral arm 120 may slide alongside one another, within one another, and so forth. For example, the second lateral arm 120 may be configured to slide within the second lateral member 116 via a track system, or mechanisms of the second lateral member 116 and/or the second lateral arm 120 that engage to allow for sliding motion.

To position or receive the second lateral arm 120, the second lateral member 116 may include tabs or other channels. For example, as shown the second lateral member 116 may include a plurality of channels 600 within which the second lateral arm 120 is configured to slide. The channels 600 may represent U-shaped channels that are shaped for receiving sides, ends, or edges of the second lateral arm 120. As shown, the second lateral member 116 may include one or more channels 600 disposed at the top and/or the bottom of the second lateral member 116. In some instances, the channels 600 may serve to align the second lateral arm 120 within the second lateral member 116.

In FIG. 6B, the second lateral member 116 is shown fully extended from the second lateral arm 120. Extending the second lateral member 116 exposes a greater length of the second lateral arm 120. That is, loosening the HMD 100 may cause an exposed length of the second lateral arm 120 to increase. In some instances, the second lateral member 116 may be configured to extend between 0 millimeters (mm) and 65 mm relative to the second lateral arm 120.

The first tube 204 and the second tube 206 are further shown routing cables within the second lateral member 116 and/or along the second lateral arm 120.

Figure 7A:
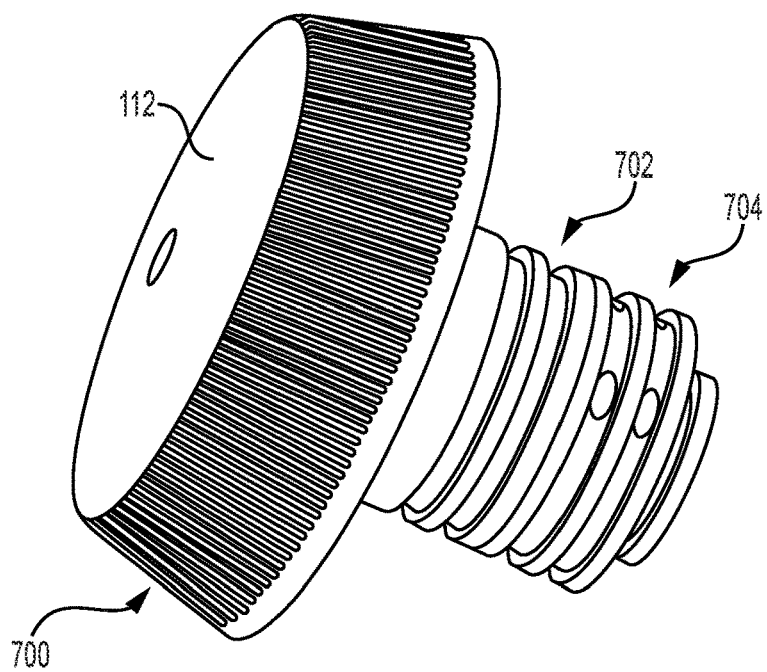
FIG. 7A illustrates a first isometric view of an example actuator of the head-mounted display of FIG. 1, according to an embodiment of the present disclosure.
Figure 7B:
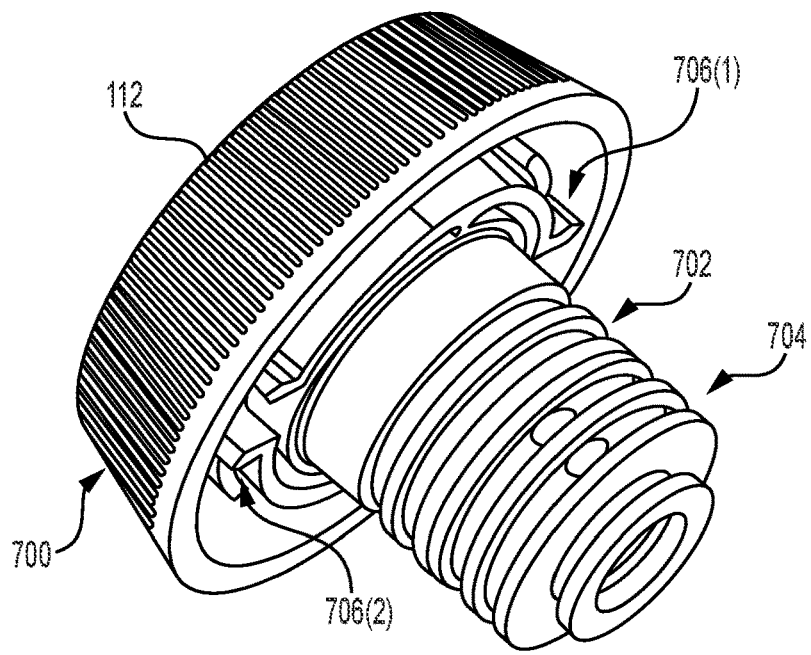
FIG. 7B illustrates a second isometric view of the actuator of FIG. 7A, according to an embodiment of the present disclosure.

FIGS. 7A and 7B illustrate the first actuator 112. Although the discussion herein relates to the first actuator 112, and describes components of the first actuator 112, it is to be understood that the second actuator 202 may include similar components.

The first actuator 112 includes a knob 700 capable of being gripped and actuated by the user. For example, the knob 700 may include ridges or grooves for gripping and being rotated by the user. The first actuator 112 further includes reels for engaging with cables of the cabling mechanism. For example, the first actuator 112 may include an extend reel 702 and a retract reel 704. The extend reel 702 and the retract reel 704 may represent spools for taking up cables of the cabling mechanism associated with adjusting the vertical position of the display housing 108. In some examples, the extend reel 702 may include a spool for receiving a first cable that corresponds to an extension cable. The retract reel 704 may include a second spool for receiving a second cable that corresponds to a retraction cable. The extend reel 702 and the retract reel 704 may be coupled to the knob 700 such that during a rotation of the knob 700, the extend reel 702 and the retract reel 704 rotate.

When the first actuator 112 actuates, depending on the direction of actuation, the cables around the extend reel 702 and the retract reel 704 may spool and unspool. For example, in instances where the first actuator 112 actuates to lower the display housing 108 (e.g., clockwise), the first cable is taken up by the extend reel 702. Discussed herein, pulleys within the top member 102, the sleeve 110, and/or about the top arm 212 may create a pulling motion to lower the display housing 108. At the same time, the retract reel 704 may introduce slack into the second cable to allow the first cable to be taken up by the extend reel 702.

To permit this operation, the first cable and the second cable may be wound around the extend reel 702 and the retract reel 704 in opposite directions. For example, the first cable may be wound around the extend reel 702 in a first direction (e.g., clockwise) and the second cable may be wound around the retract reel 704 is a second direction. As such, during take up of the first cable, the second cable may be unwound to allow for the display housing 108 to lower. Conversely, in instances where the first actuator 112 actuates to raise the display housing 108 (e.g., counterclockwise), the second cable is taken up by the retract reel 704. At the same time, the extend reel 702 may introduce slack into the first cable to allow the second cable to be taken up by the retract reel 704 (given the different winding directions of the first cable and the second table). As such, during take up of the second cable, the first cable may be unwound to allow for the display housing 108 to raise.

The knob 700 is further shown including a ratchet mechanism including a first ratchet arms 706(1) and a second ratchet arms 706(2). The first ratchet arms 706(1) and the second ratchet arms 706(2) may be disposed on an underneath side of the knob 700. In some instances, each of the first ratchet arms 706(1) and the second ratchet arms 706(2) may include two arms radially extending outward. Additionally, the first ratchet arms 706(1) and the second ratchet arms 706(2) may be diametrically opposed from one another. The first ratchet arms 706(1) and the second ratchet arms 706(2) may include arms (e.g., teeth) that engage with teeth of the rear housing 200. That is, once the first actuator 112 couples to the rear housing 200, the first ratchet arms 706(1) and the second ratchet arms 706(2) may mate with teeth of the rear housing 200. This engagement may provide a ratchet-like operation to allow the user to rotate the first actuator 112. Additionally, the engagement between the first ratchet arms 706(1) and the second ratchet arms 706(2) with the teeth of the rear housing 200 may prevent backdrive of the first actuator 112.

Figure 8:
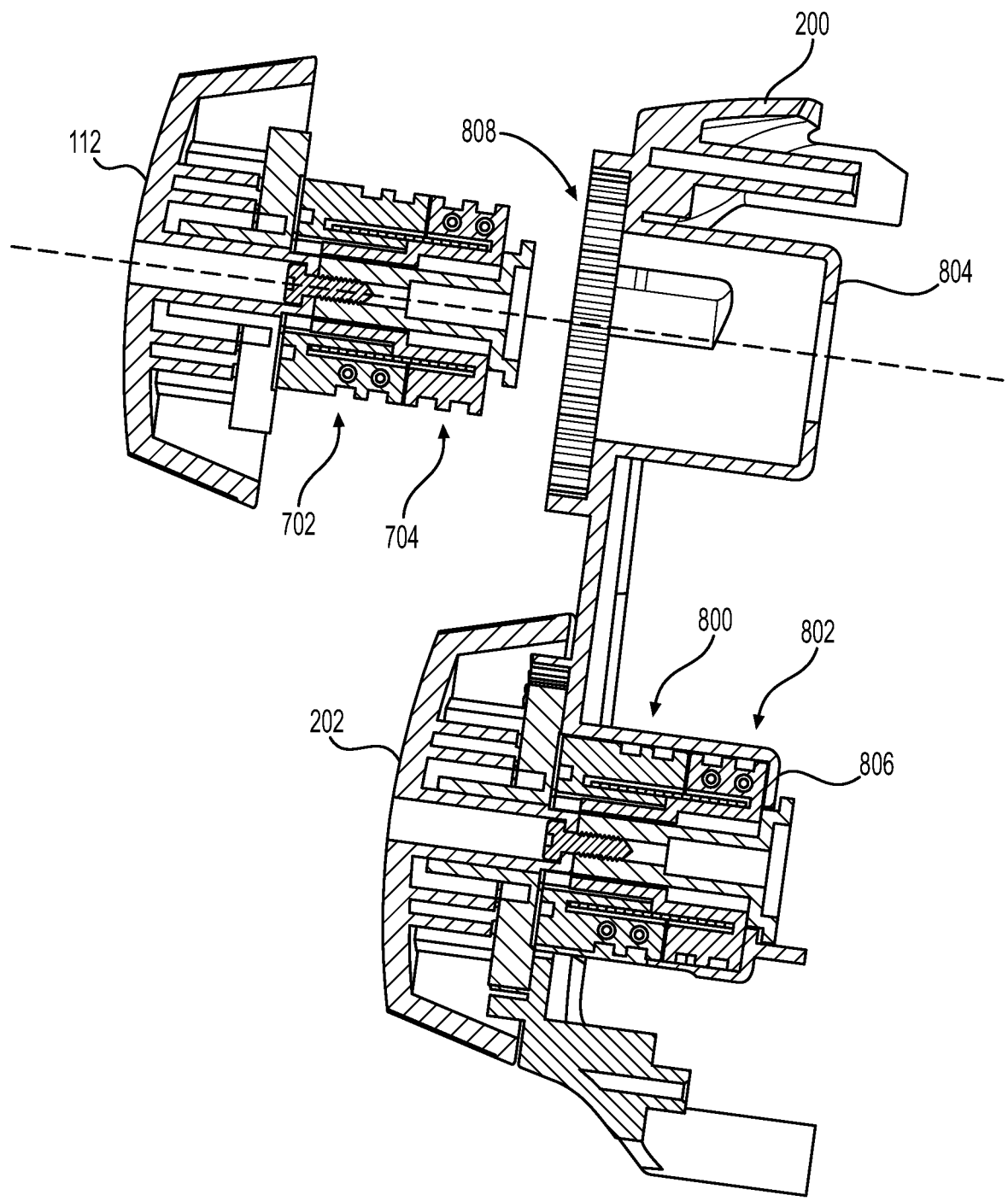
FIG. 8 illustrates a side view of an example actuator disposed within a housing of the head-mounted display of FIG. 1, according to an embodiment of the present disclosure.

FIG. 8 illustrates an engagement between the first actuator 112 and the second actuator 202 with the rear housing 200. As noted above in FIGS. 7A and 7B, the second actuator 202 may have similar components as the first actuator 112, such as an extend reel 800 and a retract reel 802 for winding/unwinding cables. In FIG. 8, the first actuator 112 is shown disposed away from the rear housing 200 while the second actuator 202 is shown residing within the rear housing 200.

The rear housing 200 includes cavities, pockets, or receptacles for receiving the first actuator 112 and the second actuator 202. For example, the first actuator 112 may reside within a first receptacle 804 and the second actuator 202 is shown residing within a second receptacle 806. When coupled to the rear housing 200, the extend reels and the retract reels may reside within the first receptacle 804 and the second receptacle 806, respectively.

Proximal to openings of the first receptacle 804 and the second receptacle 806, the rear housing 200 may include ratchet teeth 808. The ratchet teeth 808 may be disposed in a circular manner around openings to the first receptacle 804 and the second receptacle 806. The ratchet teeth 808 may be complimentary to engage with the first ratchet arms 706(1) and the second ratchet arms 706(2) of the first actuator 112. First and second ratchet arms of the second actuator 202 may similarly engage with ratchet teeth disposed around the second receptacle 806.

Figure 9:
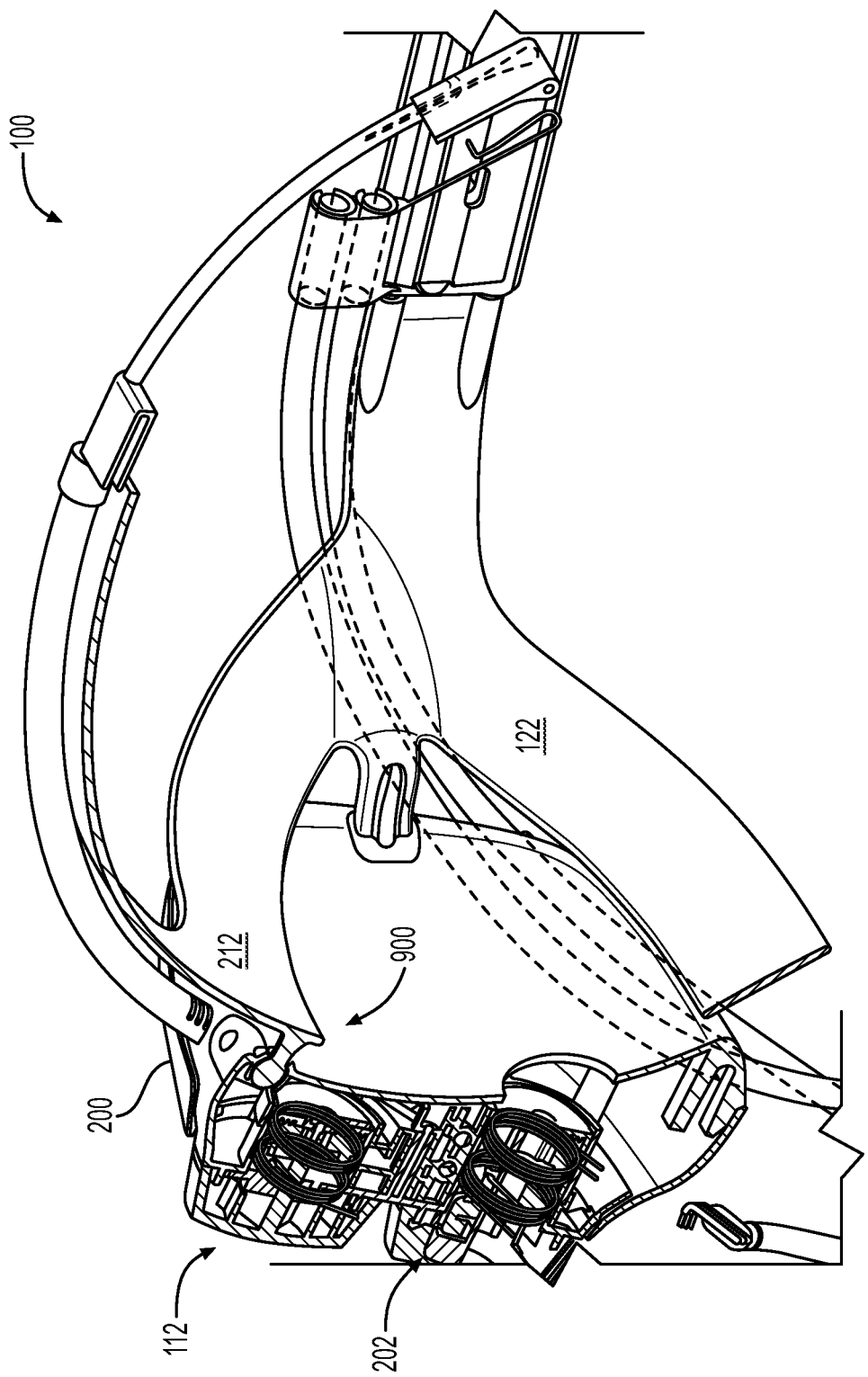
FIG. 9 illustrates an isometric view showing an example rear harness of the head-mounted display of FIG. 1, according to an embodiment of the present disclosure.

FIG. 9 illustrates a transparent view of the HMD 100, showing the rear harness 122 engaged with the rear housing 200. As shown the top arm 212 may pivotably couple to the rear housing 200 via a ball joint 900. In some examples, a ball portion of the ball joint 900 may extend from, or be a component of, the top arm 212. A socket portion of the ball joint 900 may be a component of the rear housing 200. A coupling of the ball portion within the socket portion may form the ball joint 900. The coupling of the top arm 212 to the rear housing 200 via the ball joint 900 may assist in conforming the rear harness 122 to the head of the user. For example, the ball joint 900 may pivot the rear harness 122 in certain directions and/or axes to firmly secure the HMD 100 to the user.

Figure 10A:
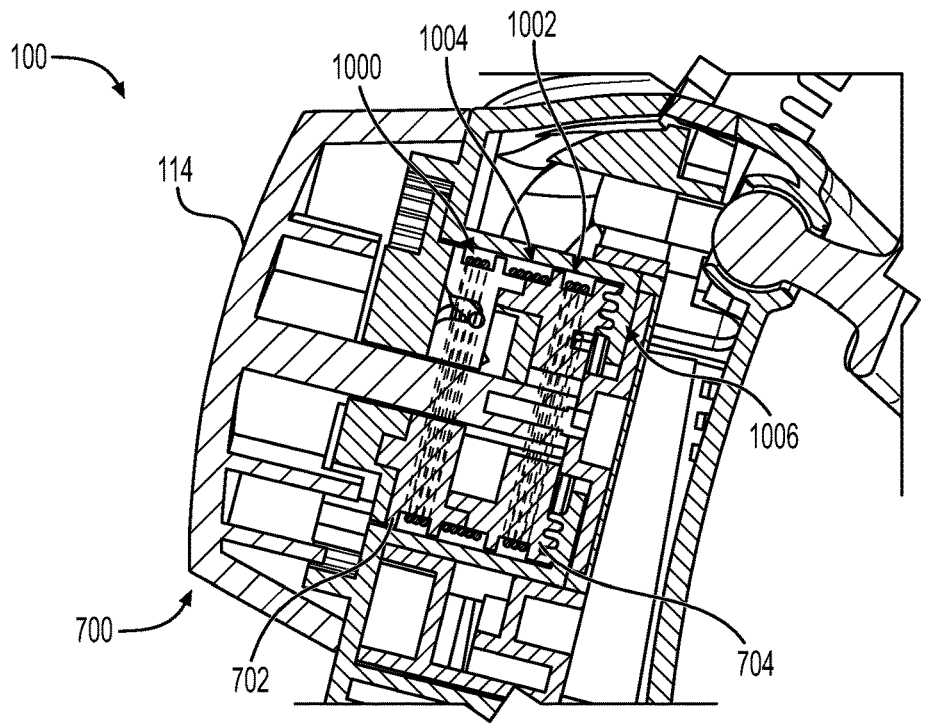
FIG. 10A illustrates a first actuator of the head-mounted display of FIG. 1 engaging one or more cables for adjusting a vertical position of the head-mounted display on a user, according to an embodiment of the present disclosure.
Figure 10B:
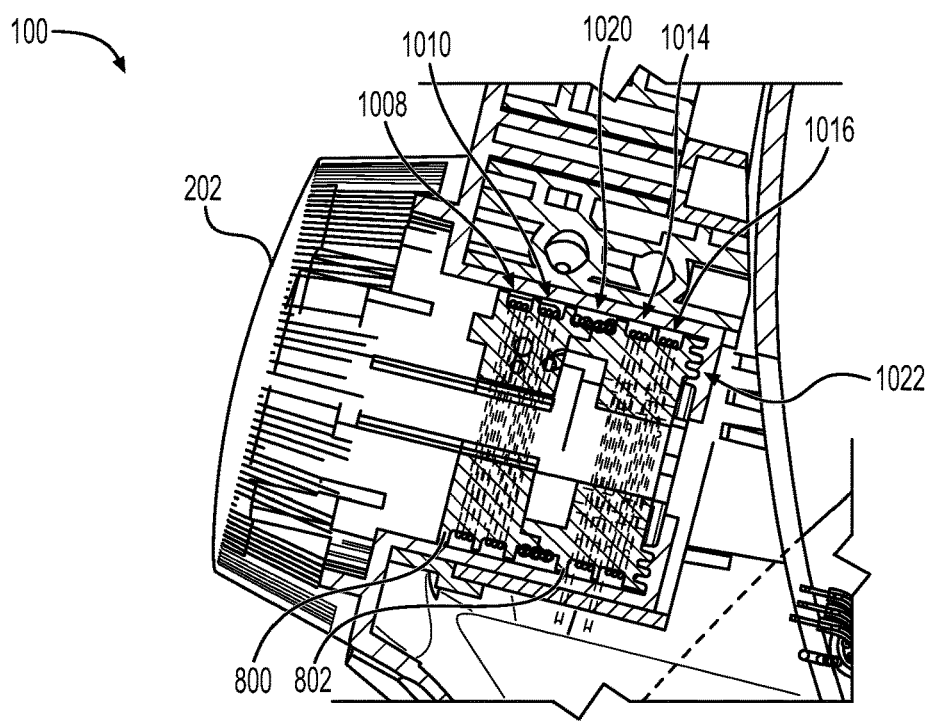
FIG. 10B illustrates a second actuator of the head-mounted display of FIG. 1 engaging one or more cables for adjusting a tightness of the head-mounted display on a user, according to an embodiment of the present disclosure.

FIGS. 10A and 10B illustrate transparent views of cables routing around reels of the first actuator 112 and the second actuator 202, respectively.

Beginning with FIG. 10A, the extend reel 702 and the retract reel 704 are shown residing within the first receptacle 804. A first cable 1000 is shown being wound, spooled, or wrapped around the extend reel 702. The first cable 1000 may correspond to an extension cable such that when the first cable 1000 is pulled, the display housing 108 may lower on the face of the user. In other words, the first cable 1000 may be pulled to loosen a fit of the HMD 100. In some instances, the first cable 1000 may be wound around the extend reel 702 in a first direction, such as clockwise.

A second cable 1002 is shown being wound, spooled, or wrapped around the retract reel 704. The second cable 1002 may correspond to an retraction cable such that when the second cable 1002 is pulled, the display housing 108 may raise on the face of the user. In other words, the second cable 1002 may be pulled to tighten a fit of the HMD 100. In some instances, the second cable 1002 may be wound around the retract reel 704 in a second direction, such as counterclockwise.

A wrap spring 1004 is shown operably coupling the extend reel 702 and the retract reel 704. As shown, the wrap spring 1004 may engage the extend reel 702 and the retract reel 704, at a location in between the first cable 1000 and the second cable 1002. In some instances, the wrap spring 1004 may be coupled to the extend reel 702 and/or the retract reel 704. The wrap spring 1004 may lock during an actuation of the first actuator 112 to lower the display housing 108. For example, the rotation of the knob 700 in a first direction associated with raising the display housing 108 may cause the wrap spring 1004 to tighten around the retract reel 704 and pull on the second cable 1002. When rotated in an opposite direction, the wrap spring 1004 may not engage the retract reel 704 but may lower the display housing 108 via the first cable 1000. Depending on the direction of rotation, springs and/or pulleys may take up slack.

The first actuator 112, the extend reel 702, and/or the retract reel 704 may further include tabs, protrusions, annuluses, or other features for physically separating the first cable 1000, the second cable 1002, and the wrap spring 1004. These features may prevent the first cable 1000, the second cable 1002, and the wrap spring 1004 becoming entangled. Additionally, these features may assist in guiding the first cable 1000 and/or the second cable 1002 during spooling and unspooling. A viscous clutch 1006 may further be included to overcome a slip torque and prevent the retract reel 704 from spinning with the extend reel 702.

Moving to FIG. 10B, a third cable 1008 and a fourth cable 1010 are shown wrapped around the extend reel 800 of the second actuator 202. The third cable 1008 and the fourth cable 1010 may correspond to extension cables that when pulled, cause the HMD 100 to loosen from the user. In other words, the third cable 1008 and the fourth cable 1010 may be pulled to loosen a fit of the HMD 100. In some instances, the third cable 1008 and the fourth cable 1010 may be wound around the extend reel 800 in a first direction, such as clockwise.

Being as the second actuator 202 may loosen sides of the HMD 100 in unison, or simultaneously, the extend reel 800 may operably couple to a cable for loosening the first lateral member 114 (e.g., the third cable 1008) and a cable for loosening the second lateral member 116 (e.g., the fourth cable 1010). As shown, the third cable 1008 and the fourth cable 1010 may be separated by a divider for respectively routing to the first lateral member 114 and the second lateral member 116.

A fifth cable 1014 and a sixth cable 1016 are shown wrapped around the retract reel 802 of the second actuator 202. The fifth cable 1014 and the sixth cable 1016 may correspond to retraction cables that when pulled, cause the HMD 100 to tighten from the user. In other words, the fifth cable 1014 and the sixth cable 1016 may be pulled to tighten a fit of the HMD 100. In some instances, the fifth cable 1014 and the sixth cable 1016 may be wound around the retract reel 802 in a second direction, such as counterclockwise.

Being as the second actuator 202 may tighten sides of the HMD 100 in unison, or simultaneously, the retract reel 802 may operably couple to a cable for tightening the first lateral member 114 (e.g., the fifth cable 1014) and a cable for tightening the second lateral member 116 (e.g., the sixth cable 1016). As shown, the fifth cable 1014 and the sixth cable 1016 may be separated by a divider for respectively routing to the first lateral member 114 and the second lateral member 116.

A wrap spring 1020 is shown operably coupling the extend reel 800 and the retract reel 802. As shown, the wrap spring 1020 may engage the extend reel 800 and the retract reel 802, at a location in between the third cable 1008/fourth cable 1010 and the fifth cable 1014/sixth cable 1016. In some instances, the wrap spring 1020 may be coupled to the extend reel 800 and/or the retract reel 802. The wrap spring 1020 may lock during an actuation of the second actuator 202 to tighten the HMD 100 to the user. For example, during rotation of the second actuator 202 in a direction associated with tightening the HMD 100, the wrap spring 1020 may tighten around the retract reel 802 and pull on the fifth cable 1014 and the sixth cable 1016. When rotated in an opposite direction, the wrap spring 1020 may not engage the retract reel 802 but may loosen the HMD 100 via the third cable 1008 and the fourth cable 1010. Depending on the direction of rotation, springs and/or pulleys may take up slack. A viscous clutch 1022 may further be included to overcome a slip torque and prevent the retract reel 704 from spinning with the extend reel 702.

In some instances, the diameter ratio of the extend reel 702 (or the extend reel 800) and the retract reel 704 (or the retract reel 802) may be configured or designed to match the force ratio otherwise the first cable 1000 (or the third cable 1008 and the fourth cable 1010) and the second cable 1002 (or the fifth cable 1014 and the sixth cable 1016) may not spool at an equivalent rate. This may result in slack being introduced into the first cable 1000 or the second cable 1002. In some instances, the HMD 100 may have an equal force ratio (2:1 and 2:1) for the first cable 1000 (2:1) and the second cable 1002 (2:1) to allow the diameter of the extend reel 702 and the retract reel 704 to be the same size (1:1). If a difference in the force ratios exists (1:1 and 2:1) then the extend reel 702 and the retract reel 704 would also need to have a 2:1 ratio on their diameters.

FIG. 10C illustrates a simplified view of the first actuator 112, the wrap spring 1004, the extend reel 702, and the retract reel 704. As shown, the wrap spring 1004 may wrap around the extend reel 702 and the retract reel 704. The first cable 1000 may represent an extension cable that is coupled to the extend reel 702. As such, when the extend reel 702 is rotated, the extend reel 702 may take up the first cable 1000 to lower the display housing 108. The second cable 1002 may represent a retraction cable that is coupled to the retract reel 704. When the retract reel 704 is rotated, the retract reel 704 may take up the second cable 1002 to raise the display housing 108.

The first actuator 112 is further shown including a shaft 1024. The shaft 1024 and the extend reel 702 may be keyed together via an attachment 1026 (e.g., key slot, etc.). This attachment 1026 may transfer a rotational movement of the shaft 1024 to the extend reel 702.

During a lowering of the display housing 108, the extend reel 702 takes up slack in the second cable 1002 while the retract reel 704 may freewheel (e.g., rotate freely). When all slack in the second 1002 has been taken up, the top member 102 may start experiencing relative motion which starts pulling the second cable 1002 out of the retract reel 704. This is how slack is removed.

Conversely, during a raising of the display housing 108, the extend reel 702 and the retract reel 704 are directly coupled together by the wrap spring 1004. This means that the retract reel 704 spools the second cable 1002 until the cables reach a hard stop in the top member 102. In either case, the retract reel 704 continues to spool the second cable 1002. The extend reel 702 meanwhile unspools the first cable 1000.

The second actuator 202 may similarly spool and unspool the cables of the first lateral member 114 and the second lateral member 116 for tightening and loosening the HMD 100.

Figure 11:
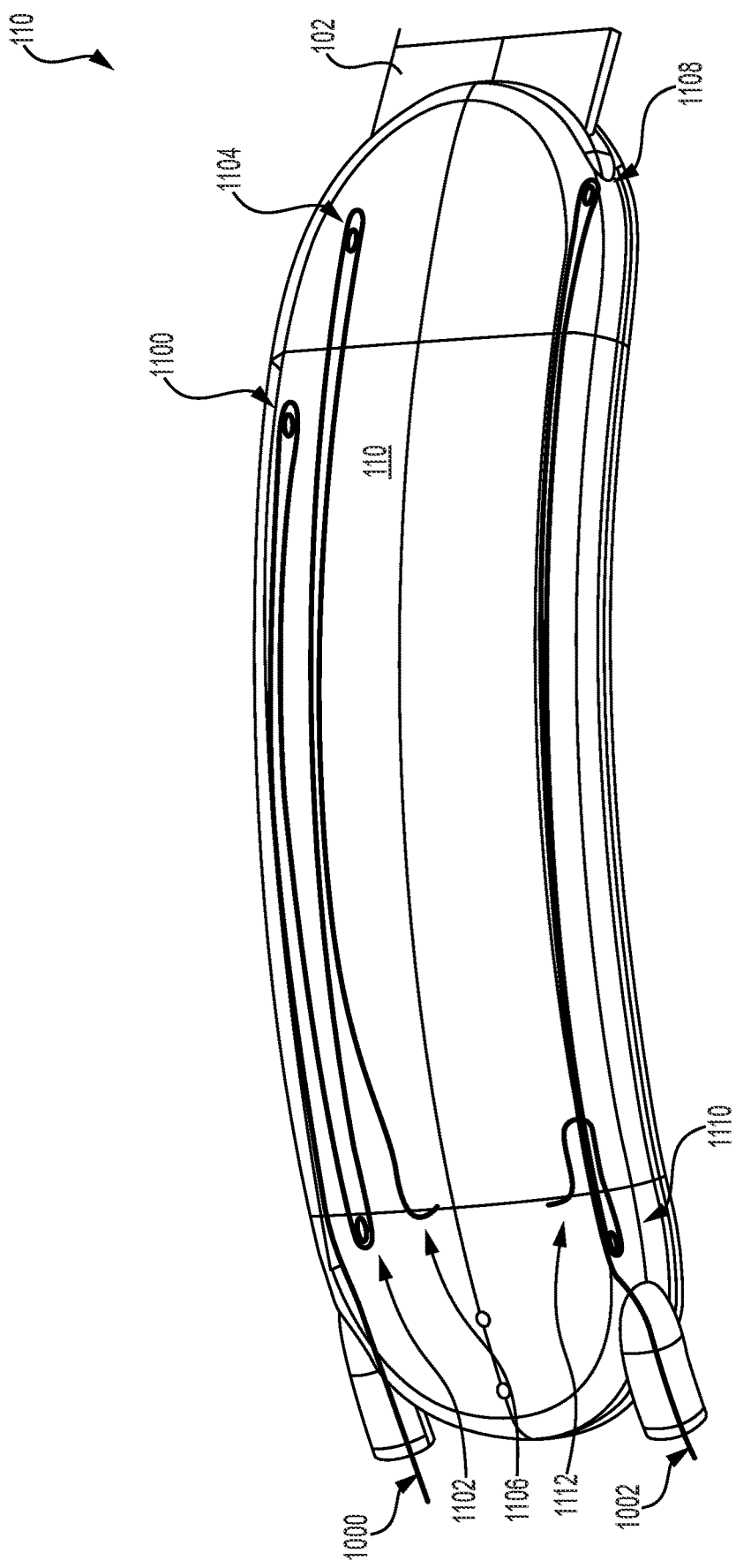
FIG. 11 illustrates one or more cables coupled to an example top member of the head-mounted display of FIG. 1 for adjusting a vertical position of the head-mounted display on a user, according to an embodiment of the present disclosure.
Figure 12:
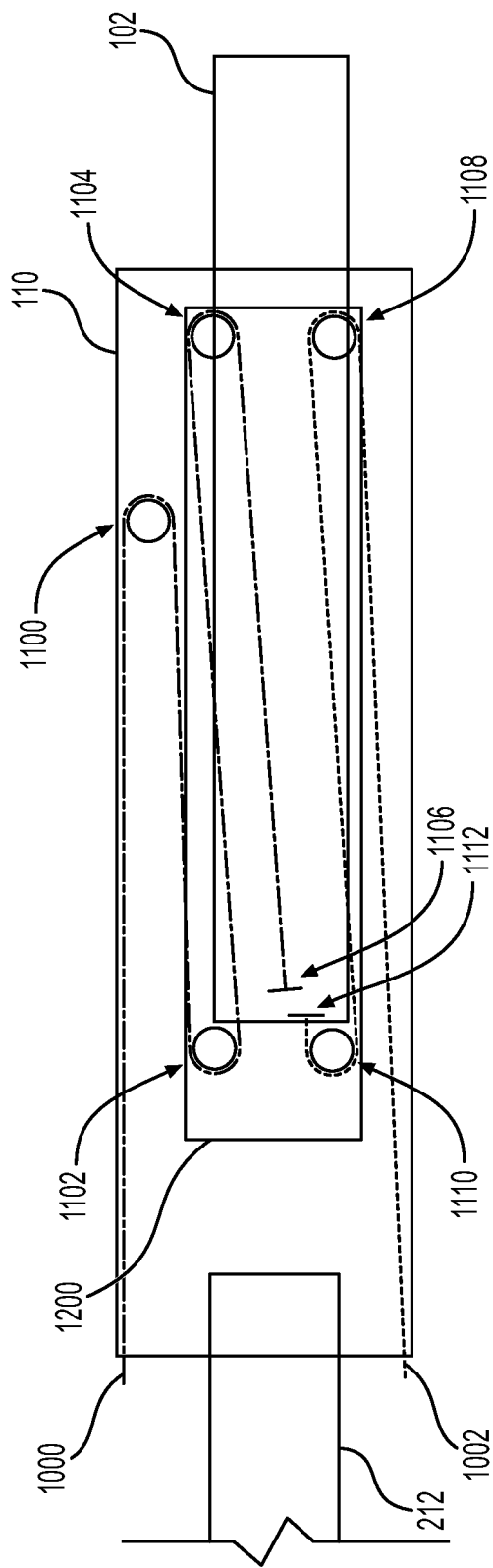
FIG. 12 illustrates an additional view showing the one or more cables of FIG. 11 for adjusting the vertical position, according to an embodiment of the present disclosure.

FIG. 11 illustrates a routing of cables within the top member 102, the sleeve 110, and/or an inner sleeve (shown in FIG. 12). As shown, one or more cables, such as the first cable 1000 and the second cable 1002 may be used for adjusting the HMD 100.

The first cable 1000 may route through the sleeve 110 around one or more pulleys, such as a first pulley 1100, a second pulley 1102, and a third pulley 1104. As shown, the first cable 1000 may enter the sleeve 110, wrap around the first pulley 1100, wrap around the second pulley 1102, and then wrap around the third pulley 1104. In some instances, the first pulley 1100 may be coupled to the sleeve 110, while the second pulley 1102 and the third pulley 1104 may be coupled to the inner sleeve. In some instances, and discussed herein, the first cable 1000 may couple or anchor to the top member 102 and/or the inner sleeve at a first position 1106. An opposite end of the first cable 1000 may operably couple to the first actuator 112 (or another actuator) and/or a spool engaged with the first actuator 112. For example, the first cable 1000 may engage with the extend reel 702 operably coupled to the first actuator 112.

In some instances, the first cable 1000 may correspond to a cable that, when pulled, causes the top member 102 to extend. In turn, the display housing 108 may vertically lower on the user. In such instances, the first cable 1000 may spool around the extend reel 702 when the first cable 1000 is pulled. For example, given the routing of the first cable 1000, pulling on the first cable 1000 may cause the top member 102 (and/or the inner sleeve) to extend further outward from the sleeve 110. Meanwhile, simultaneously, the second cable 1002 may unspool to provide the first cable 1000 with slack and allow the first cable 1000 to be pulled for extending top member 102 from the sleeve 110.

The second cable 1002 may route through the sleeve 110 around one or more pulleys, such as a fourth pulley 1108 and/or a fifth pulley 1110. In some instances, the fourth pulley 1108 and/or the fifth pulley 1110 may be coupled to the inner sleeve. Additionally, the second cable 1002 may anchor to the top member 102 at a second position 1112. An opposite end of the second cable 1002 may operably couple to the first actuator 112 (or another actuator) and/or the retract reel 704 engaged with the first actuator 112.

In some instances, the second cable 1002 may correspond to a retraction cable that, when pulled, causes the top member 102 to retract into the sleeve 110. In turn, the display housing 108 may vertically raise on the user. In such instances, the second cable 1002 may spool around the retract reel 704 when the second cable 1002 is pulled. Given the routing of the second cable 1002, for example, pulling on the second cable 1002 may cause the top member 102 and/or the inner sleeve to retract into the sleeve 110. Additionally, to provide pulling of the second cable 1002 (e.g., slack), the first cable 1000 may be unwound from the extend reel 702 to allow the second cable 1002 to spool around the retract reel 704.

The first cable 1000 and the second cable 1002 may route to the sleeve 110 within the third tube 208 and the fourth tube 210, respectively. That is, the first cable 1000 may be disposed within the third tube 208 disposed between the sleeve 110 and the rear housing 200. The second cable 1002 may be disposed within the fourth tube 210 disposed between the sleeve 110 and the rear housing 200.

FIG. 12 illustrates an additional view of the first cable 1000 and the second cable 1002 routed within the sleeve 110. As discussed above, the top member 102 is shown extending from the sleeve 110. Furthermore, the top member 102 may operably couple to an inner sleeve 1200. In some instances, the top member 102 may telescopically extend from and retract into the sleeve 110. In some instances, the HMD 100 may additionally include the top arm 212 and the top arm 212 may reside within a portion of the sleeve 110.

The first cable 1000 is shown being routed around pulleys, such as the first pulley 1100, the second pulley 1102, and/or the third pulley 1104. In some instances, the first pulley 1100, the second pulley 1102, and/or the third pulley 1104 may couple to the top member 102, the sleeve 110, and/or the inner sleeve 1200. For example, the first pulley 1100 may couple to the sleeve 110, while the second pulley 1102 and the third pulley 1104 may couple to the inner sleeve 1200. In doing so, the first cable 1000 may route within the sleeve 110, around the first pulley 1100, around the second pulley 1102, and then around the third pulley 1104. Additionally, the first cable 1000 is shown being anchored to the top member 102, for example, at the first position 1106. An opposite end of the first cable 1000 may operably couple to the first actuator 112 via the extend reel 702.

The second cable 1002 is shown being routed around pulleys, such as the fourth pulley 1108 and the fifth pulley 1110. The fourth pulley 1108 and/or the fifth pulley 1110 may be coupled to the inner sleeve 1200. As shown, the second cable 1002 may route within the sleeve 110, around the fourth pulley 1108 and then around the fifth pulley 1110. Additionally, in some instances, the second cable 1002 may anchor to the top member 102 at the second position 1112. An opposite end of the second cable 1002 may operably couple to the first actuator 112 via the retract reel 704.

The routing of the first cable 1000 and the second cable 1002 within the top member 102, the sleeve 110, and/or the inner sleeve 1200, as well as about the pulleys, may effectuate to vertically adjust the HMD 100 on the user. That is, the first cable 1000 and the second cable 1002 may be pulled to vertically lower and raise the HMD 100, respectively. In some instances, the first pulley 1100, the second pulley 1102, the third pulley 1104, the fourth pulley 1108, and/or the fifth pulley 1110 may be idler pulleys for guiding and tensioning the first cable 1000 and/or the second cable 1002, respectively.

Figure 13:
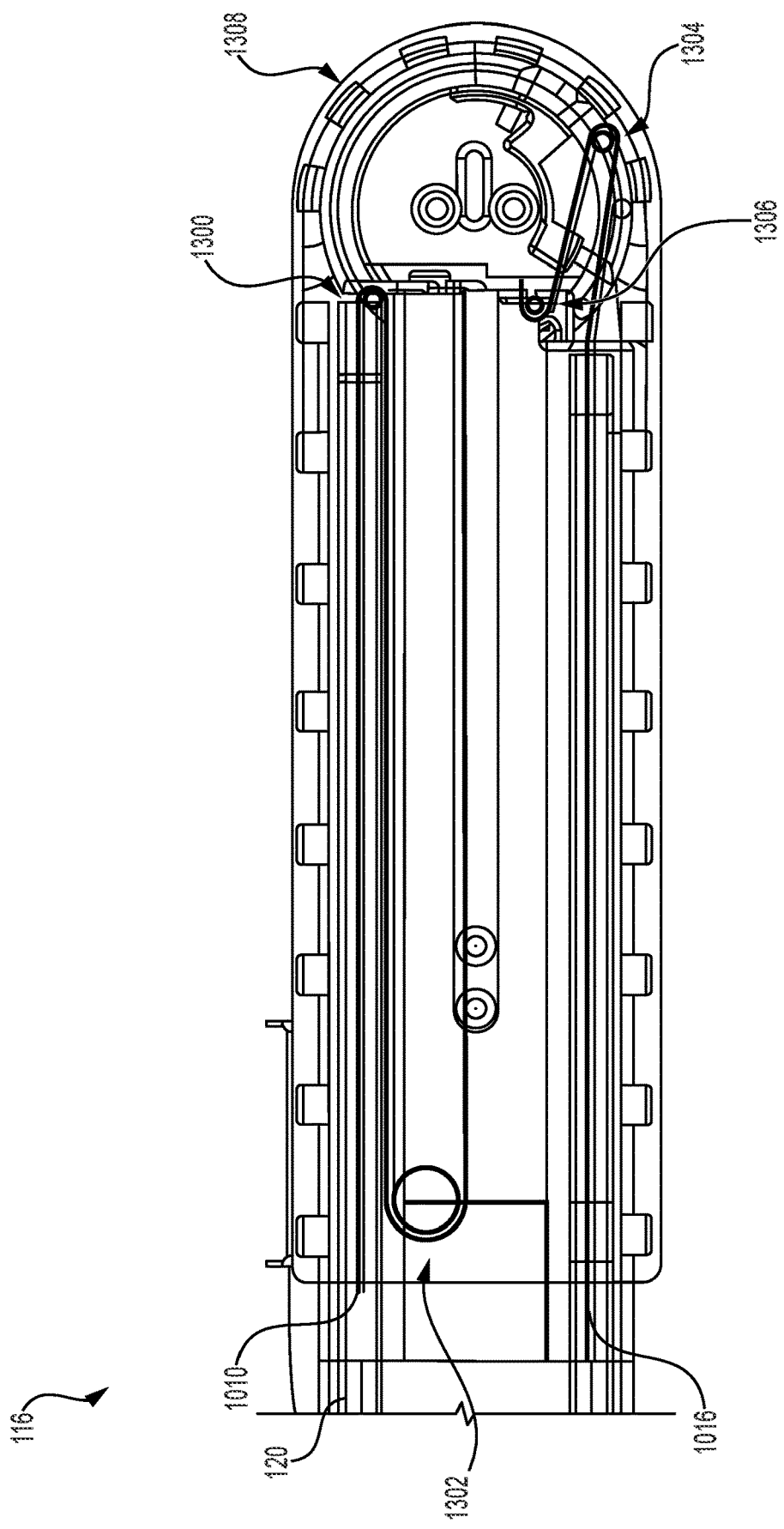
FIG. 13 illustrates one or more cables coupled to an example lateral member of the head-mounted display of FIG. 1 for adjusting a tightness of the head-mounted display on a user, according to an embodiment of the present disclosure.

FIG. 13 illustrates a routing of cables within the second lateral member 116, showing the fourth cable 1010 and the sixth cable 1016. In some instances, the fourth cable 1010 may wrap around a first pulley 1300 and a second pulley 1302. In some instances, the first pulley 1300 may be coupled to (e.g., mounted) the second lateral arm 120. The second pulley 1302 may be coupled to (e.g., mounted) the second lateral member 116. The fourth cable 1010 may enter the second lateral member 116, wrap around the first pulley 1300, wrap around the second pulley 1302, and then couple (e.g., affix) to the second lateral member 120. That is, an end of the fourth cable 1010 may couple to the second actuator 202 (or components thereof, such as the extend reel 800). A second, opposing, end of the fourth cable 1010 may couple to the second lateral member 120.

The sixth cable 1016 may enter the second lateral member 116 and wrap around a third pulley 1304 and a fourth pulley 1306. The third pulley 1304 and/or the fourth pulley 1306 may couple to the second lateral arm 120. In some instances, the third pulley 1304 may represent an arm of a torsion spring within the second lateral member 116 (as discussed herein). That is, the third pulley 1304 may be omitted and instead, the sixth cable 1016 may wrap around an arm or other protrusion of the torsion spring. A first end of the sixth cable 1016 may couple to the second actuator 202 (or components thereof, such as the retract reel 802), while a second, opposing end may couple to the second lateral member 120.

In some instances, the operation of the fourth cable 1010 and the sixth cable 1016 may resemble a mechanism for extending the second lateral member 116 to various extensions. During an actuation of the second actuator 202 the routing of the fourth cable 1010 and the sixth cable 1016 may cause the HMD 100 to tighten and/or loosen from the user. For example, given the routing of the fourth cable 1010 about the first pulley 1300 and the second pulley 1302, pulling on the fourth cable 1010 may cause the second lateral member 116 to extend (or otherwise cause the distance between the front 104 and the back 106 of the HMD 100 to increase). This may loosen the HMD 100 from the user. The sixth cable 1016, meanwhile, may provide slack for the second lateral member 116 to extend. For example, if the second actuator 202 is actuated to loosen the HMD 100, the sixth cable 1016 may provide slack for the fourth cable 1010 to be pulled so as to extend the second lateral member 116. That is, pulling on the fourth cable 1010 may wind the fourth cable 1010 around the extend reel 800 and unwind the sixth cable 1016 from the retract reel 802.

Alternatively, when the second actuator 202 is actuated to tighten the HMD 100, the sixth cable 1016 may be pulled to cause the second lateral member 116 to retract. That is, the routing of the sixth cable 1016 about the third pulley 1304 and the fourth pulley 1306 may cause the second lateral member 116 to retract, thereby reducing the distance between the front 104 and the back 106 of the HMD 100. Here, pulling on the sixth cable 1016 may wind the sixth cable 1016 around the retract reel 802, and unwind the fourth cable 1010 from the extend reel 800.

The second lateral member 116 may be at least partially disposed over the second lateral arm 120. Tightening the HMD 100 may retract the second lateral arm 120 into the second lateral member 116, or retract the second lateral member 116 over the second lateral arm 120. Loosening the HMD 100 may extend the second lateral arm 120 from the second lateral member 116, or extend the second lateral member 116 from the second lateral arm 120.

The fourth cable 1010 and the sixth cable 1016 may route to the second lateral member 116 within the first tube 204 and the second tube 206, respectively. That is, the fourth cable 1010 may be disposed within the first tube 204 between the second lateral member 116 and the rear housing 200. The sixth cable 1016 may be disposed within the second tube 206 between the second lateral member 116 and the rear housing 200.

The second lateral member 116 is also shown including an end 1308 for pivotably coupling to the display housing 108. The end 1308 may couple via fasteners, snap-fit, compression fittings, and so forth.

Although FIG. 13 illustrates the second lateral member 116 and the second lateral arm 120, the first lateral member 114 may include similar features for receiving the first lateral arm 118 and the first lateral member 114 may similarly extend from and retract over the first lateral arm 118.

Figure 14:
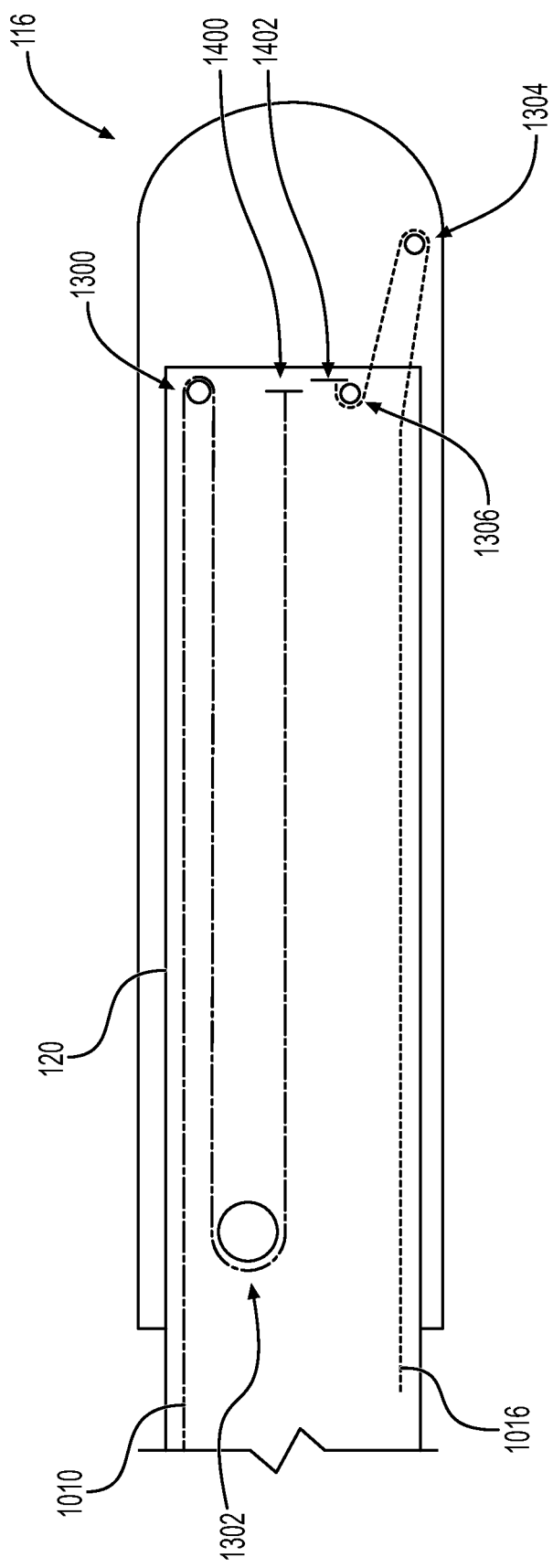
FIG. 14 illustrates an additional view showing the one or more cables of FIG. 13 for adjusting the tightness of the head-mounted display, according to an embodiment of the present disclosure.

FIG. 14 illustrates an additional view of the fourth cable 1010 and the sixth cable 1016 routed within the second lateral member 116 and second lateral arm 120. As discussed above, the second lateral member 116 may be disposed over the second lateral arm 120 such that the second lateral member 116 may extend at various lengths from the second lateral arm 120. As such, in some instances, the second lateral member 116 may telescopically extend from and retract into the second lateral arm 120.

The fourth cable 1010 is shown routed around pulleys, such as the first pulley 1300 and the second pulley 1302. In some instances, the first pulley 1300 may couple to the second lateral arm 120. The second pulley 1302 may couple to the second lateral member 116. Additionally, the fourth cable 1010 may anchor to the second lateral arm 120 at a first position 1400. An opposite end of the fourth cable 1010 may operably couple to the second actuator 202 via the extend reel 800.

The sixth cable 1016 is shown routed around the third pulley 1304 and the fourth pulley 1306. The third pulley 1304 may couple to the second lateral member 116 while the fourth pulley 1306 may couple to the second lateral arm 120. The sixth cable 1016 may anchor to the second lateral arm 120 at a second position 1402. An opposite end of the sixth cable 1016 may operably couple to the second actuator 202 via the retract reel 802. In some instances, the sixth cable 1016 may not rotate around the third pulley 1304, but rather, a hook of the torsional spring, as discussed herein.

The routing of the fourth cable 1010 and the sixth cable 1016 within the second lateral member 116, as well as about the pulleys, may effectuate to loosen and tighten the HMD 100 on the user. That is, the fourth cable 1010 and the sixth cable 1016 may be pulled to loosen and tighten the HMD 100, respectively.

Figure 15A:
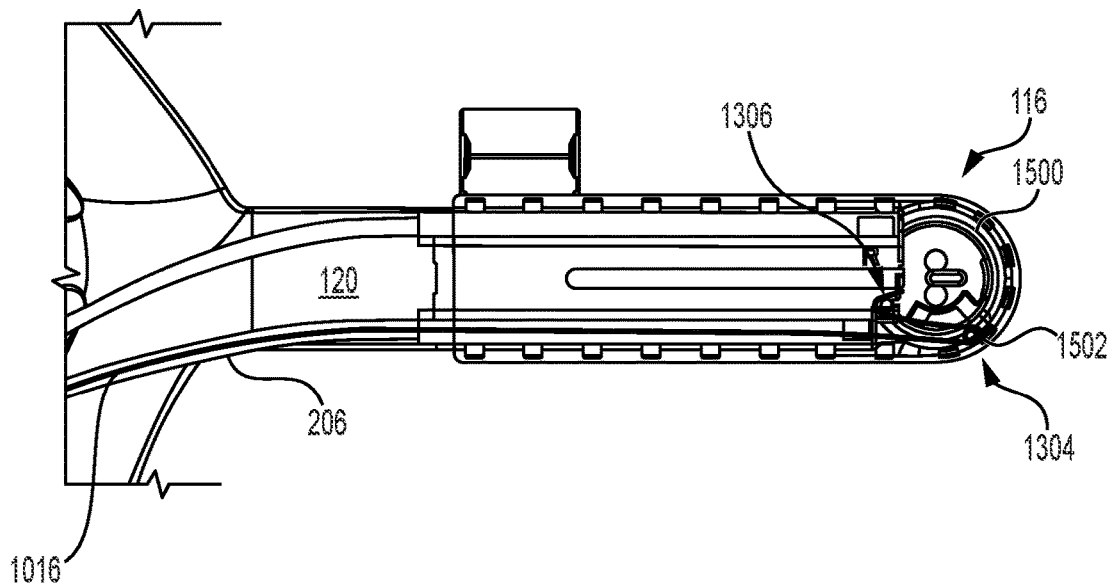
FIG. 15A illustrates an example torsional spring within a lateral member of the head-mounted display of FIG. 1, disposed at a first position, according to an embodiment of the present disclosure.
Figure 15B:
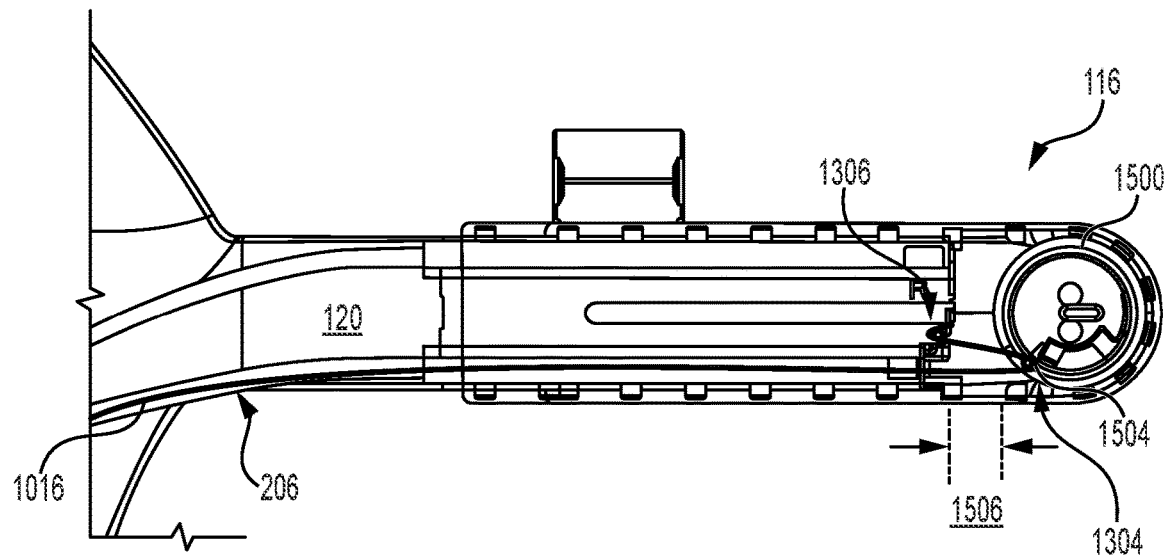
FIG. 15B illustrates the torsional spring of FIG. 15A, disposed at a second position, according to an embodiment of the present disclosure.

FIGS. 15A and 15B illustrate various views of the second lateral member 116 and the sixth cable 1016. Specifically, in FIGS. 15A and 15B, a torsional spring 1500 utilized to maintain tension on the sixth cable 1016. In FIG. 15A, the torsional spring 1500 may be in a preloaded or loaded state, while in FIG. 15B, the torsional spring 1500 may be in a preloaded or loaded state. FIGS. 15A and 15B further illustrate the sixth cable 1016 being routed within the second tube 206.

The torsional spring 1500 may take up slack within the sixth cable 1016 and/or allow the user to remove the HMD 100 without loosening the fourth cable 1010. That is, the user may remove the HMD 100 without actuation of the second actuator 202. For example, after the user has tightened the HMD 100, it may be inconvenient to loosen the HMD 100 and retighten the HMD 100 at a later instance. By way of example, the user may take a break from using the HMD 100. Rather than loosening the HMD 100 via the second actuator 202, the torsional spring 1500 may provide a degree of play to allow the user to pull on the display housing 108 to separate the display housing 108 from the face of the user. With this separation, the user may pull the HMD 100 over and/or above their head. Once the user has stopped pulling on the display housing 108, the torsional spring 1500 may recoil to pull the sixth cable 1016 and reduce the distance between the front 104 and the back 106 of the HMD 100.

In some instances, the torsional spring 1500 may include the third pulley 1304 about which the sixth cable 1016 wraps. Additionally, or alternatively, the sixth cable 1016 may wrap or wind around a projection or hook of the torsional spring 1500. Regardless of the specific embodiment, the sixth cable 1016 may operably engage with the torsional spring 1500 to provide a degree of travel. Additional details of the torsional spring are discussed herein with regard to FIGS. 16A-16D. In some instances, the torsional spring 1500 may provide a couple millimeters, centimeters, or inches of play for allowing the user to take the HMD 100 off and place the HMD 100 back on. This play may momentarily change a size of the HMD 100. For example, in the preloaded or unloaded state as shown in FIG. 15A, the third pulley 1304 or the sixth cable 1016 may loop around the torsional spring 1500 at a first position 1502. As the user pulls on the HMD 100, for example, on the display housing 108, the torsional spring 1500 may coil to locate the third pulley 1304 or the sixth cable 1016 at a second position 1504. At the second position 1504, the torsional spring 1500 may be at a maximum coiled position. That is, at the second position 1504, the HMD 100 may not be pulled further apart. This results in a gap distance 1506. In some instances, the gap distance may be thirteen millimeters. However, in the retracted state as shown in FIG. 15A, the torsional spring 1500 may still apply a biasing force to remove slack within the sixth cable 1016.

Figure 16A:
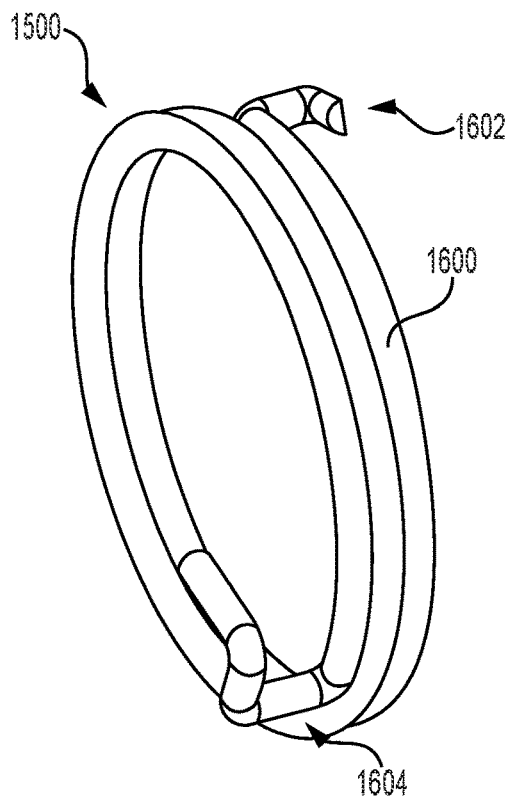
FIGS. 16A-16D illustrate various views of the torsional spring of FIG. 15A, according to an embodiment of the present disclosure.
Figure 16B:
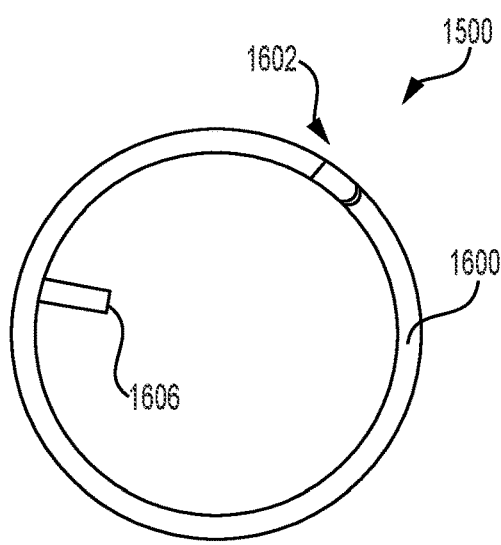
Figure 16C:
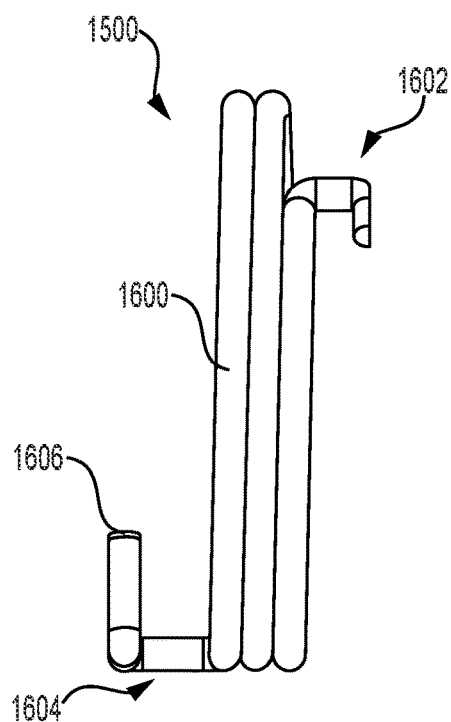
Figure 16D:
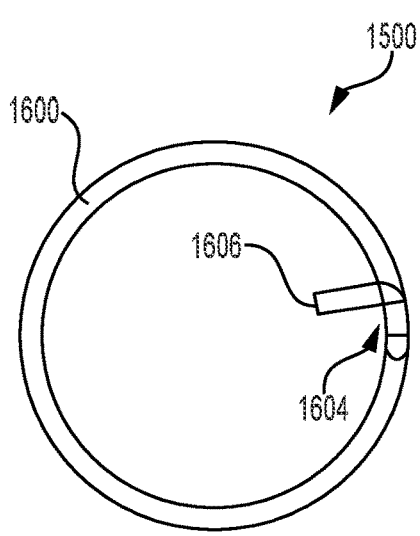

FIGS. 16A-16D illustrate various views of the torsional spring 1500. Particularly, FIG. 16A illustrates an isometric view of the torsional spring 1500, FIG. 16B illustrates a first side view of the torsional spring 1500, FIG. 16C illustrates an end view of the torsional spring 1500, and FIG. 16D illustrates a second side view of the torsional spring 1500.

The torsional spring 1500 may reside within the first lateral member 114 and the second lateral member 116. For example, the torsional spring 1500 may reside within the end 1308 of the second lateral member 116. The torsional spring 1500 includes body coils 1600 for providing a biasing nature to the torsional spring 1500. A first end of the torsional spring 1500 may include a static leg 1602. The static leg 1602 may remain stationary during a winding and unwinding of the torsional spring 1500. In some instances, the static leg 1602 may couple to the first lateral member 114 and/or the second lateral member 116 for remaining stationary.

A second end of the torsional spring 1500 includes a dynamic leg 1604. Noted above, the sixth cable 1016 may wrap around the dynamic leg 1604. For example, the sixth cable 1016 may loop around the dynamic leg 1604 for pulling on the dynamic leg 1604 when the user provides a biasing force to the display housing 108. The engagement between the sixth cable 1016 and the dynamic leg 1604 may resemble a pulley such that the sixth cable 1016 may loop or wind around the dynamic leg 1604. Alternatively, the third pulley 1304 may be disposed around the dynamic leg 1604

The torsional spring 1500 may further include a stop leg 1606. The stop leg 1606 may prevent the torsional spring 1500 from further coiling or uncoiling. For example, returning briefly to FIG. 15B, the second lateral member 116 may have a degree of travel equal to the gap distance 1506. When the second lateral member 116 is extended by the gap distance 1506, the stop leg 1606 may prevent the second lateral member 116 from being pulled further. This may further prevent a winding nature of the torsional spring 1500. In such instances, the stop leg 1606 may contact a projection of the first lateral member 114 or the second lateral member 116.

Figure 17:
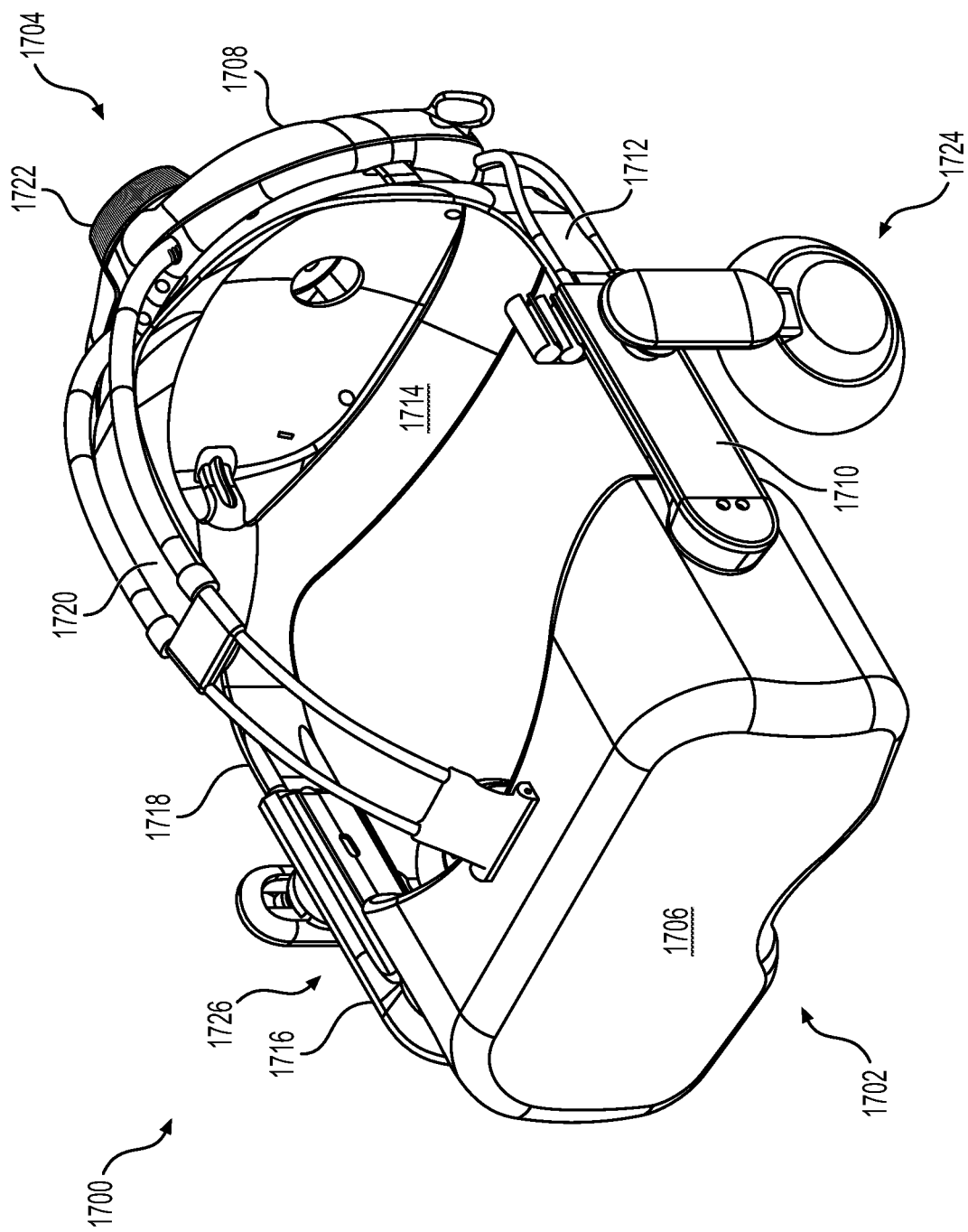
FIG. 17 illustrates a front isometric view of an example head-mounted display, according to an embodiment of the present disclosure.

FIG. 17 illustrates a front isometric view of a HMD 1700 that, in some instances, may include similar components as the HMD 100. For example, the HMD 1700 may include a front 1702 and a back 1704. The front 1702 of the HMD 1700 may include a display housing 1706 that houses a display for outputting content to the user. The back 1704 of the HMD 1700 may include a rear housing 1708.

The display housing 1706 may couple to the rear housing 1708 via one or more members. For example, the HMD 1700 may include a first lateral member 1710 that engages with a first lateral arm 1712 extending from a rear harness 1714. A second lateral member 1716 may engage with a second lateral arm 1718 that extends from the rear harness 1714. The first lateral member 1710 may extend from various lengths relative to the first lateral arm 1712 for loosening and tightening the HMD 1700 to the user. That is, as similarly discussed above with regard to the first lateral member 114, the first lateral member 1710 may slide over or otherwise engage with the first lateral arm 1712 for adjusting in length. Similarly, the second lateral member 1716 may engage with the second lateral arm 1718.

Furthermore, the HMD 1700 may include a top member 1720 that is disposed over a crown of the user when the HMD 1700 is worn. The top member 1720 may adjust in length for adjusting a vertical position of the display housing 1706 on the face of the user.

In some examples, the HMD 1700 may include actuators for adjusting a length of the first lateral member 1710, the second lateral member 1716, and the top member 1720. These actuators may engage with cabling mechanism of the HMD 1700, as similarly discussed above with regard to the HMD 100. For example, cabling mechanisms of the first lateral member 1710 and the second lateral member 1716 may engage with an actuator disposed at the back 1704 of the rear housing 1708. Moreover, cabling mechanisms of the top member 1720 may engage with a first actuator 1722 at the rear housing 1708. As discussed in detail herein, the cabling mechanisms may route through one or more tubes of the HMD 1700.

The HMD 1700 may include loudspeakers to output audio to the user. For instance, the HMD 1700 may include a first loudspeaker 1724 located adjacent a left ear of the user and a second loudspeaker 1726 located adjacent to a right ear of the user. As shown in FIG. 17, the first loudspeaker 1724 may couple to the first lateral member 1710 and the second loudspeaker 1726 may couple to the second lateral member 1716. As such, when the first lateral member 1710 and the second lateral member 1716 are extended and/or retracted, the first loudspeaker 1724 and the second loudspeaker 1726 may correspondingly move with the first lateral member 1710 and the second lateral member 1716, respectively.

In some instances, the first loudspeaker 1724 and/or the second loudspeaker 1726 may pivotably couple to the first lateral member 1710 and the second lateral member 1716, respectively. This may position the first loudspeaker 1724 and the second loudspeaker 1726 adjacent to the left ear and the right ear of the user, respectively. For example, and as discussed in detail herein, the first loudspeaker 1724 may couple to the first lateral member 1710 via a ball joint. The ball joint may provide the first loudspeaker 1724 with varying degrees of movement to position the first loudspeaker 1724. Similarly, the second loudspeaker 1726 may couple to the second lateral member 1716 via a ball joint for positioning the second loudspeaker 1726. Additionally, the first loudspeaker 1724 and/or the second loudspeaker 1726 may slide to longitudinally adjust. This lateral movement, in additional to the pivotable movement, provides the user options to reposition the first loudspeaker 1724 and the second loudspeaker 1726 given that the first lateral member 1710 and the second lateral member 1716 may extend at varying lengths.

Although the first loudspeaker 1724 and the second loudspeaker 1726 are shown being coupled to the first lateral member 1710 and the second lateral member 1716, respectively, the first loudspeaker 1724 and the second loudspeaker 1726 may couple to the rear housing 1708, or other portions of the HMD 2200.

Figure 18:
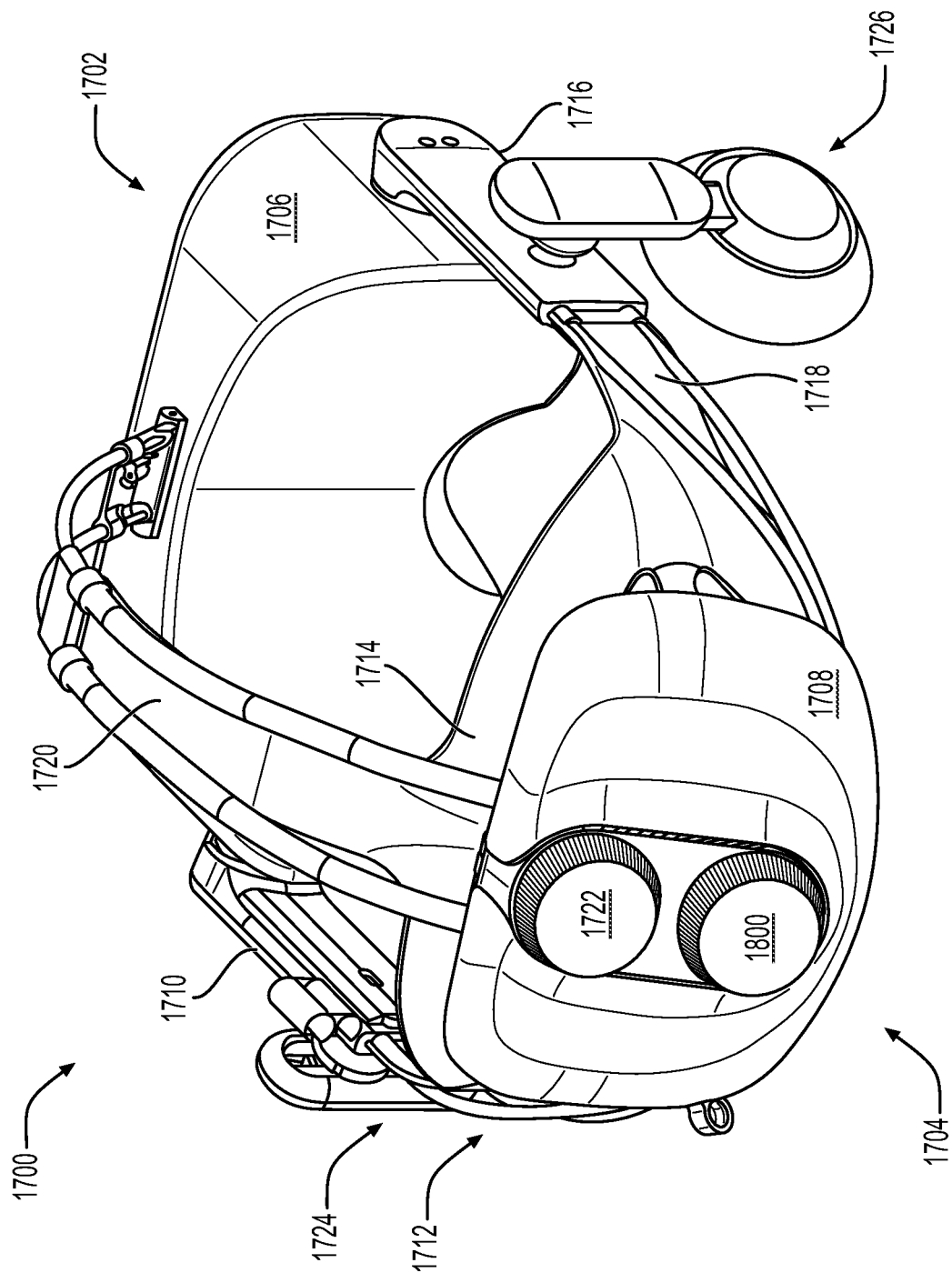
FIG. 18 illustrates a rear isometric view of the head-mounted display of FIG. 17, according to an embodiment of the present disclosure.

FIG. 18 illustrates a rear isometric view of the HMD 1700. The back 106 of the HMD 100 is shown including the rear housing 1708. The rear housing 1708 may include similar components as described above with regard to the rear housing 200 (e.g., antennas, processors, PCBs, etc.). Additionally, the rear housing 1708 is shown including the first actuator 1722 and a second actuator 1800.

Within the rear housing 200, the first actuator 1722 may engage with the cabling mechanism of the top member 1720 and the second actuator 1800 may engage with the cabling mechanisms of the first lateral member 1710 and/or the second lateral member 1716. The first actuator 1722 and the top member 1720 may be used to vertically adjust the HMD 100 on the user, or relative to the eyes of the user, while the second actuator 1800 may be used to tighten and loosen the HMD 100. As also introduced above, the rear harness 1714 may include the first lateral arm 1712 and the second lateral arm 1718 that engage with or within the first lateral member 1710 and the second lateral member 1716, respectively.

Figure 19A:
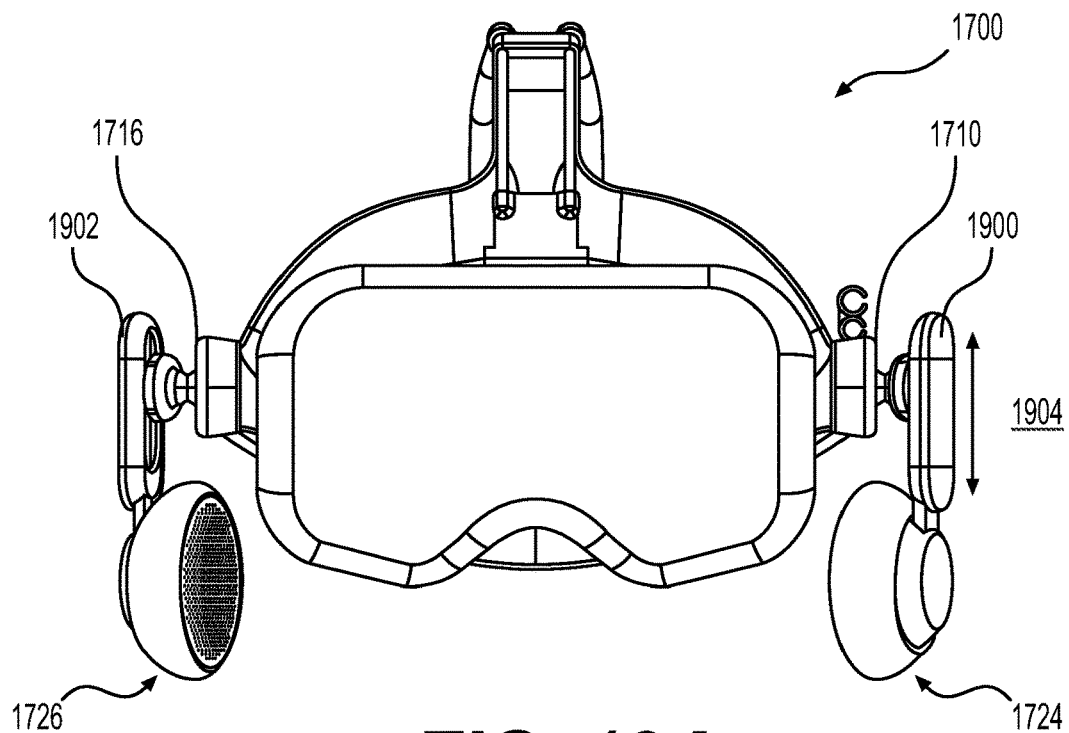
FIG. 19A illustrates a front view of the head-mounted display of FIG. 17, according to an embodiment of the present disclosure.
Figure 19B:
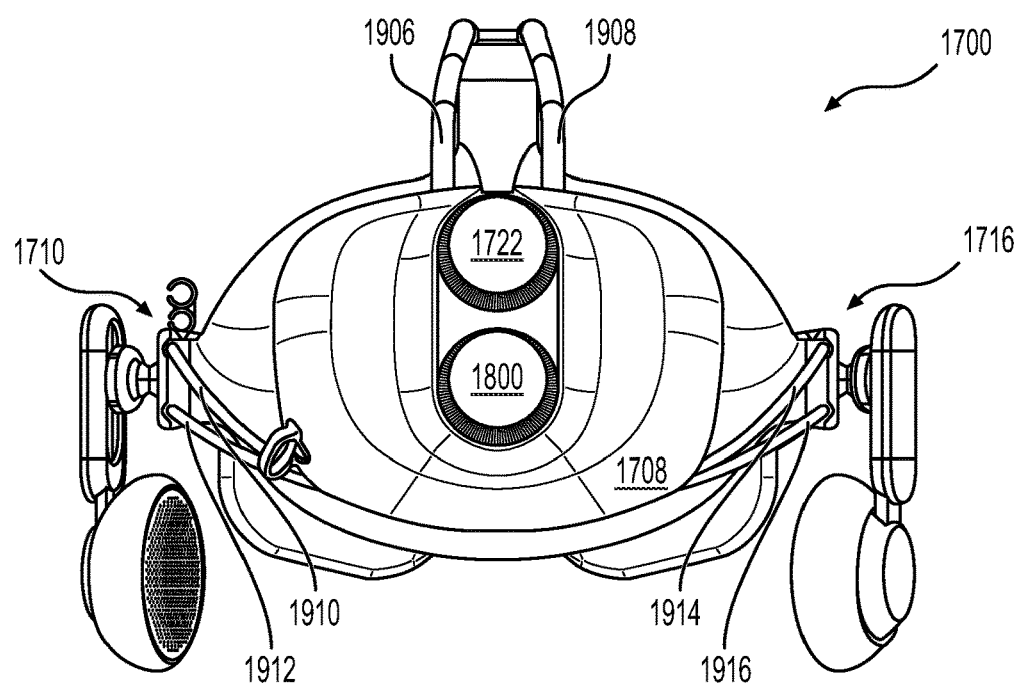
FIG. 19B illustrates a rear view of the head-mounted display of FIG. 17, according to an embodiment of the present disclosure.

FIGS. 19A and 19B illustrate a front view and a back view of the HMD 1700, respectively. The first loudspeaker 1724 may couple to the first lateral member 1710 via a first loudspeaker arm 1900 and the second loudspeaker 1726 may couple to the second lateral member 1716 via a second loudspeaker arm 1902. As discussed herein, the first loudspeaker arm 1900 may couple to the first lateral member 1710 via a ball joint for adjusting the position of the first loudspeaker 1724. Similarly, the second loudspeaker arm 1902 may couple to the second lateral member 1716 via a ball joint for adjusting a position of the second loudspeaker 1726. The first loudspeaker arm 1900 and the second loudspeaker arm 1902 may also slide in a directional 1904. The pivotable nature of the first loudspeaker arm 1900 and the second loudspeaker arm 1902, as well as a sliding nature in the direction 1904, permits the first loudspeaker 1724 and the second loudspeaker 1726 to reposition according to user preferences.

In FIG. 19B, the HMD 1700 may include various tubes for routing or channeling cables of the cabling mechanisms. For example, a first tube 1906 and a second tube 1908 are shown routing from the rear housing 1708 to the top member 1720. The first tube 1906 and the second tube 1908 may channel respective cables that are used to extend and retract the top member 102. A third tube 1910 and a fourth tube 1912 are shown routing from the first lateral member 1710 to the rear housing 1708. The third tube 1910 and the fourth tube 1912 may channel respectively cables that are used to extend and retract the first lateral member 1710. A fifth tube 1914 and a sixth tube 1916 are shown routing from the second lateral member 1716 to the rear housing 1708. The fifth tube 1914 and the sixth tube 1916 may channel respectively cables that are used to extend and retract the second lateral member 1716.

At the 1704 back of the HMD 1700, cabling mechanisms may engage with the first actuator 1722 and the second actuator 1800. For example, the cabling mechanisms of the top member 1720 may engage with the first actuator 1722. The engagement of the cabling mechanisms of the top member 1720 with the first actuator 1722 may be similar to that described above with regard to the HMD 100. Further, the cabling mechanisms of the first lateral member 1710 and the second lateral member 1716 may engage with the second actuator 1800. The engagement of the cabling mechanisms of the first lateral member 1710 and the second lateral member 1716 with the second actuator 1800 may be similar to that described above with regard to the first lateral member 114 and the second lateral member 116 engaging with the second actuator 202, respectively. Moreover, cables may route within the first lateral member 1710 and the second lateral member 1716 as similarly discussed above with regard to the first lateral member 114 and the second lateral member 116.

Figure 20A:
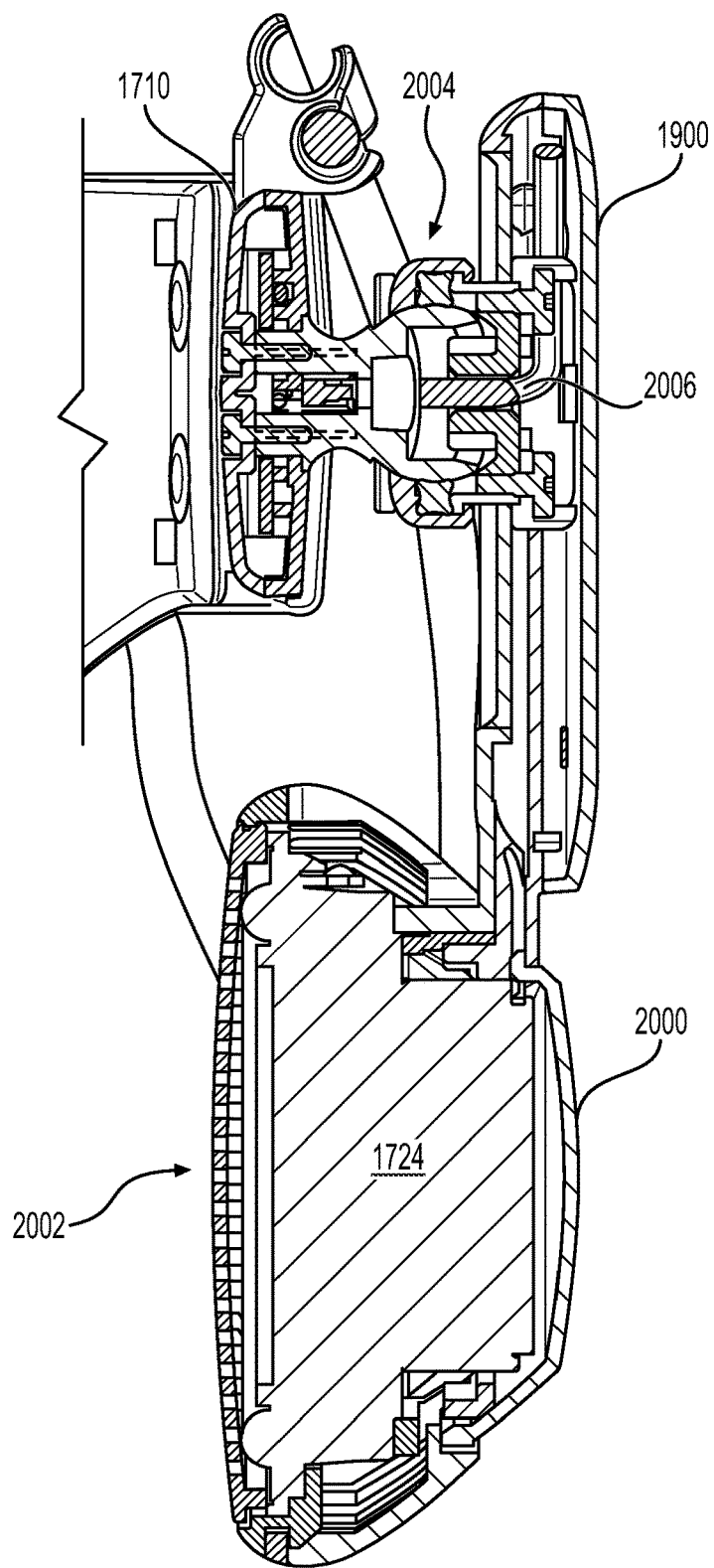
FIG. 20A illustrates a first cross sectional view of an example loudspeaker of the head-mounted display of FIG. 17, according to an embodiment of the present disclosure.

FIG. 20A illustrates a cross-sectional view showing components of the HMD 100, such as the first lateral member 1710, the first loudspeaker 1724, and the first loudspeaker arm 1900. In some instances, the view shown in FIG. 20A may represent a front cross-sectional view, from a front 1702 towards a back 1704 of the HMD 1700. Although FIG. 20A illustrates and discusses components of the first lateral member 1710, the first loudspeaker 1724, and the first loudspeaker arm 1900 it is to be understood that the second lateral member 1716, the second loudspeaker 1726, and the second loudspeaker arm 1902 may include similar components and/or function similarly.

The first loudspeaker 1724 may reside within a shell 2000. The shell 2000, as shown, may include a generally semi-spherical shape within which the first loudspeaker 1724 resides. The first loudspeaker 1724 may be oriented to output sound towards a direction of the user. The first loudspeaker 1724 may include a speaker grill 2002 having orifices that permit sound generated by the first loudspeaker 1724 to exit from within the shell 2000 and towards a direction of the user. The speaker grill 2002 may couple to the shell 2000 via snap-fit, fasteners, adhesives, etc.

The first loudspeaker arm 1900 may slidably engage with/within a ball joint 2004 for longitudinally translating within the first loudspeaker arm 1900. For example, as discussed above, the first loudspeaker arm 1900 may engage with the ball joint 2004 (or components thereof) to permit the first loudspeaker arm 1900 to translate in the direction 1904. The direction 1904, in some instances, may allow the first loudspeaker 1724 to horizontally and/or vertically position relative to the user. For example, the ball joint 2004 may include a flange that engages within a slide or channel of the first loudspeaker arm 1900. This engagement may permit the first loudspeaker arm 1900 to slidably engage with the ball joint 2004. In other words, the ball joint 2004 may slide within the first loudspeaker arm 1900 for being disposed at various positions along the length of the first loudspeaker arm 1900.

The ball joint 2004 also pivotably couple to the first lateral member 1710 for changing a position and/or orientation of the first loudspeaker 1724. For example, the ball joint 2004 may provide the first loudspeaker arm 1900 with rotational and/or pivotable movement. As such, the first loudspeaker 1724 may be arranged at various positions and/or orientations. For example, as the HMD 1700 accommodates various users, the first loudspeaker 1724 may adjust to accommodate different users.

In some instance, the ball of the ball joint 2004 may extend from the first lateral member 1710, while the socket of the ball joint 2004 may be embodied within the first loudspeaker arm 1900. The first loudspeaker arm 1900 may couple to the first lateral member 1710 via an engagement of the ball and socket.

In some instances, wires, cables, or other filaments may route through the ball joint 2004 for communicatively coupling the first loudspeaker 1724 with other portions of the HMD 1700. For example, as shown, one or more wires 2006 may route through the ball joint 2004. The wires 2006 may provide audio to the first loudspeaker 1724 for output. In doing so, the wires 2006 may route through the first loudspeaker arm 1900 to reach the first loudspeaker 1724. Moreover, the wires 2006 may route through the first lateral member 1710. However, in some instances, the HMD 1700 may include additional wires that are routed through the first lateral member 1710 and/or the first loudspeaker arm 1900 for communicatively coupling to the first loudspeaker 1724.

Figure 20B:
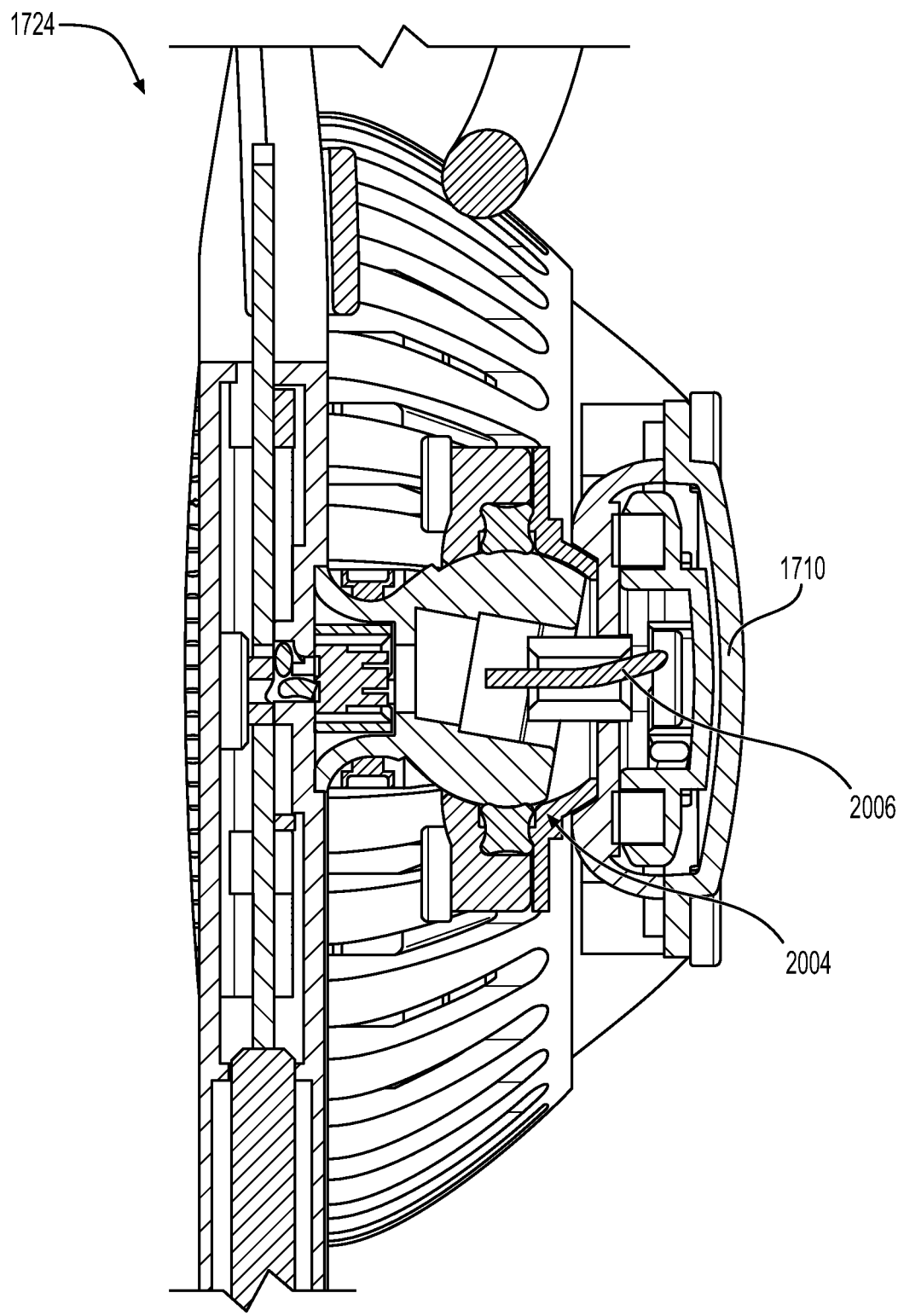
FIG. 20B illustrates a second cross sectional view of a loudspeaker of the head-mounted display of FIG. 17, according to an embodiment of the present disclosure.

FIG. 20B illustrates the first loudspeaker 1724. In some instances, the view shown in FIG. 20B may represent a top cross-sectional view, from a top of the HMD 1700 towards a bottom of the HMD 1700. As noted above, the first loudspeaker arm 1900 may couple to the first lateral member 1710 via the ball joint 2004 and the wires 2006 may route through the ball joint 2004 and the first loudspeaker arm 1900.

Figure 21:
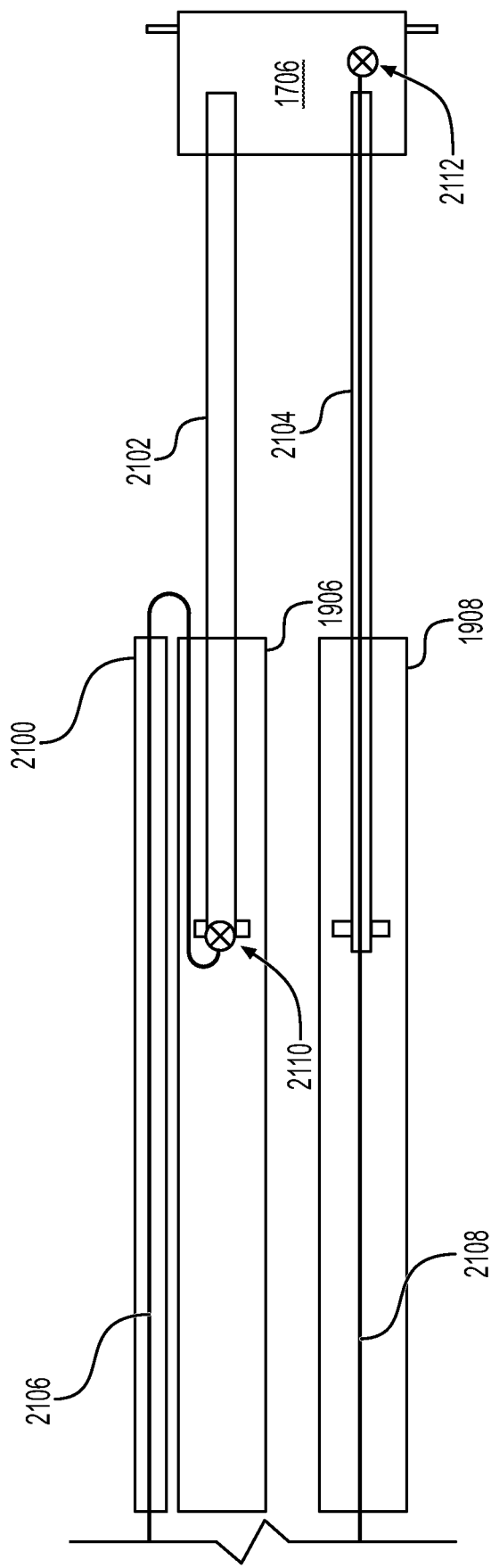
FIG. 21 illustrates one or more cables for adjusting a vertical position of the head-mounted display of FIG. 17 on a user, according to an embodiment of the present disclosure.

FIG. 21 illustrates a detailed view of the HMD 1700 showing a routing of a wires used to vertically adjust the position of the HMD 1700 on the user. As introduced above, the HMD 1700 may include the first tube 1906 and the second tube 1908 that extend from the rear housing 1708. In some instances, the HMD 1700 may include an additional tube, such as a seventh tube 2100, extending from the rear housing 1708. The first tube 1906 and the seventh tube 2100 may be attached or coupled together.

The first tube 1906 may receive a first inner tube 2102 and the second tube 1908 may receive a second inner tube 2104. The first inner tube 2102 and the second inner tube 2104 may couple to the display housing 1706. As shown, the first inner tube 2102 and the second inner tube 2104 may extend from the display housing 1706 and into the first tube 1906 and the second tube 1908, respectively. The first inner tube 2102 and the second inner tube 2104 may translate and/or slide into the first tube 1906 and the second tube 1908, respectively. In some instances, the first tube 1906 and/or the second tube 1908 may include mechanisms for permitting the translation of the first inner tube 2102 and the second inner tube 2104, respectively (e.g., channels, tabs, slots, protrusions, etc.).

The HMD 1700 includes wires or cables that route through the first tube 1906, the second tube 1908, the seventh tube 2100, the first inner tube 2102, and/or the second inner tube 2104. For example, the HMD 1700 may include a first cable 2106 and a second cable 2108. In some instances, the first cable 2106 may correspond to an extension cable that when pulled, causes the display housing 1706 to lower on the user. The second cable 2108, meanwhile, may correspond to a retraction cable that when pulled, causes the display housing 1706 to raise on the user. The first cable 2106 and the second cable 2108 may operably couple to the first actuator 1722 for extending and retracting in length (e.g., via spools or reels).

As shown, the first cable 2106 may route from the rear housing 1708, through the seventh tube 2100 and then into the first tube 1906. In some instances, an end of the first cable 2106 may couple to the first inner tube 2102 as a position 2110. Additionally, the first cable 2106 may wrap or be wound around open or more pulleys within, or external to, the seventh tube 2100 and/or the first tube 1906. Additionally, the pulleys may be located on the top member 1720. The second cable 2108 may route through the second tube 2108, through the second inner tube 2104, and the couple to the display housing 1706 at a position 2112.

Figure 22:
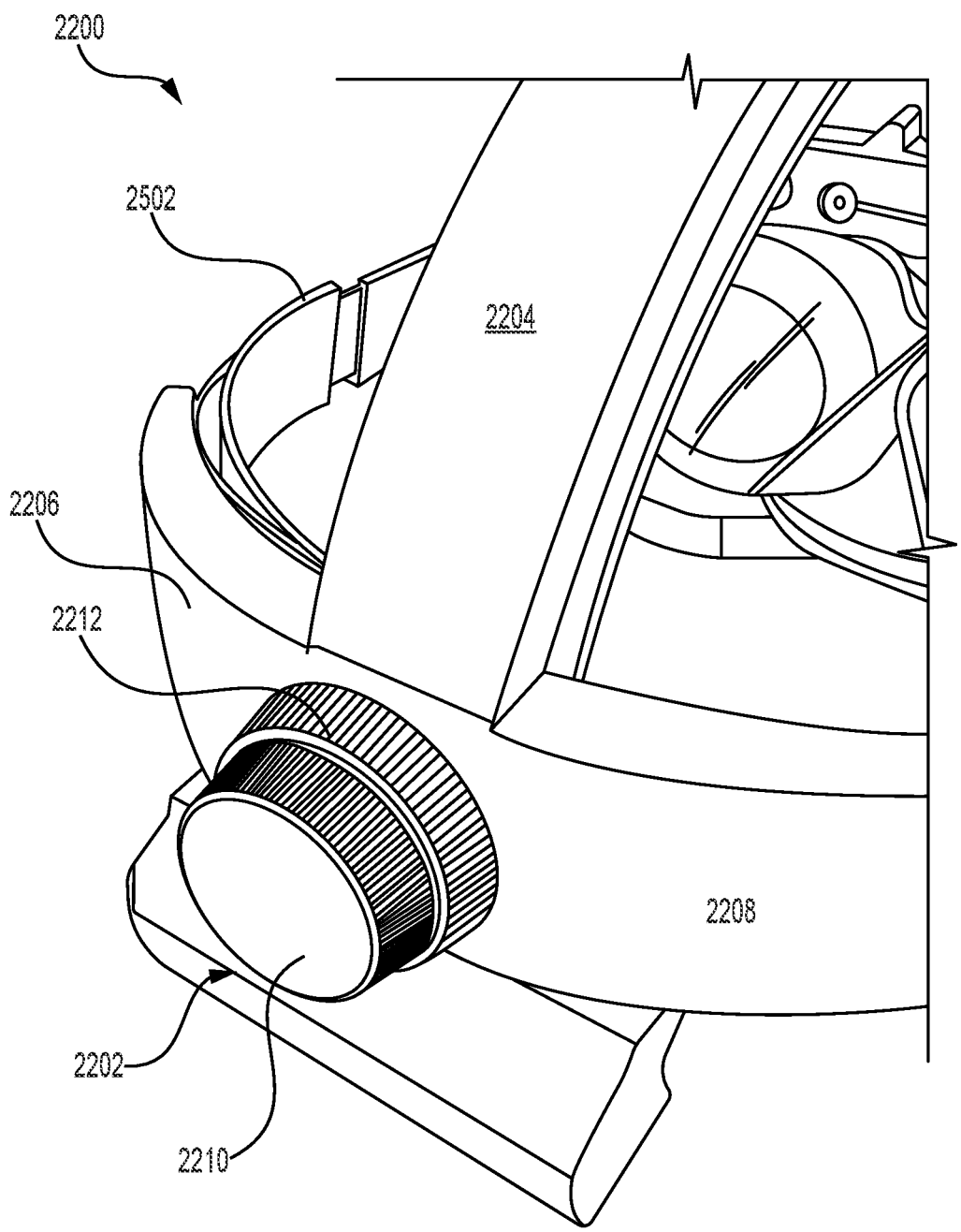
FIG. 22 illustrates a rear isometric view of an example head-mounted display, according to an embodiment of the present disclosure.

FIG. 22 illustrates a HMD 2200 having a dual-concentric knob 2202 disposed at a back of the HMD 2200. In some instances, the HMD 2200 may include similar components as the HMD 100 and/or the HMD 1700. However, as shown in FIG. 22, the HMD 100 may include the dual-concentric knob 2202 for tightening, loosening, and/or adjusting the vertical position of the HMD 2200 on the user.

The dual-concentric knob 2202 may engage with one or more members for tightening and loosening the HMD 2200 to the user and/or adjusting a vertical position of the HMD 2200. In some instances, the one or more members may engage with the dual-concentric knob 2202 within a rear housing of the HMD 2200. For example, a top member may extend through a top sleeve 2204 and engage with the dual-concentric knob 2202. Lateral members may extend through a first lateral sleeve 2206 and a second lateral sleeve 2208, respectively. In some instances, the top sleeve 2204, the first lateral sleeve 2206, and/or the second lateral sleeve 2208 may represent a harness of the HMD 2200, or a rear housing of the HMD 2200, that engages with a back of the head.

The dual-concentric knob 2202 may include a first knob 2210 and a second knob 2212. The first knob 2210 may operate to adjust the vertical position of a display (or display housing) of the HMD 2200 on the head. The second knob 2212 may operate to tighten and loosen the HMD 100 to the user. That is, the top member disposed within the top sleeve 2204 may operably engage with the first knob 2210. Lateral members disposed within the first lateral sleeve 2206 and the second lateral sleeve 2208 may operably engage with the second knob 2212.

Discussed herein, the first knob 2210 and the second knob 2212 may include gears that engage with slots of the top member and the lateral members, respectively. The lateral members may overlap to permit the lateral members to tighten and loosen. The first knob 2210 and the second knob 2212 may be independently actuate in multiple directions. For example, the first knob 2210 may engage with the top member and rotated in a first direction (e.g., clockwise) to lower the display on the user, and rotated in a second direction (e.g., counterclockwise) to raise the display on the user. The second knob 2212 may engage with lateral members and rotated in a first direction (e.g., clockwise) to loosen the HMD 2200, and rotated in a second direction (e.g., counterclockwise) to tighten the HMD 2200.

Figure 23A:
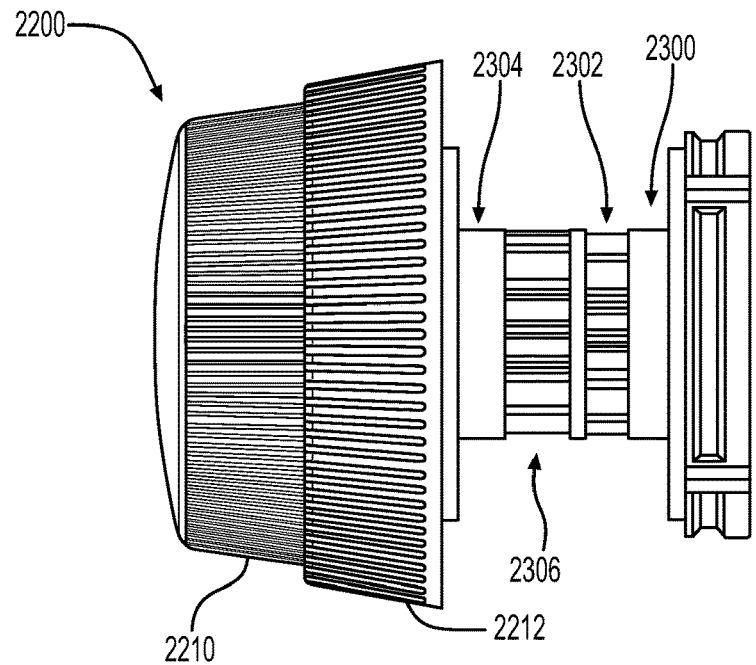
FIG. 23A illustrates a side view of an example actuator of the head-mounted display of FIG. 22, according to an embodiment of the present disclosure.
Figure 23B:
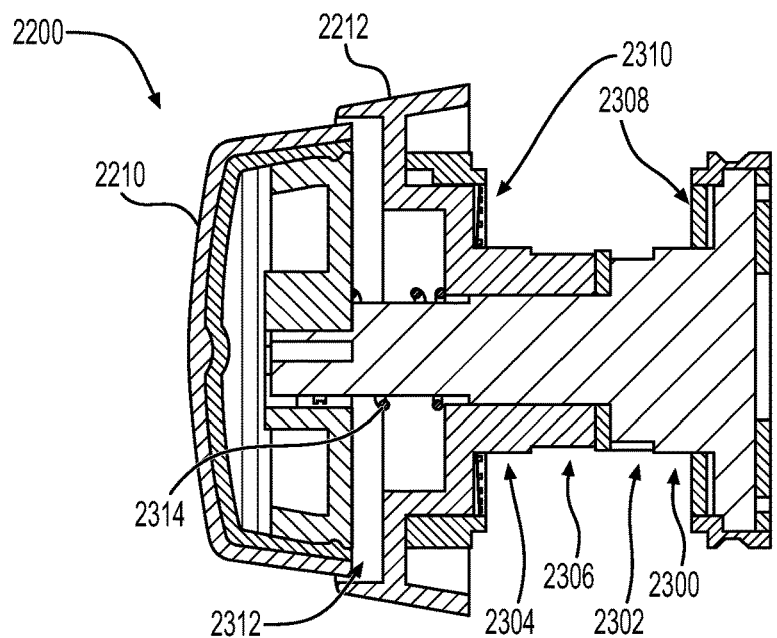
FIG. 23B illustrates a cross-sectional view of the actuator of FIG. 23A, according to an embodiment of the present disclosure.

FIGS. 23A and 23B illustrate detailed views of the dual-concentric knob 2202. Particularly, FIG. 23A illustrates a side view of the dual-concentric knob 2202, and FIG. 23B illustrates a cross-sectional view of the dual-concentric knob 2202. As shown, the first knob 2210 may be nestled, housed, or reside within at least a portion of the second knob 2212.

The first knob 2210 may include a first member, mechanism, or a shaft 2300 that extends through the second knob 2212 for adjusting a vertical position of the HMD 2200. A first gear 2302 of the first shaft 2300 may engage with slots disposed in the top member, or that extend along a length of the top member. Rotating the first knob 2210 may cause the first gear 2302 to engage with the slots in the top member for raising or lowering the display housing. A thrust bearing between the first gear 2302 and the second gear 2306 keeps bands separated.

Similarly, the second knob 2212 may include a second member, mechanism, or a shaft 2304. In some instances, the second shaft 2304 may be integrated within the second knob 2212 (e.g., as a single component). The second shaft 2304 may include a second gear 2306 that engages with slots disposed in the lateral members, or that extend along a length of the lateral members. As shown, the second gear 2306 may have a greater longitudinal length for engaging with multiple members (e.g., two lateral members) as compared to the first gear 2302 that may engage with a single member (e.g., the top member).

The first shaft 2300 may couple to a third gear 2308 for preventing backdrive of the top member and/or the first knob 2210. The third gear 2308 may represent a face gear that engages with a complimentary face gear of a rear housing. For example, teeth of the third gear 2308 may engage with teeth of an additional gear in the rear housing to prevent backdrive. Similarly, the second shaft 2304 may couple to a fourth gear 2310 for preventing backdrive of the lateral members and/or the second knob 2212. The fourth gear 2310 may represent a face gear that engages with a complimentary face gear of a rear housing. For example, teeth of the fourth gear 2310 may engage with teeth of an additional gear on the housing to prevent backdrive.

In some instances, a gap distance 2312 may be interposed between the first knob 2210 and the second knob 2212. A spring 2314 may wrap around a portion of the first shaft 2300, between a surface of the first knob 2210 and a surface of the second knob 2212, for disposing the first knob 2210 away from the second knob 2212. In instances where the user wishes to vertically adjust the position of the display housing, the user may push on the first knob 2210 to deflect the first knob 2210 inward. This deflection may uncouple the third gear 2308 from the complimentary gear in the rear housing and allow the user to lower or raise the display housing. Although FIG. 23B illustrates the spring 2314 in a particular location, the spring 2314 may be located elsewhere within the rear housing and/or the dual-concentric knob 2202.

Figure 24A:
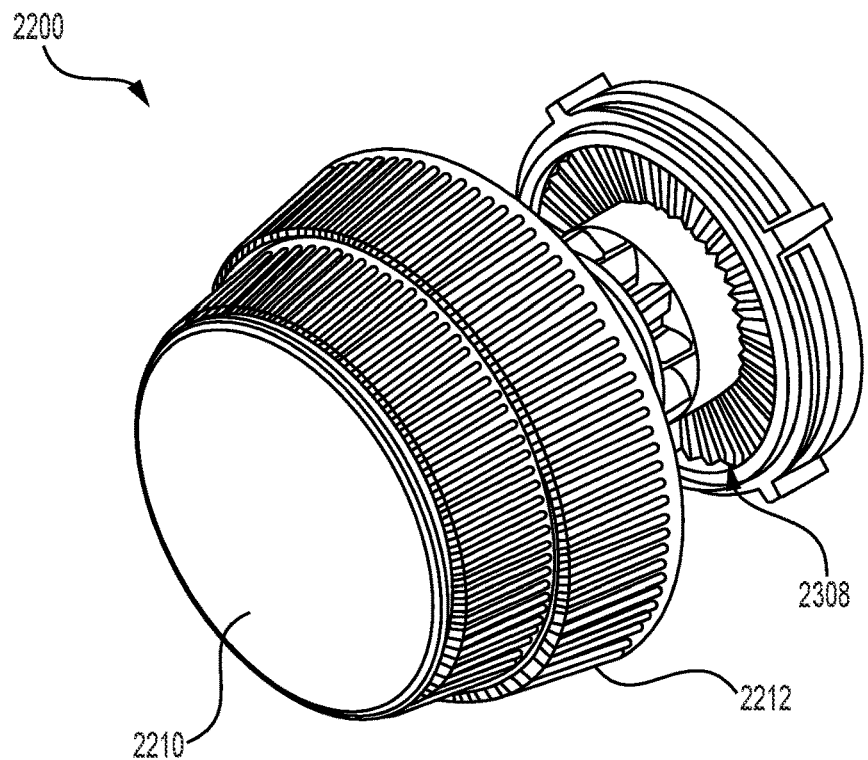
FIG. 24A illustrates a first isometric view of the actuator of FIG. 23A, according to an embodiment of the present disclosure.
Figure 24B:
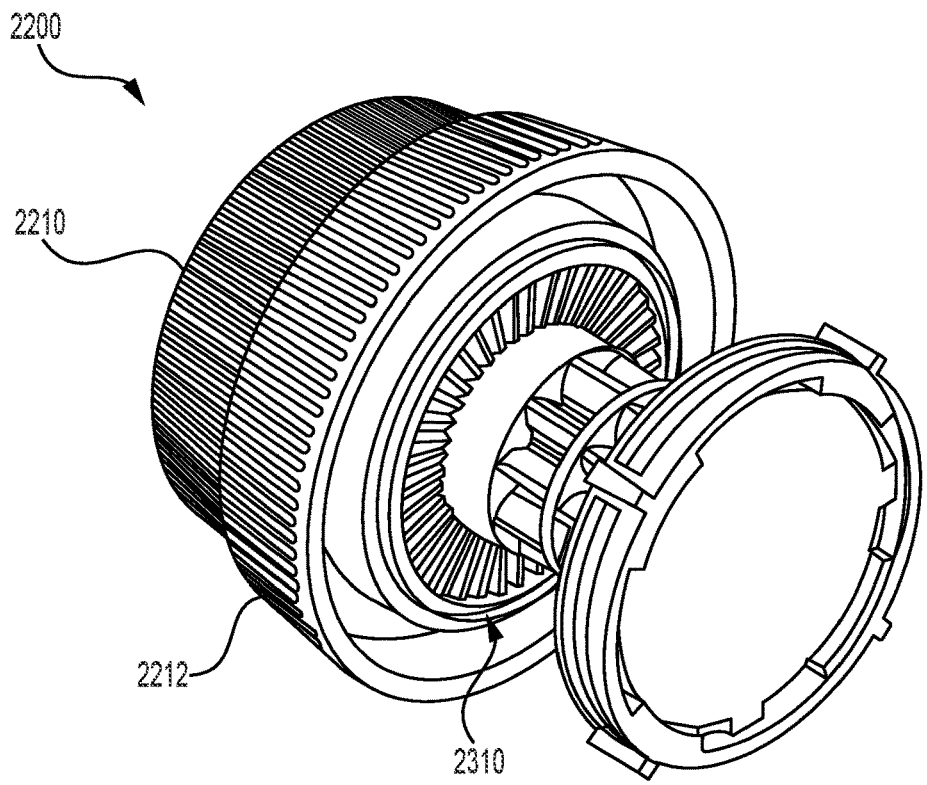
FIG. 24B illustrates a second isometric view of the actuator of FIG. 23A, according to an embodiment of the present disclosure.

FIGS. 24A and 24B illustrate isometric views of the dual-concentric knob 2202. As described above, the dual-concentric knob 2202 may include multiple actuators, such as the first knob 2210 that adjusts the vertical position of the display housing, and the second knob 2212 that operates to tighten and loosen against lateral sides of the head.

As shown, the first knob 2210 and the second knob 2212 may be in stacked relationship. In some instances, the first knob 2210 may be disposed in front of the second knob 2212 and the second knob 2212 may include a larger diameter than the first knob 2210. Additionally, the first knob 2210 and the second knob 2212 may be concentric.

FIG. 25 illustrates a rear isometric view of the HMD 2200, showing members engaged with the dual-concentric knob 2202. The HMD 2200 may include a top member 2500 that engages with the first knob 2210 of the dual-concentric knob 2202 for adjusting a vertical position of a display. Additionally, the HMD 2200 may include a first lateral member 2502 and a second lateral member 2504 that engage with the second knob 2212 of the dual-concentric knob 2202 for tightening/loosening the HMD 2200. Opposing ends of the top member 2500, the first lateral member 2502, and the second lateral member 2504 not coupled or engaged with the dual-concentric knob 2202 may engage with a display or a display housing. Additionally, each of the top member 2500, the first lateral member 2502, and the second lateral member 2504 may include slots for engaging with the first knob 2210 or the second knob 2212, respectively.

Figure 26:
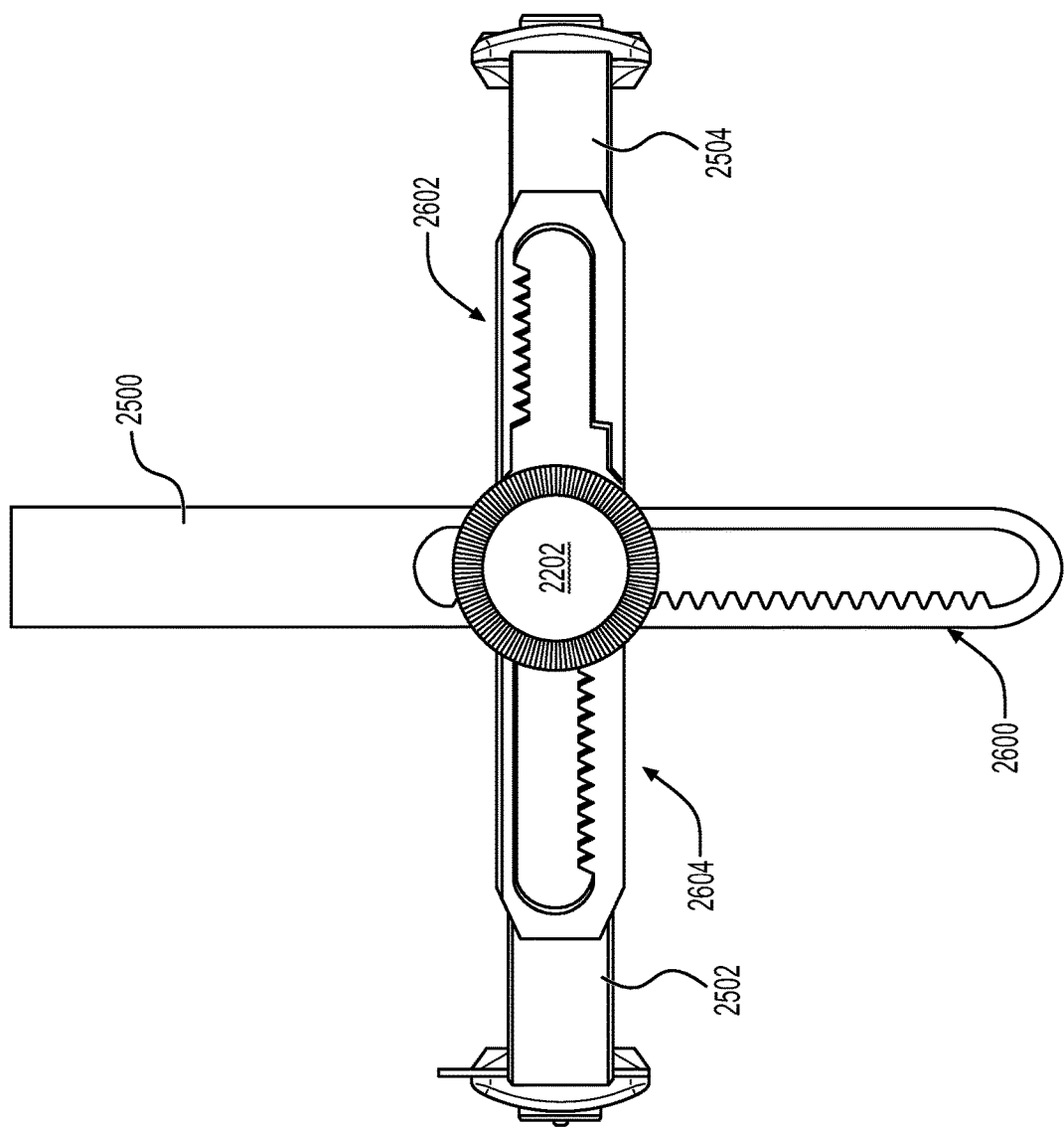
FIG. 26 illustrates a rear view of the one or more members of FIG. 25 engaged with the actuator of FIG. 23A, according to an embodiment of the present disclosure.

FIG. 26 illustrates a rear view showing the dual-concentric knob 2202 engaged with the top member 2500, the first lateral member 2502, and the second lateral member 2504.

The top member 2500 includes slots 2600 that extend along at least a portion of the length of the top member 2500 and which are configured to engage with the first gear 2302 of the first knob 2210. Depending on the direction of actuation, the first knob 2210 engages with the slots 2600 for shortening a length of the top member 2500 (e.g., raising the display) or increasing a length of the top member 2500 (e.g., lowering the display).

The first lateral member 2502 includes slots 2602 that extend along at least a portion of the length of the first lateral member 2502 and which are configured to engage with the second gear 2306 of the second knob 2212. Additionally, the second lateral member 2504 includes slots 2604 that extend along at least a portion of the length of the second lateral member 2504 and which are configured to engage with the second gear 2306 of the second knob 2212. Depending on the direction of actuation, the second knob 2212 engages with the slots 2602 and the slots 2604 for shortening a length of the first lateral member 2502 and the second lateral member 2504 (e.g., tightening the HMD 2200), or increasing a length of the first lateral member 2502 and the second lateral member 2504 (e.g., loosening the HMD 2200).

In some instances, the top member 2500, the first lateral member 2502, and the second lateral member 2504 include flexible and/or semi-rigid materials for routing alongside or over the top of the head. For example, the top member 2500, the first lateral member 2502, and the second lateral member 2504 may be made from materials such as plastic, rubber, composites, etc.

Figure 27:
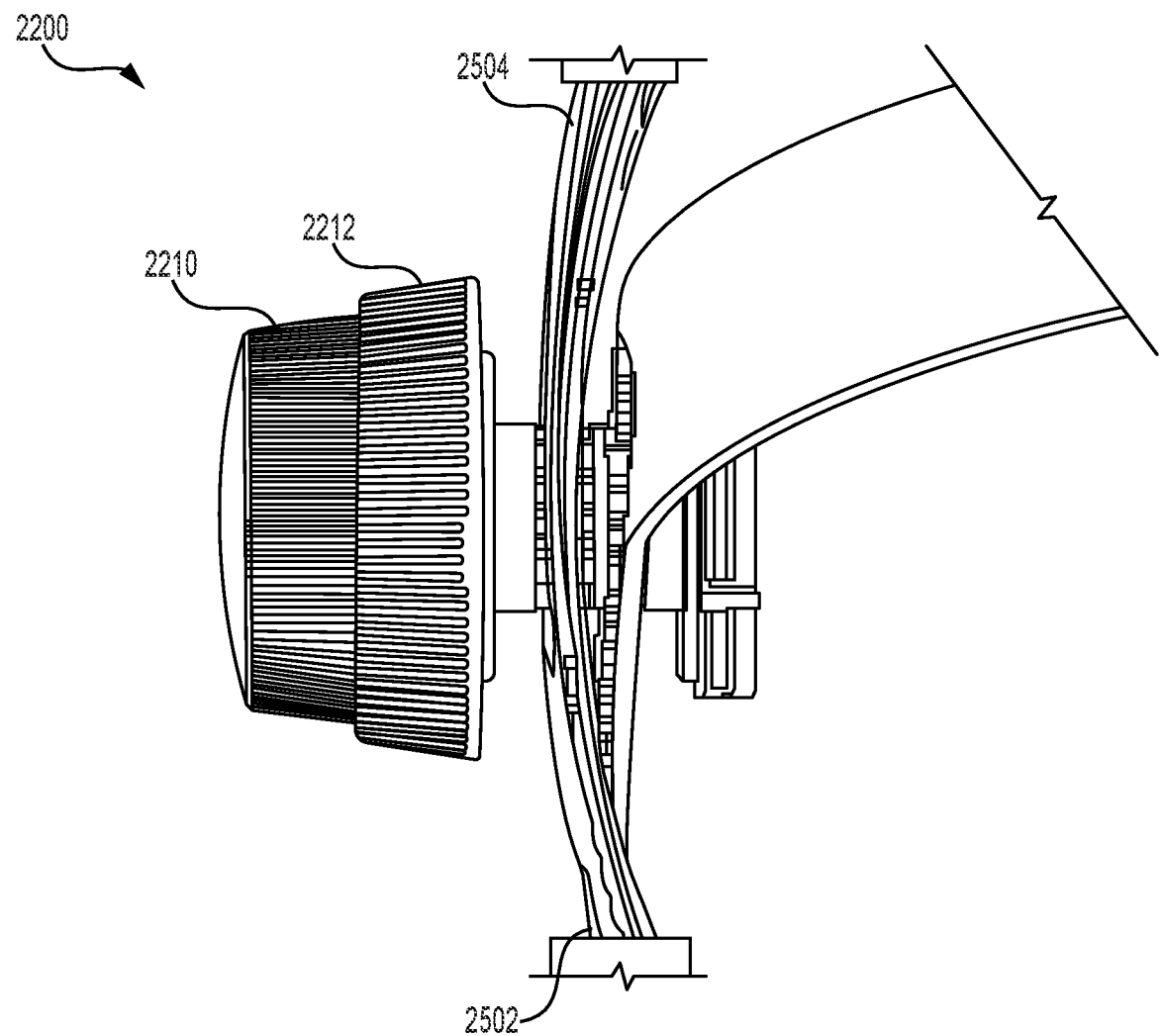
FIG. 27 illustrates an isometric view of the one or more members of FIG. 25 engaged with the actuator of FIG. 23A, according to an embodiment of the present disclosure.

FIG. 27 illustrates a rear view of the HMD 2200, showing the dual-concentric knob 2202 engaged with the top member 2500, the first lateral member 2502, and the second lateral member 2504. Rotating the second knob 2212 in a first direction (e.g., clockwise) increases an overlapping relationship between the first lateral member 2502 and the second lateral member 2504. Rotating the second knob 2212 in the opposite direction will decrease the overlapping relationship.

Figure 28A:
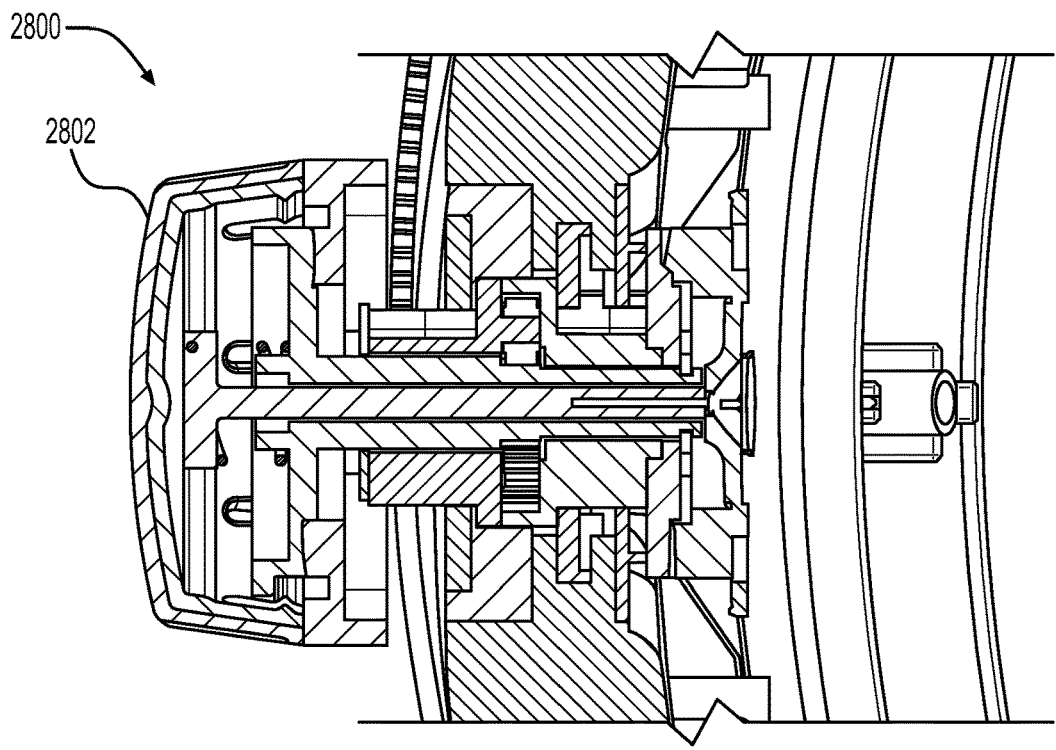
FIG. 28A illustrates a cross-sectional view of an example planetary gear drive of an example head-mounted display, according to an embodiment of the present disclosure.
Figure 28B:
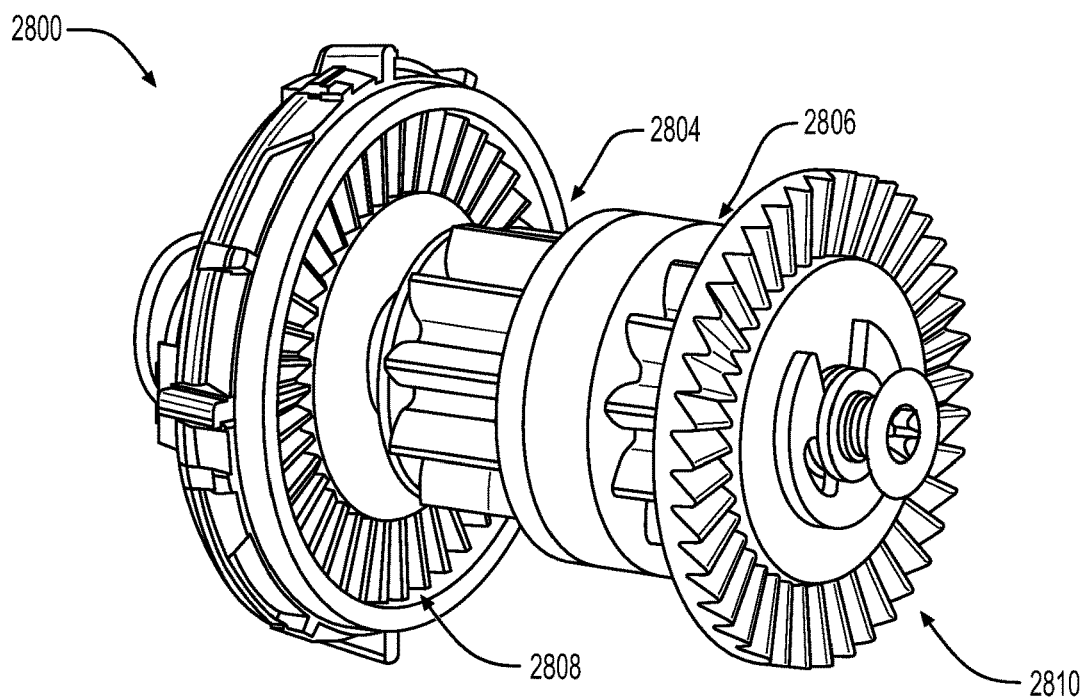
FIG. 28B illustrates a isometric view of the planetary gear drive of FIG. 28A, according to an embodiment of the present disclosure.
Figure 28C:
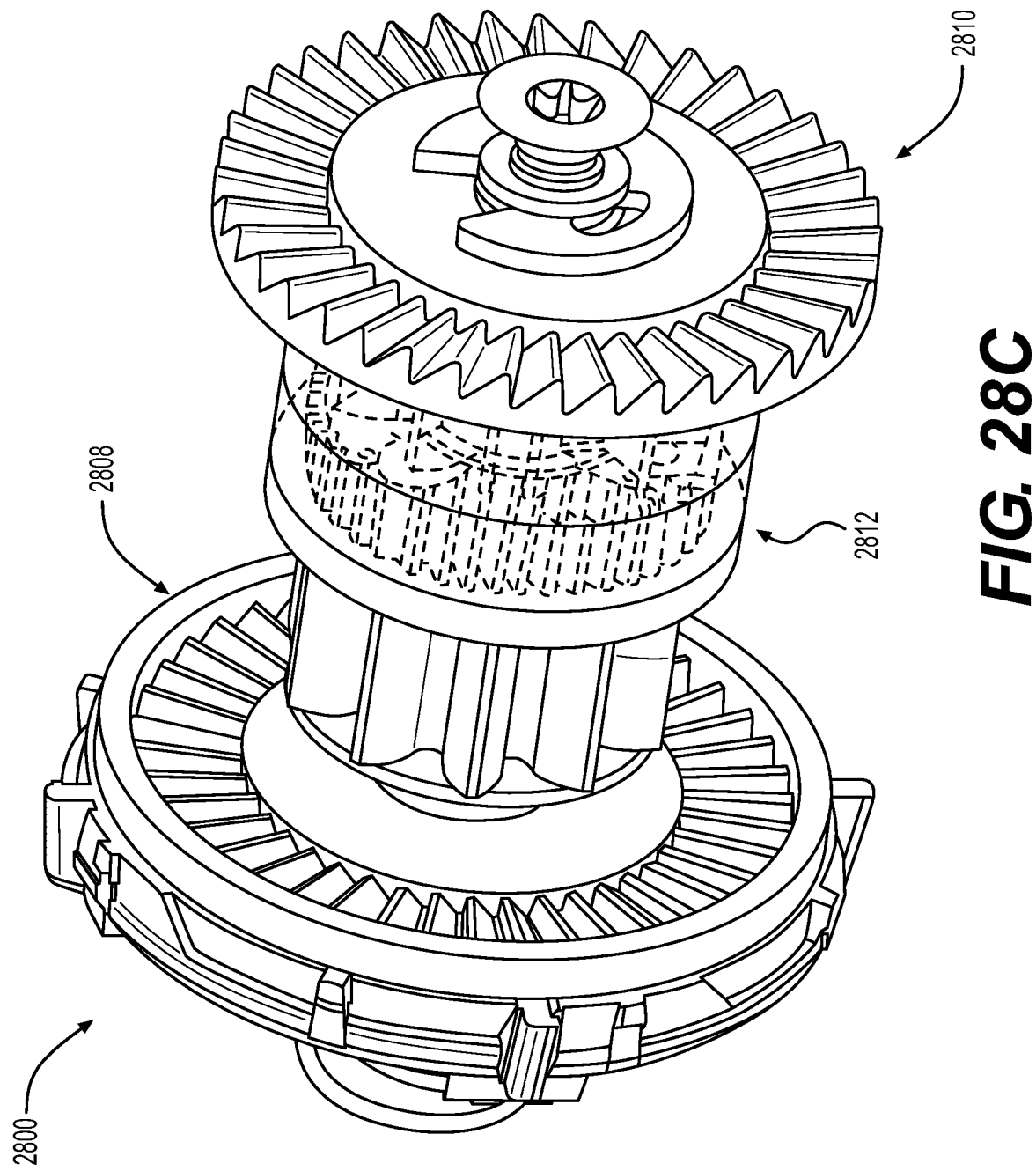
FIG. 28C illustrates a transparent view of the planetary gear drive of FIG. 28A, according to an embodiment of the present disclosure.

FIGS. 28A-28C illustrate a planetary gear drive 2800 that may be used for tightening and loosening a HMD. In some examples, the planetary gear drive 2800 may be embodied within the HMD 2200.

The planetary gear drive 2800 is shown including gears and ratchets for tightening and loosening the HMD and/or vertically adjusting a position of a display of the HMD on the user. As shown in FIG. 28A, the planetary gear drive 2800 may include a knob 2802. The knob 2802 may operably couple to a first gear 2804 and a second gear 2806. The first gear 2804 may engage with slots of lateral members for tightening and loosening the HMD to a user (e.g., rack and pinion). The operation of the first gear 2804 with the lateral members may be similar to that as described above with regard to the second gear 2306, the first lateral member 2502, and the second lateral member 2504. The second gear 2806 may engage with slots of the top member for raising and losing the display on the user (e.g., rack and pinion). The operation of the second gear 2806 with the top member may be similar to that as described above with regard to the first gear 2302 and the top member 2500. Moreover, the planetary gear drive 2800 may include a third gear 2808 and a fourth gear 2810 for preventing backdrive.

In some instances, the planetary gear drive 2800 may be configured to extend/retract the top member, the first lateral member, and/or the second lateral member simultaneously (i.e., concurrently). That is, the planetary gear drive 2800 may include a single knob for adjusting the top member, the first lateral member, and/or the second lateral member simultaneously. The planetary gear drive 2800 may have planetary gears 2812 for extending/retracting the top member and the first lateral member/the second lateral member at different lengths. For example, with the planetary gears 2812, a quarter turn of the knob 2802 may retract the top member by a first amount, and may retract the first lateral member and the second later member by a second amount that is different than the first amount.

Figure 29A:
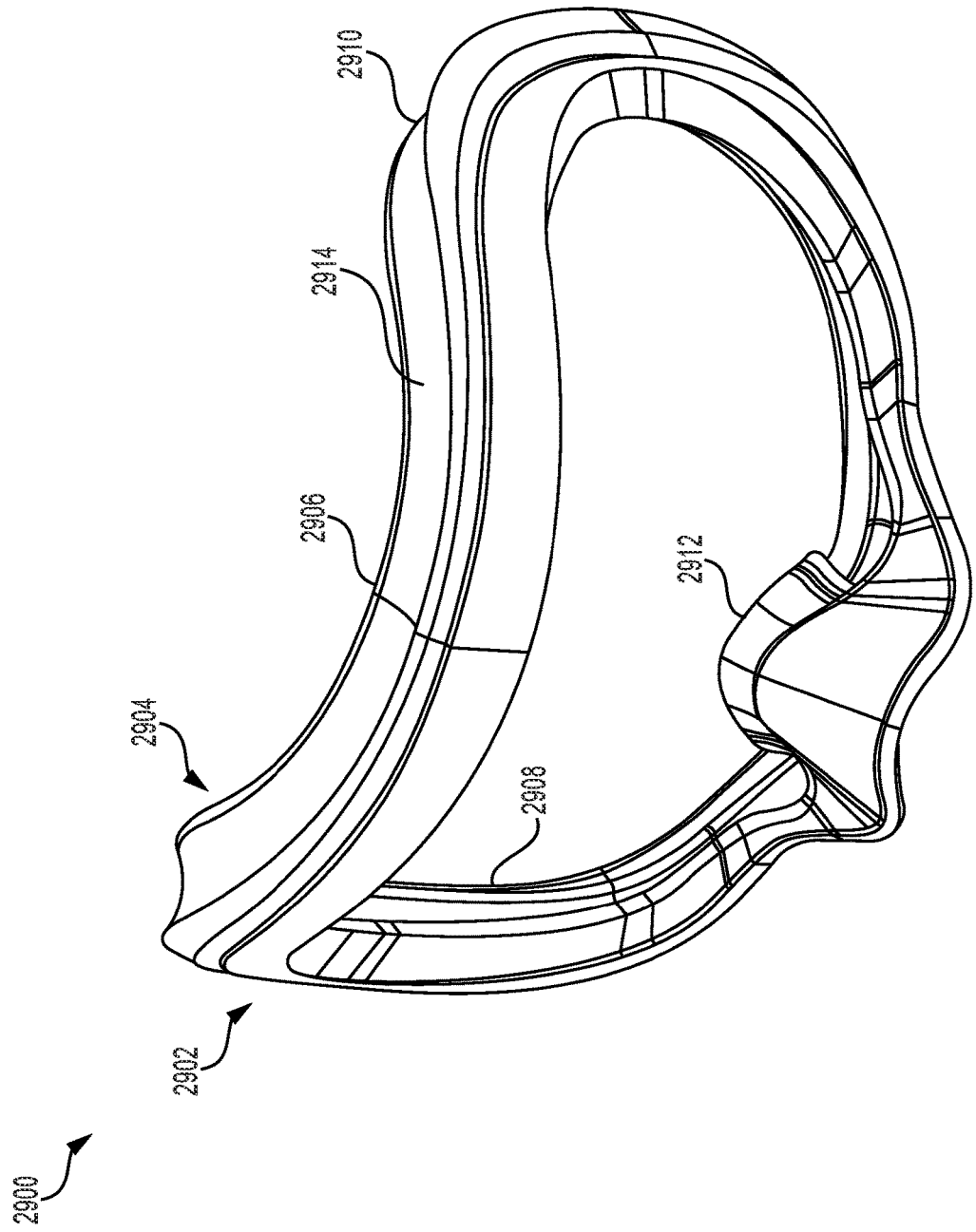
FIG. 29A illustrates a front isometric view of an example face gasket, according to an embodiment of the present disclosure.
Figure 29B:
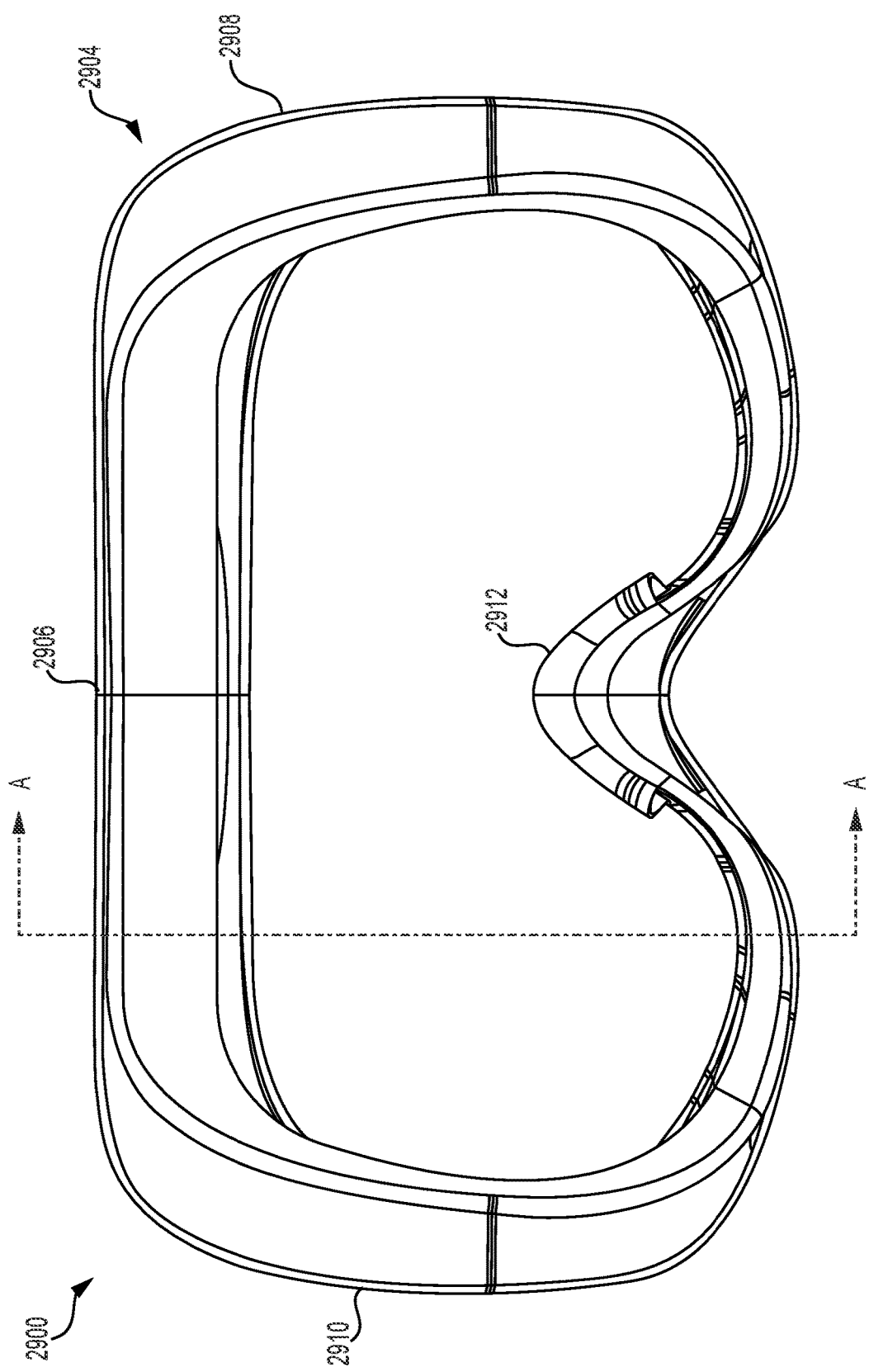
FIG. 29B illustrates a plan view of the example face gasket of FIG. 29A, according to an embodiment of the present disclosure.
Figure 29C:
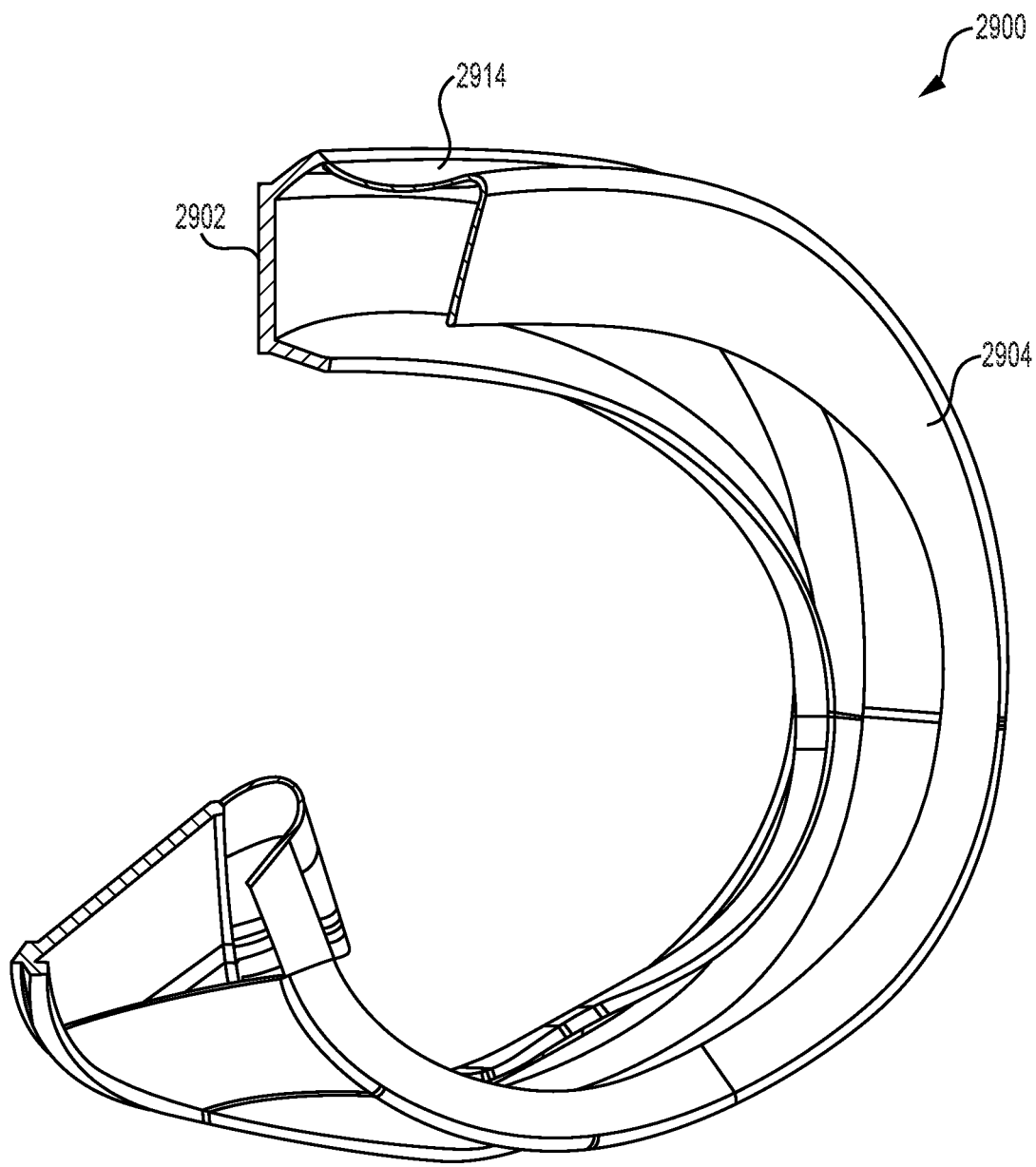
FIG. 29C illustrates a cross-sectional view of the example face gasket of FIG. 29A, according to an embodiment of the present disclosure.

FIGS. 29A-29C illustrates an example gasket 2900 that couples to the display housing 108 (or a frame of the display housing 108), the display housing 1706 (or a frame of the display housing 1706), and/or a display housing of the HMD 2200.

Beginning with FIG. 29A, the gasket 2900 may include a first side 2902 (or surface) for coupling to the display housing 108 and an opposing, second side 2904 (or surface) for sealing against the user. The second side 2904 of the gasket 2900 may include features, contours, surfaces, and shapes to match ergonomic factors of the user. This may allow the gasket 2900 to wrap around a front of the head of the user and seal against the face of the user. For example, when the HMD 100 and/or the HMD 1700 fastens to the user, the gasket 2900 may prevent light, or may substantially prevent light, permeating into an interior of the display housing 108 and/or the display housing 1706.

As shown, the second side 2904 of the gasket 2900 may include multiple curved surfaces that generally correspond to the facial features of the user. For example, the second side 2904 may include, or be made up of, a forehead portion 2906, a first cheek portion 2908, a second cheek portion 2910, and a nose portion 2912 that extends between the first cheek portion 2908 and the second cheek portion 2910. The forehead portion 2906 may curve and/or bend, across the forehead of the user, to seal the gasket 2900 to the user along a top. The first cheek portion 2908 and the second cheek portion 2910 may seal the gasket 2900 at lateral sides (e.g., against the cheeks of the user). The nose portion 2912 may seal the gasket 2900 along a bottom.

Collectively, the forehead portion 2906, the first cheek portion 2908, the second cheek portion 2910, and the nose portion 2912 may assist in placing or positioning the HMD 100 and/or the HMD 1700 relative to the eyes of the user. Additionally, the forehead portion 2906, the first cheek portion 2908, the second cheek portion 2910, and the nose portion 2912 may provide a continuous surface shaped to abut and conform to the head (or face) of the user.

To provide a customized fit according to user preferences, the gasket 2900 is configured to deform and warp. For example, as introduced above, the HMD 100 and/or the HMD 1700 may be tightened to the head of the user to provide different feels and/or to securely mount to the user. In such instances, and depending on the level of tightness, the gasket 2900 may maintain contact with the face of the user. In this sense, the gasket 2900 may be elastic or include a degree of travel for abutting against the face of the user. This may be accomplished through deforming (e.g., expansion and contraction) of the gasket 2900. For example, the gasket 2900 may include an intermediate portion 2914 interposed between the first side 2902 and the second side 2904. The intermediate portion 2914 may deflect, bend, roll, scrunches during a tightening of the HMD 100 and/or the HMD 1700. Moreover, the intermediate portion 2914 may extend, unroll, or expand during a loosening of HMD 100 and/or the HMD 1700. Such deformation of the intermediate portion 2914 may effectuate to maintain contact with the face of the user during loosening and tightening of the HMD 100 and/or the HMD 1700 to the user.

In some instances, the gasket 2900 may be permanently coupled to the display housing 108 and/or the display housing 1706 via adhesives, fasteners, clamping, overholding, and so forth. Additionally, or alternatively, in some instances, the gasket 2900 may be removably coupled to the display housing 108 and/or the display housing 1706 via magnets, hook and loop, press fits, snap-fit, and so forth. For example, the gasket 2900 may be removably coupled to the display housing 108 and/or the display housing 1706 for cleaning and/or sanitizing. Additionally, the display housing 108 and/or the display housing 1706 may be configured to receive a plurality of gaskets 2900, where each gasket 2900 may include respective contours, shapes, sizes, and so forth. By interchanging the gasket 2900 the user may achieve different feels and/or for securely mounting the HMD 100 and/or the HMD 1700, and/or different gaskets may be for differently sized or shaped faces.

The gasket 2900 may include a deformable material that conforms to the shape of the user. For example, and in some instances, the gasket 2900 may be made of an elastomeric material (e.g., synthetic or rubber material. Such material may assist in conforming to the user, provide a tight seal, and allow the gasket 2900 to be used repeatedly disinfected, cleaned, and reused.

FIG. 29B illustrates a rear view of the gasket 2900, showing the second side 2904. As introduced above, the second side 2904 may include a continuous body for adjoining and sealing against the face of the user. In some instances, the second side 2904 may include a surface for sealing against the face of the user. The surface may be flat, curved, and/or rounded. Such contours may assist in limiting the ingress of light and/or for providing a comfortable feel.

FIG. 29C illustrates a cross-sectional view of the gasket 2900, taken along line A-A of FIG. 29B. As shown, the first side 2902 of the gasket 2900 may include a surface for coupling to the display housing 108 and/or the display housing 1706, while the second side 2904 of the gasket 2900 may include a surface for engaging the face of the user. In some instances, the surface of the second side 2904 may include certain lengths, widths, and/or heights for abutting against and sealing to the face of the user. Moreover, as discussed above, the intermediate portion 2914 may span between the first side 2902(or a surface, body, etc. of the first side 2902) and the second side 2904 (or a surface, body, etc. of the first side 2902).

The intermediate portion 2914 may extend and contact to various lengths based on the tightening and loosening of the HMD 100 and/or the HMD 1700 and to maintain contact with the user. For example, as shown in FIG. 29C, the intermediate portion 2914 may be in an extended state (e.g., the intermediate portion 2914 may not experience compression forces). However, if the HMD 1700 and/or the HMD 1700 is tightened, the intermediate portion 2914 may constrict, buckle, roll, or fold upon itself. For example, the intermediate portion 2914 near the forehead portion 2906 may deflect downwards towards the nose portion 2912. Upon being loosened, the intermediate portion 2914 may expand, unroll, or unfold. This elasticity of the intermediate portion 2914 may provide the gasket 2900 with a degree of movement and/or travel for maintaining contact with the face of the user.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. A head-mounted display comprising:
   a display housing including a display;
   a rear housing including an actuator, the actuator including:
      an extend reel; and
      a retract reel;
   a rear harness coupled to the rear housing, the rear harness including:
      a first arm; and
      a second arm;
   a first member coupled to a first side of the display housing and extending in a direction towards the rear housing, the first member operably engaging with the first arm;
   a second member coupled to a second side of the display housing and extending in a direction towards the rear housing, the second member operably engaging with the second arm;
   a first cabling mechanism configured to extend and retract the first member at various lengths from the first arm, the first cabling mechanism including:
      a first extension cable wound around the extend reel in a first direction; and
      a first retraction cable wound around the retract reel in a second direction opposite the first direction; and
   a second cabling mechanism configured to extend and retract the second member at various lengths from the second arm, the second cabling mechanism including:
      a second extension cable wound around the extend reel in the first direction; and
      a second retraction cable wound around the retract reel in the second direction.

2. The head-mounted display of claim 1, further comprising a face gasket including:
   a first portion coupled to the display housing;
   a second portion for engaging with a user; and
   an intermediate portion disposed between the first portion and the second portion, wherein the intermediate portion is configured to deform to adjust a distance interposed between the first portion and the second portion.

3. The head-mounted display of claim 1, further comprising:
  a first loudspeaker arm including:
    a first end pivotably coupled to the first member; and
    a second end;
  a first loudspeaker coupled to the second end of the first loudspeaker arm;
  a second loudspeaker arm including:
    a first end pivotably coupled to the second member; and
    a second end; and
  a second loudspeaker coupled to the second end of the second loudspeaker arm.

4. The head-mounted display of claim 1, wherein:
  the first cabling mechanism further includes:
    one or more first pulleys; and
    one or more second pulleys,
      wherein the first extension cable is routed around the one or more first pulleys, and
      wherein the first retraction cable is routed around the one or more second pulleys; and
  the second cabling mechanism further includes:
    one or more third pulleys; and
    one or more fourth pulleys,
      wherein the second extension cable is routed around the one or more third pulleys, and
      wherein the second retraction cable is routed around the one or more fourth pulleys.

5. The head-mounted display of claim 1, wherein:
  actuating the actuator in a third direction causes the first extension cable to extend the first member from the first arm;
  actuating the actuator in a fourth direction causes the first retraction cable to retract the first member over the first arm;
  actuating the actuator in the third direction causes the second extension cable to extend the second member from the second arm; and
  actuating the actuator in the fourth direction causes the second retraction cable to retract the second member over the second arm.

6. The head-mounted display of claim 1, wherein the rear harness pivotably couples to the rear housing via a ball joint.

7. A head-mounted display comprising:
  a front;
  a back;
  a first member extending between the front and the back, the first member being adjustable via an actuation of a rotatable actuator and a first cabling mechanism, the first cabling mechanism including:
    a first extension cable wound around an extend reel of the rotatable actuator in a first direction; and
    a first retraction cable wound around a retract reel of the rotatable actuator in a second direction opposite the first direction; and
  a second member extending between the front and the back, the second member being adjustable via the actuation of the rotatable actuator and a second cabling mechanism, the second cabling mechanism including:
    a second extension cable wound around the extend reel in the first direction; and
    a second retraction cable wound around the retract reel in the second direction.

8. The head-mounted display of claim 7, further comprising:
  a first loudspeaker pivotably coupled to the first member via a first ball joint; and
  a second loudspeaker pivotably coupled to the second member via a second ball joint.

9. The head-mounted display of claim 8, further comprising a first loudspeaker arm including the first loudspeaker and a second loudspeaker arm including the second loudspeaker, and wherein:
  the first loudspeaker arm slidably engages with the first ball joint; and
  the second loudspeaker arm slidably engages with the second ball joint.

10. The head-mounted display of claim 7, wherein:
  the first cabling mechanism further comprises:
    one or more first pulleys associated with retracting the first member; and
    one or more second pulleys associated with extending the first member,
      wherein the first retraction cable is routed around the one or more first pulleys, and
      wherein the first extension cable is routed around the one or more second pulleys; and
  the second cabling mechanism further comprises:
    one or more third pulleys associated with retracting the second member; and
    one or more fourth pulleys associated with extending the second member,
      wherein the second retraction cable is routed around the one or more third pulleys, and
      wherein the second extension cable is routed around the one or more fourth pulleys.

11. The head-mounted display of claim 10, further comprising a first arm extending from the back and operably engaging with the first member, and a second arm extending from the back and operably engaging with the second member, and wherein at least one of:
  the one or more first pulleys or the one or more second pulleys are at least one of disposed within or coupled to the first member or the first arm; or
  the one or more third pulleys or the one or more fourth pulleys are at least one of disposed within or coupled to the second member or the second arm.

12. A wearable display comprising:
  a front;
  a back;
  a first member extending between the front and the back;
  a second member extending between the front and the back;
  an actuator disposed on the back and configured to adjust a length of the first member and a length of the second member via an actuation of the actuator, wherein the actuator includes an extend reel and a retract reel;
  a first extension cable configured to increase the length of the first member, the first extension cable being wound around the extend reel in a first direction;
  a first retraction cable configured to decrease the length of the first member, the first retraction cable being wound around the retract reel in a second direction opposite the first direction;
  a second extension cable configured to increase the length of the second member, the second extension cable being wound around the extend reel in the first direction;
  a second retract cable configured to decrease the length of the second member, the second retract cable being wound around the retract reel in the second direction;
  a first loudspeaker arm pivotably coupled to the first member via a first ball joint, the first ball joint engaged with a first channel of the first loudspeaker arm for slidably engaging the first loudspeaker arm with the first ball joint;
a first loudspeaker coupled to an end of the first loudspeaker arm:
a second loudspeaker arm pivotably coupled to the second member via a second ball joint, the second ball joint engaged with a second channel of the second loudspeaker arm for slidably engaging the second loudspeaker arm with the second ball joint; and
a second loudspeaker coupled to an end of the second loudspeaker arm.

13. The wearable display of claim 12, wherein:
actuating the actuator in a third direction extends the first member and the second member for loosening the wearable display; and
actuating the actuator in a fourth direction retracts the first member and the second member for tightening the wearable display.

14. The wearable display of claim 12, further comprising:
a display housing located at the front; and
a face gasket coupled to the display housing, the face gasket including:
a first portion couple to the display housing;
a second portion for engaging with a user; and
an intermediate portion disposed between the first portion and the second portion, wherein the intermediate portion is configured to deform to adjust a distance interposed between the first portion and the second portion.

15. The wearable display of claim 12, wherein the first member and the second member are configured to overlap at the back.

16. The wearable display of claim 12, further comprising a rear housing disposed at the back, the rear housing including a first gear, and wherein:
the actuator includes a second gear that engages with the first gear for reducing backdrive of the actuator.

17. The wearable display of claim 12, further comprising a display housing disposed at the front and a rear harness disposed at the back, and wherein:
a first end of the first member couples to the display housing;
a second end of the first member is disposed within the rear harness;
a first end of the second member couples to the display housing, and
a second end of the second member is disposed within the rear harness.

18. The head-mounted display of claim 9, wherein:
the first ball joint is engaged with a first channel of the first loudspeaker arm for slidably engaging the first loudspeaker arm with the first ball joint; and
the second ball joint is engaged with a second channel of the second loudspeaker arm for slidably engaging the second loudspeaker arm with the second ball joint.

19. The head-mounted display of claim 7, further comprising a third member extending between the front and the back, the third member being adjustable in length.

20. The wearable display of claim 12, further comprising a third member extending between the front and the back, the third member being adjustable in length.

* * * * *